United States Patent
Beg et al.

(10) Patent No.: US 12,517,238 B2
(45) Date of Patent: Jan. 6, 2026

(54) SYSTEMS AND METHODS FOR WI-FI SENSING USING UPLINK ORTHOGONAL FREQUENCY DIVISION MULTIPLE ACCESS (UL-OFDMA)

(71) Applicant: Cognitive Systems Corp., Waterloo (CA)

(72) Inventors: Chris Beg, Waterloo (CA); Mohammad Omer, Waterloo (CA)

(73) Assignee: COGNITIVE SYSTEMS CORP., Waterloo (CA)

( * ) Notice: Subject to any disclaimer, the term of this patent is extended or adjusted under 35 U.S.C. 154(b) by 118 days.

(21) Appl. No.: 18/505,939

(22) Filed: Nov. 9, 2023

(65) Prior Publication Data
US 2024/0151840 A1 May 9, 2024

Related U.S. Application Data

(63) Continuation of application No. 17/997,092, filed as application No. PCT/IB2022/054498 on May 13, 2022, now Pat. No. 11,835,615.
(Continued)

(51) Int. Cl.
*G01S 13/00* (2006.01)
*G01S 7/00* (2006.01)
(Continued)

(52) U.S. Cl.
CPC ............ *G01S 13/003* (2013.01); *G01S 7/006* (2013.01); *G01S 7/415* (2013.01); *G01S 13/04* (2013.01);
(Continued)

(58) Field of Classification Search
CPC ........ G01S 13/003; G01S 7/006; G01S 7/415; G01S 13/04; G01S 13/56; G01S 13/878; H04W 74/06; H04W 84/12; H04W 92/16
See application file for complete search history.

(56) References Cited

U.S. PATENT DOCUMENTS 9,523,760 B1 12/2016 Kravets et al.
10,374,863 B2 8/2019 Xu et al.
(Continued)

FOREIGN PATENT DOCUMENTS

WO 2022148461 A1 7/2022

OTHER PUBLICATIONS

European Patent Office (EPO), Extended European Search Report (EESR) for Application No. 22806963.9, dated Feb. 28, 2025, 8 pages.
(Continued)

*Primary Examiner* — Donald HB Braswell
(74) *Attorney, Agent, or Firm* — Moffat & Co

(57) ABSTRACT

Systems and methods for Wi-Fi sensing using UL-OFDMA are provided. Wi-Fi sensing systems include sensing devices and sensing transmitters configured to communicate through radio-frequency signals. Initially, first channel resources are allocated to first expected transmissions from the sensing transmitters and first sensing trigger message to trigger first series of sensing transmissions from the sensing transmitters is transmitted. Further, a first series of sensing transmissions is received, and the first series of sensing measurements are generated. Thereafter, identification of feature of interest is obtained and a selection of sensing transmitters is determined. Second channel resources are allocated to second expected transmissions from the selection of sensing transmitters. A second sensing trigger message to trigger a second series of sensing transmissions from the selection of the sensing transmitters is provided. A series of sensing transmissions is received, and a second series of sensing measurements is generated based on the second series of sensing transmissions.

18 Claims, 43 Drawing Sheets

Related U.S. Application Data

(60) Provisional application No. 63/188,826, filed on May 14, 2021.

(51) Int. Cl.

| | | |
|---|---|---|
| *G01S 7/41* | (2006.01) | |
| *G01S 13/04* | (2006.01) | |
| *G01S 13/56* | (2006.01) | |
| *G01S 13/87* | (2006.01) | |
| *H04W 4/33* | (2018.01) | |
| *H04W 4/38* | (2018.01) | |
| *H04W 56/00* | (2009.01) | |
| *H04W 74/06* | (2009.01) | |
| *H04W 74/08* | (2024.01) | |
| *H04W 84/12* | (2009.01) | |
| *H04W 92/16* | (2009.01) | |

(52) U.S. Cl.
CPC ............ *G01S 13/56* (2013.01); *G01S 13/878* (2013.01); *H04W 4/33* (2018.02); *H04W 4/38* (2018.02); *H04W 56/001* (2013.01); *H04W 74/06* (2013.01); *H04W 74/0891* (2013.01); *H04W 84/12* (2013.01); *H04W 92/16* (2013.01)

(56) References Cited

U.S. PATENT DOCUMENTS

| | | |
|---|---|---|
| 2020/0064458 A1 | 2/2020 | Giusti et al. |
| 2020/0162980 A1 | 5/2020 | Kalkunte |
| 2020/0191943 A1 | 6/2020 | Wu et al. |
| 2020/0359248 A1 | 11/2020 | Sadeghi et al. |
| 2020/0400778 A1 | 12/2020 | Da Silva et al. |
| 2021/0273735 A1 | 9/2021 | Da Silva et al. |
| 2021/0349199 A1 | 11/2021 | Trainin et al. |
| 2022/0022056 A1* | 1/2022 | Park ....................... G01S 13/003 |
| 2022/0066018 A1* | 3/2022 | Han ....................... G01S 7/0232 |
| 2022/0070710 A1 | 3/2022 | Lim et al. |
| 2022/0070927 A1 | 3/2022 | Lim et al. |
| 2022/0268912 A1 | 8/2022 | Zhang et al. |
| 2022/0304051 A1 | 9/2022 | Aboul-Magd et al. |
| 2023/0065713 A1* | 3/2023 | Dai ......................... G01S 7/006 |
| 2023/0156787 A1 | 5/2023 | Dai et al. |
| 2024/0049161 A1* | 2/2024 | Katla ..................... H04B 17/15 |

OTHER PUBLICATIONS

Lim et al., "Sensing Measurement sequence of 11bf", doc: IEEE 802.11-21/0419r0, XP068197273, date: Mar. 10, 2021, 18 pages.

Xiao Han, "TGbf Motions List", doc.: IEEE 802.11-20/1874r38, XP093080451, date: Feb. 5, 2021, 89 pages.

Canadian Intellectual Property Office (CIPO): Office Action for application No. 3,207,802, dated Feb. 18, 2025, 5 pages.

\* cited by examiner

| | B0 B3 | B4 B15 | B16 | B17 | B18 B19 | B20 B21 | B22 | B23 B25 |
|---|---|---|---|---|---|---|---|---|
| 700 | Trigger Type | UL Length | More TF | CS Required | UL BW | GI And HE-LTF Type | MU-MIMO HE-LTF Mode | Number Of HE-LTF Symbols And Mid-Amble Periodicity |
| Bits: | 4 | 12 | 1 | 1 | 2 | 2 | 1 | 3 |

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRO) |
| 7 | NDP Feedback Report Poll (NFRP) |
| 8..15 | Reserved |

| B0 B11 | B12 B19 | B20 | B21 B24 | B25 | B26 B31 | B22 B38 | B39 | |
|---|---|---|---|---|---|---|---|---|
| AID12 | RU Allocation | ULFEC Coding Type | UL HE-MCS | UL DCM | SS Allocation RA-RU Information | UL Target Receive Power | Reserved | Trigger Dependent User Info |

Bits: 12, 8, 1, 4, 1, 6, 7, 1, variable

| AID12 subfield | Description |
|---|---|
| 0 | User Info Field allocates one or more continuous RA-RUs for associated STAs |
| 1..2007 | User Info field is addressed to an associated STA whose AID is equal to the value in the AID12 subfield |
| 2008..2044 | Reserved |
| 2045 | User Info Field allocation one or more contiguous RA-RUs for unassociated STAs |
| 2046 | Unallocated RU |
| 2047..4094 | Reserved |
| 4095 | Start of Padding field |

FIG. 7E

| B7..B1 of the RU Allocation subfield | UL BW subfield | RU Size | RU Index |
|---|---|---|---|
| 53,54 | 20 MHz, 40 MHz, 80 MHz, 80+80 MHz or 160 MHz | 106 | RU1 and RU2 respectively |
| 55,56 | 40 MHz, 80 MHz, 80+80 MHz or 160 MHz | | RU3 and RU4 respectively |
| 57..60 | 80 MHz, 80+80 MHz or 160 MHz | | RU5..RU8 respectively |
| 61 | 20 MHz, 40 MHz, 80 MHz, 80+80 MHz or 160 MHz | 242 | RU1 |
| 62 | 40 MHz, 80 MHz, 80+80 MHz or 160 MHz | | RU2 |
| 63,64 | 80 MHz, 80+80 MHz or 160 MHz | | RU3 and RU4 respectively |
| 65 | 40 MHz, 80 MHz, 80+80 MHz or 160 MHz | 484 | RU1 |
| 66 | 80 MHz, 80+80 MHz or 160 MHz | | RU2 |
| 67 | 80 MHz, 80+80 MHz or 160 MHz | 996 | RU1 |
| 68 | 80+80 MHz or 160 MHz | 2×996 | RU1 |

| | B0 B3 | B4 B15 | B16 | B17 | B18 B19 | B20 B21 | B22 | B23 B25 |
|---|---|---|---|---|---|---|---|---|
| 1200 | Trigger Type | UL Length | More TF | CS Required | UL BW | GI And HE-LTF Type | MU-MIMO HE-LTF Mode | Number Of HE-LTF Symbols And Mid-Amble Periodicity |
| Bits: | 4 | 12 | 1 | 1 | 2 | 2 | 1 | 3 |

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRO) |
| 7 | NDP Feedback Report Poll (NFRP) |
| 8 | UL-OFDMA Sensing Trigger |
| 9..15 | Reserved |

| B0 | B11 B12 | B19 B20 | B21 B24 | B25 | B26 B31 | B22 B38 | B39 |
|---|---|---|---|---|---|---|---|
| AID12 | RU Allocation | ULFEC Coding Type | UL HE-MCS | UL DCM | SS Allocation RA-RU Information | UL Target Receive Power | Reserved | Trigger Dependent User Info |

Bits: 12 | 8 | 1 | 4 | 1 | 6 | 7 | 1 | variable

| AID12 subfield | Description |
|---|---|
| 0 | User Info Field allocates one or more continuous RA-RUs for associated STAs |
| 1..2007 | User Info field is addressed to an associated STA whose AID is equal to the value in the AID12 subfield |
| 2008..2044 | Reserved |
| 2045 | User Info Field allocation one or more contiguous RA-RUs for unassociated STAs |
| 2046 | Unallocated RU |
| 2047..4094 | Reserved |
| 4095 | Start of Padding field |

| B7..B1 of the RU Allocation subfield | UL BW subfield | RU Size | RU Index |
|---|---|---|---|
| 53,54 | 20 MHz, 40 MHz, 80 MHz, 80+80 MHz or 160 MHz | 106 | RU1 and RU2 respectively |
| 55,56 | 40 MHz, 80 MHz, 80+80 MHz or 160 MHz | | RU3 and RU4 respectively |
| 57..60 | 80 MHz, 80+80 MHz or 160 MHz | | RU5..RU8 respectively |
| 61 | 20 MHz, 40 MHz, 80 MHz, 80+80 MHz or 160 MHz | 242 | RU1 |
| 62 | 40 MHz, 80 MHz, 80+80 MHz or 160 MHz | | RU2 |
| 63,64 | 80 MHz, 80+80 MHz or 160 MHz | | RU3 and RU4 respectively |
| 65 | 40 MHz, 80 MHz, 80+80 MHz or 160 MHz | 484 | RU1 |
| 66 | 80 MHz, 80+80 MHz or 160 MHz | | RU2 |
| 67 | 80 MHz, 80+80 MHz or 160 MHz | 996 | RU1 |
| 68 | 80+80 MHz or 160 MHz | 2×996 | RU1 |

SYSTEMS AND METHODS FOR WI-FI SENSING USING UPLINK ORTHOGONAL FREQUENCY DIVISION MULTIPLE ACCESS (UL-OFDMA)

CROSS-REFERENCE TO RELATED APPLICATIONS

This application is a continuation of U.S. application Ser. No. 17/997,092, filed Oct. 25, 2022, which is a national stage entry of International Application No. PCT/IB2022/054498, filed on May 13, 2022, which claims benefit of U.S. Provisional Application No. 63/188,826, filed on May 14, 2021, each of which is incorporated herein by reference in its entirety.

TECHNICAL FIELD

The present disclosure generally relates to systems and methods for Wi-Fi sensing. In particular, the present disclosure relates to configuring Wi-Fi systems to perform Wi-Fi sensing using uplink orthogonal frequency division multiple access (UL-OFDMA).

BACKGROUND OF THE DISCLOSURE

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems, and other types of systems. A Wi-Fi sensing system is one recent addition to motion detection systems. The Wi-Fi sensing system may be a network of Wi-Fi-enabled devices that may be a part of an IEEE 802.11 network. In an example, the Wi-Fi sensing system may be configured to detect features of interest in a sensing space. The sensing space may refer to any physical space in which the Wi-Fi sensing system may operate, such as a place of residence, a place of work, a shopping mall, a sports hall or sports stadium, a garden, or any other physical space. The features of interest may include motion of objects and motion tracking, presence detection, intrusion detection, gesture recognition, fall detection, breathing rate detection, and other applications. Aspects of embodiments presented herein provide improvements to Wi-Fi sensing systems.

BRIEF SUMMARY OF THE DISCLOSURE

The present disclosure generally relates to systems and methods for Wi-Fi sensing. In particular, the present disclosure relates to configuring Wi-Fi systems to perform Wi-Fi sensing using uplink orthogonal frequency division multiple access (UL-OFDMA).

Systems and methods are provided for Wi-Fi sensing. In an example embodiment, a method for Wi-Fi sensing is described. The method is carried out by a sensing receiver comprising a transmitting antenna, a receiving antenna, and at least one processor configured to execute instructions. The method includes allocating, by the at least one processor, first channel resources to first expected transmissions from a first plurality of sensing transmitters wherein each of the first plurality of sensing transmitters is allocated a first respective portion of the first channel resources, generating, by the at least one processor, a series of sensing measurements based on a series of sensing transmissions, obtaining identification of a feature of interest according to the series of sensing measurements, and allocating, by the at least one processor, according to the identification of the feature of interest, second channel resources to a second plurality of sensing transmitters wherein each of the second plurality of sensing transmitters is allocated a second respective portion of the second channel resources, the second plurality of sensing transmitters is a subset of the first plurality of sensing transmitters, and at least one second respective portion of the second channel resources is greater than a corresponding first respective portion of the first channel resources.

In some implementations, the method further comprises transmitting, via the transmitting antenna, a sensing sounding trigger frame configured to trigger the series of sensing transmissions from the first plurality of sensing transmitters, and receiving, via the receiving antenna, the series of sensing transmissions transmitted in response to the sensing sounding trigger frame wherein the sensing sounding trigger frame is a scanning type trigger frame including a requested transmission configuration and a resource allocation subfield corresponding to a scanning mode.

In some implementations, the first channel resources are included within a first transmission opportunity, the series of sensing transmissions is a first series of sensing transmissions corresponding to a scanning mode, the first channel resources are allocated to the first plurality of sensing transmitters according to the scanning mode, the second channel resources are included within a second transmission opportunity, and the second channel resources are allocated to the second plurality of sensing transmitters according to a detection mode.

In some implementations, the first channel resources and the second channel resources are included within a same transmission opportunity, the series of sensing transmissions is a first series of sensing transmissions corresponding to a scanning mode, the first channel resources are allocated to the first plurality of sensing transmitters according to the scanning mode, and the second channel resources are allocated to the second plurality of sensing transmitters according to a detection mode.

In some implementations, allocating the first channel resources includes allocating time and bandwidth within a transmission opportunity to the first plurality of sensing transmitters.

In some implementations, obtaining the identification of the feature of interest includes identifying, by the at least one processor and responsive to the series of sensing measurements, the feature of interest.

In some implementations, obtaining the identification of the feature of interest includes transmitting the series of sensing measurements to a sensing algorithm device, and receiving, by the at least one processor, from the sensing algorithm device, the identification of the feature of interest.

In some implementations, allocating the second channel resources includes selecting the second plurality of sensing transmitters based on proximity to the feature of interest.

In some implementations, the series of sensing measurements is a first series of sensing measurements and the series of sensing transmissions is a first series of sensing transmissions, and the method further comprises generating a second series of sensing measurements of a higher resolution than the first series of sensing measurements based on a second series of sensing transmissions.

In some implementations, the feature of interest includes a first feature of interest and a second feature of interest, and allocating the second channel resources based on the identification of the feature of interest includes determining a first selection of sensing transmitters according to an identification of the first feature of interest, determining a second selection of sensing transmitters according to an identification of the second feature of interest, wherein the first selection of sensing transmitters and the second selection of sensing transmitters make up the second plurality of sensing transmitters.

In some implementations, the first channel resources are included within a first transmission opportunity, the series of sensing transmissions is a first series of sensing transmissions corresponding to a scanning mode, the second channel resources are included within a second transmission opportunity, a second sensing sounding trigger frame includes a hybrid type trigger frame, the hybrid type trigger frame being configured to trigger, from a first group of sensing transmitters, a first second series of sensing transmissions corresponding to the scanning mode and to trigger, from a second group of sensing transmitters, a second second series of sensing transmissions corresponding to a hybrid mode, a first portion of the second channel resources is allocated to sensing transmissions of the first second series of sensing transmissions received responsive to the hybrid type trigger frame, and a second portion of the second channel resources is allocated to sensing transmissions of the second second series of sensing transmissions received responsive to the hybrid type trigger frame.

In some implementations, the sensing sounding trigger frame is a first sensing sounding trigger frame, the at least one processor further configured for transmitting a second sensing sounding trigger frame configured to trigger a first group of second sensing transmissions from a first group of sensing transmitters from the second plurality of sensing transmitters and to trigger a second group of sensing transmissions from a second group of sensing transmitters from the second plurality of sensing transmitters.

In some implementations, the method further comprises transmitting, via the transmitting antenna, a sensing sounding trigger frame configured to trigger the series of sensing transmissions from the first plurality of sensing transmitters, and receiving, via the receiving antenna, the series of sensing transmissions transmitted in response to the sensing sounding trigger frame wherein transmitting the sensing sounding trigger frame includes transmitting the sensing sounding trigger frame configured to trigger a first group of sensing transmissions from a first group of sensing transmitters from the first plurality of sensing transmitters and to trigger a second group of sensing transmission from a second group of sensing transmitters from the first plurality of sensing transmitters.

In a further implementation, a system configured for Wi-Fi sensing is provided. The system comprises a sensing receiver including a transmitting antenna, a receiving antenna, and at least one processor configured to execute instructions for allocating, by the at least one processor, first channel resources to first expected transmissions from a first plurality of sensing transmitters wherein each of the first plurality of sensing transmitters is allocated a first respective portion of the first channel resources, generating, by the at least one processor, a series of sensing measurements based on a series of sensing transmissions, obtaining identification of a feature of interest according to the series of sensing measurements, and allocating, by the at least one processor, according to the identification of the feature of interest, second channel resources to a second plurality of sensing transmitters wherein each of the second plurality of sensing transmitters is allocated a second respective portion of the second channel resources, the second plurality of sensing transmitters is a subset of the first plurality of sensing transmitters, and at least one second respective portion of the second channel resources is greater than a corresponding first respective portion of the first channel resources.

Other aspects and advantages of the disclosure will become apparent from the following detailed description, taken in conjunction with the accompanying drawings, which illustrate by way of example, the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 7A to FIG. 7G depict a hierarchy of fields within the trigger frame, according to some embodiments;

FIG. 12A to FIG. 12H depict a hierarchy of fields within a UL-OFDMA sensing trigger message, according to some embodiments;

DETAILED DESCRIPTION

Figure 1:
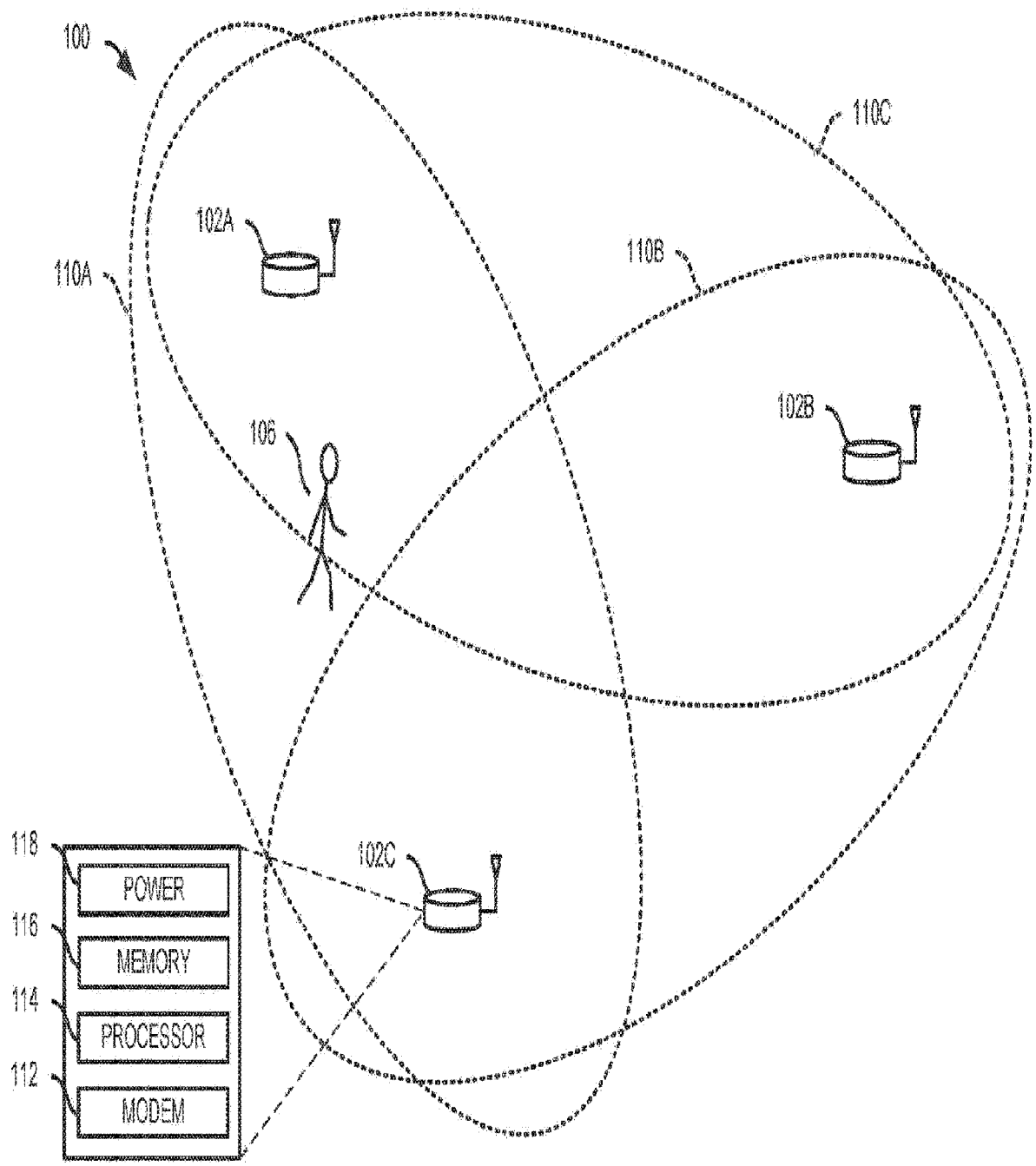
FIG. 1 is a diagram showing an example wireless communication system.

A Wi-Fi sensing system (also referred to as wireless sensing system) may measure an environment by transmitting signal(s) to remote device(s) and analyzing response(s) received from the remote device(s). The Wi-Fi sensing system may perform repeated measurements to analyze the environment and the changes thereof. The Wi-Fi sensing system may operate in conjunction with existing communication components, and benefits from having a Medium Access Control (MAC) layer entity, which may be used for the coordination of air-time resource usage among multiple devices based upon defined protocol.

One of the relevant standardization goals of the Wi-Fi sensing systems is to reduce additional overheads on existing Wi-Fi network, such that overlaying Wi-Fi sensing capability on the 802.11 network does not compromise the communication function of the network. Currently there are no known MAC protocols specifically defined for sensing in the Wi-Fi sensing systems. One aspect of sensing in the Wi-Fi sensing systems is a solicitation of a sensing transmission from a remote device. Improvements to MAC layer to enable solicitation of a sensing transmission from the remote device with characteristics that are optimized to allow the Wi-Fi sensing agent to detect presence, location and motion may significantly impact existing system performance. In particular, the request or solicitation of the remote device transmission optimized for sensing (or a sensing transmission) may impact an uplink scheduler of the remote device. There are existing mechanisms to request or solicit the remote device to transmit the sensing transmission. However, such mechanisms were designed for different purposes. As a result, these mechanisms are not efficient, offer no flexibility in control, and are not universally consistent among different vendor implementations. Furthermore, a channel sounding protocol may be considered for supporting Wi-Fi sensing. However, the channel sounding protocol is not currently flexible and thus, such functionality in support of Wi-Fi sensing is not possible.

Protocols for Wi-Fi systems are designed with decisions made on a basis of a data transfer mechanism as against sensing requirements. As a result, Wi-Fi sensing aspects are frequently not developed within common Wi-Fi systems. With respect to antenna beamforming in the Wi-Fi systems, digital signal processing directs a beam of high antenna gain in the direction of a transmitter or receiver for optimal data transfer purposes and as a result, the antenna pattern may not support or enhance sensing requirements.

In some aspects of what is described herein, a wireless sensing system may be used for a variety of wireless sensing applications by processing wireless signals (e.g., radio frequency signals) transmitted through a space between wireless communication devices. Example wireless sensing applications include motion detection, which can include the following: detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, human recognition, bike localization, human queue estimation, Wi-Fi imaging, and other types of wireless sensing applications. For instance, the wireless sensing system may operate as a motion detection system to detect the existence and location of motion based on Wi-Fi signals or other types of wireless signals. As described in more detail below, the wireless sensing system may be configured to control measurement rates, wireless connections and device participation, for example, to improve system operation or to achieve other technical advantages. The system improvements and technical advantages achieved when the wireless sensing system is used for motion detection are also achieved in examples where the wireless sensing system is used for another type of wireless sensing application.

In some example wireless sensing systems, a wireless signal includes a component (e.g., a synchronization preamble in a Wi-Fi PHY frame, or another type of component) that wireless devices can use to estimate a channel response or other channel information, and the wireless sensing system can detect motion (or another characteristic depending on the wireless sensing application) by analyzing changes in the channel information collected over time. In some examples, a wireless sensing system can operate like a bistatic radar system, where a Wi-Fi access-point (AP) assumes the receiver role, and each Wi-Fi device (station or node or peer) connected to the AP assume the transmitter role. The wireless sensing system may trigger a connected device to generate a transmission and produce a channel response measurement at a receiver device. This triggering process can be repeated periodically to obtain a sequence of time variant measurements. A wireless sensing algorithm may then receive the generated time-series of channel response measurements (e.g., computed by Wi-Fi receivers) as input, and through a correlation or filtering process, may then make a determination (e.g., determine if there is motion or no motion within the environment represented by the channel response, for example, based on changes or patterns in the channel estimations). In examples where the wireless sensing system detects motion, it may also be possible to identify a location of the motion within the environment based on motion detection results among a number of wireless devices.

Accordingly, wireless signals received at each of the wireless communication devices in a wireless communication network may be analyzed to determine channel information for the various communication links (between respective pairs of wireless communication devices) in the network. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at particular angles experience constructive interference while others experience destructive interference.

The channel information for each of the communication links may be analyzed (e.g., by a hub device or other device in a wireless communication network, or a remote device communicably coupled to the network) to, for example, detect whether motion has occurred in the space, to determine a relative location of the detected motion, or both. In some aspects, the channel information for each of the communication links may be analyzed to detect whether an object is present or absent, e.g., when no motion is detected in the space.

In some cases, a wireless sensing system can control a node measurement rate. For instance, a Wi-Fi motion system may configure variable measurement rates (e.g., channel estimation/environment measurement/sampling rates) based on criteria given by a current wireless sensing application (e.g., motion detection). In some implementations, when no motion is present or detected for a period of time, for example, the wireless sensing system can reduce the rate that the environment is measured, such that the connected device will be triggered less frequently. In some implementations, when motion is present, for example, the wireless sensing system can increase the triggering rate to produce a time-series of measurements with finer time resolution. Controlling the variable measurement rate can allow energy conservation (through the device triggering), reduce processing (less data to correlate or filter), and improve resolution during specified times.

In some cases, a wireless sensing system can perform band steering or client steering of nodes throughout a wireless network, for example, in a Wi-Fi multi-AP or Extended Service Set (ESS) topology, multiple coordinating wireless access-points (APs) each provide a Basic Service Set (BSS) which may occupy different frequency bands and allow devices to transparently move between from one participating AP to another (e.g., mesh). For instance, within a home mesh network, Wi-Fi devices can connect to any of the APs, but typically select one with a good signal strength. The coverage footprint of the mesh APs typically overlap, often putting each device within communication range or more than one AP. If the AP supports multi-bands (e.g., 2.4 GHz and 5 GHz), the wireless sensing system may keep a device connected to the same physical AP but instruct it to use a different frequency band to obtain more diverse information to help improve the accuracy or results of the wireless sensing algorithm (e.g., motion detection algorithm). In some implementations, the wireless sensing system can change a device from being connected to one mesh AP to being connected to another mesh AP. Such device steering can be performed, for example, during wireless sensing (e.g., motion detection), based on criteria detected in a specific area to improve detection coverage or to better localize motion within an area.

In some cases, beamforming may be performed between wireless communication devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. Thus, changes to the steering or feedback properties used in the beamforming process indicate changes, which may be caused by moving objects, in the space accessed by the wireless communication system. For example, motion may be detected by substantial changes in the communication channel, e.g., as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, many beamforming matrices (e.g., feedback matrices or steering matrices) may be generated to represent a multitude of directions that an object may be located relative to a wireless communication device. These many beamforming matrices may be used to generate the spatial map. The spatial map may be used to detect the presence of motion in the space or to detect a location of the detected motion.

In some instances, a motion detection system can control a variable device measurement rate in a motion detection process. For example, a feedback control system for a multi-node wireless motion detection system may adaptively change the sample rate based on the environment conditions. In some cases, such controls can improve operation of the motion detection system or provide other technical advantages. For example, the measurement rate may be controlled in a manner that optimizes or otherwise improves air-time usage versus detection ability suitable for a wide range of different environments and different motion detection applications. The measurement rate may be controlled in a manner that reduces redundant measurement data to be processed, thereby reducing processor load/power requirements. In some cases, the measurement rate is controlled in a manner that is adaptive, for instance, an adaptive sample can be controlled individually for each participating device. An adaptive sample rate can be used with a tuning control loop for different use cases, or device characteristics.

In some cases, a wireless sensing system can allow devices to dynamically indicate and communicate their wireless sensing capability or wireless sensing willingness to the wireless sensing system. For example, there may be times when a device does not want to be periodically interrupted or triggered to transmit a wireless signal that would allow the AP to produce a channel measurement. For instance, if a device is sleeping, frequently waking the device up to transmit or receive wireless sensing signals could consume resources (e.g., causing a cell-phone battery to discharge faster). These and other events could make a device willing or not willing to participate in wireless sensing system operations. In some cases, a cell phone running on its battery may not want to participate, but when the cell phone is plugged into the charger, it may be willing to participate. Accordingly, if the cell phone is unplugged, it may indicate to the wireless sensing system to exclude the cell phone from participating; whereas if the cell phone is plugged in, it may indicate to the wireless sensing system to include the cell phone in wireless sensing system operations. In some cases, if a device is under load (e.g., a device streaming audio or video) or busy performing a primary function, the device may not want to participate; whereas when the same device's load is reduced and participating will not interfere with a primary function, the device may indicate to the wireless sensing system that it is willing to participate.

Example wireless sensing systems are described below in the context of motion detection (detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications). However, the operation, system improvements, and technical advantages achieved when the wireless sensing system is operating as a motion detection system are also applicable in examples where the wireless sensing system is used for another type of wireless sensing application.

As disclosed in embodiments herein, a wireless local area network (WLAN) sensing procedure allows a station (STA) to perform WLAN sensing. WLAN sensing may include a WLAN sensing session. In examples, WLAN sensing procedure, WLAN sensing, and WLAN sensing session may be referred to as wireless sensing procedure, wireless sensing, and wireless sensing session, Wi-Fi sensing procedure, Wi-Fi sensing, and Wi-Fi sensing session, or sensing procedure, sensing, and sensing session.

WLAN sensing is a service that enables a STA to obtain sensing measurements of the channel(s) between two or more STAs and/or the channel between a receive antenna and a transmit antenna of a STA or an access point (AP). A WLAN sensing procedure may be composed of one or more of the following: sensing session setup, sensing measurement setup, sensing measurement instances, sensing measurement setup termination, and sensing session termination.

In examples disclosed herein, sensing session setup and sensing measurement setup may be referred to as sensing configuration and may be achieved by a sensing configuration message and may be confirmed by a sensing configuration response message. A sensing measurement instance may be an individual sensing measurement and may be derived from a sensing transmission. In examples, the sensing configuration message may be referred to as a sensing measurement setup request, and the sensing configuration response message may be referred to as a sensing measurement setup response.

A WLAN sensing procedure may include multiple sensing measurement instances. In examples, the multiple sensing measurement instances may be referred to a measurement campaign.

A sensing initiator may refer to a STA or an AP that initiates a WLAN sensing procedure. A sensing responder may refer to a STA or an AP that participates in a WLAN sensing procedure initiated by a sensing initiator. A sensing transmitter may refer to a STA or an AP that transmits physical-layer protocol data units (PPDU) used for sensing measurements in a WLAN sensing procedure. A sensing receiver may refer to a STA or an AP that receives PPDUs sent by a sensing transmitter and performs sensing measurements in a WLAN sensing procedure.

In examples, PPDU(s) used for a sensing measurement may be referred to as a sensing transmission.

A STA acting as a sensing initiator may participate in a sensing measurement instance as a sensing transmitter, a sensing receiver, both a sensing transmitter and sensing receiver, or neither a sensing transmitter nor a sensing receiver. A STA acting as a sensing responder may participate in a sensing measurement instance as a sensing transmitter, a sensing receiver, and both a sensing transmitter and a sensing receiver.

In an example, a sensing initiator may be considered to control the WLAN sensing procedure or the measurement campaign. The role of the sensing initiator may be taken on by a sensing device, a remote device, or a separate device which includes a sensing algorithm (for example, a sensing algorithm manager).

In examples, a sensing transmitter may be referred to as a remote device and a sensing receiver may be referred to as a sensing device. In other examples, a sensing initiator may be a function of a sensing device or of a remote device, and a sensing responder may be a function of a sensing device or of a remote device.

IEEE P802.11-REVmd/D5.0 considers a STA to be a physical (PHY) and media access controller (MAC) entity capable of supporting features defined by the specification. A device containing a STA may be referred to as a Wi-Fi device. A Wi-Fi device which manages a basic service set (BSS) (as defined by IEEE P802.11-REVmd/D5.0) may be referred to as an AP STA. A Wi-Fi device which is a client node in a BSS may be referred to as a non-AP STA. In some examples, an AP STA may be referred to as an AP and a non-AP STA may be referred to as a STA.

In various embodiments of the disclosure, non-limiting definitions of one or more terms that will be used in the document are provided below.

A term "measurement campaign" may refer to a bi-directional series of sensing transmissions between a sensing device (commonly known as wireless access-point, Wi-Fi access point, access point, sensing initiator, or sensing receiver) and one or more remote device (commonly known as Wi-Fi device, sensing responder, or sensing transmitter) that allows a series of sensing measurements to be computed.

A term "Channel State Information (CSI)" may refer to properties of a communications channel that are known or measured by a technique of channel estimation.

A term "training field" may refer to a sequence of bits transmitted by the sensing device which is known by the remote device and used on reception to measure channel for purposes other than demodulation of data portion of a containing a PHY-layer Protocol Data Unit (PPDU). In an example, the training field is included within a preamble of a transmitted PPDU. In some examples, a future training field may be defined within a preamble structure (cascading training fields with legacy support) or it may replace existing training fields (non-legacy support).

A term "uplink orthogonal frequency division multiple access (UL-OFDMA) sensing trigger message" may refer to a message from the sensing device to one or more remote devices to generate a sensing transmission in a single transmission opportunity (TXOP) using UL-OFDMA. The UL-OFMDA sensing trigger message includes data which instructs the one or more remote devices how to form sensing transmissions in response to the UL-OFMDA sensing trigger message.

A "multi user (MU) cascading sequence" may refer to a sequence of frames exchanged between the sensing device and the one or more remote devices in which the sensing device triggers multiple transmissions from one or more remote devices within a single TXOP.

A term "transmission opportunity (TXOP)" may refer to a negotiated interval of time during which the sensing device or the one or more remote devices may have the right to initiate a frame exchange onto a wireless medium. A TXOP is a feature of an IEEE 802.11 network which allows contention-free access to a channel for the duration of the TXOP. In some cases, a device that has been allocated the TXOP may transmit as many frames as can be accommodated in the TXOP according to the restrictions with which the TXOP was allocated. The TXOP is negotiated and allocated by a defined process that determines that the channel is available and able to accommodate the TXOP. A further feature of IEEE 802.11 allows the TXOP to be shared between multiple devices in the uplink direction (for example, from the one or more remote devices to the sensing device) using UL-OFDMA.

A term "Quality of Service (QoS) access category" may refer to an identifier for a frame which classifies a priority of transmission that the frame requires. In an example, four QoS access categories are defined namely AC_VI: Video, AC_VO: Voice, AC_BE: Best-Effort, and AC BK: Background. Further, each QoS access category may have differing transmission opportunity parameters defined for it.

A term "resource unit (RU)" may refer to an allocation of orthogonal frequency division multiplexing (OFDM) channels which may be used to carry a modulated signal. An RU may include a variable number of carriers depending on the mode of the modem.

A term "transmission parameters" may refer to a set of IEEE 802.11 PHY transmitter configuration parameters which are defined as part of transmission vector (TXVECTOR) corresponding to a specific PHY and which are configurable for each PPDU transmission.

A term "requested transmission configuration" may refer to requested transmission parameters of the remote device to be used when sending a sensing transmission. In an example, the requested transmission configuration may include one or more configuration elements, such as IEEE 802.11 Elements (IEEE 802.11md/D5.0, § 9.4.2).

A term "sensing configuration message" may refer to a configuration message that may be used to pre-configure sensing transmissions from the remote device to the sensing device, for example, for a measurement campaign.

A term "sensing configuration response message" may refer to a response message to a sensing configuration message that indicates which configuration options are supported by the remote device, for example, transmission capability of the remote device. In an example, the sensing configuration response message may be sent from the remote device to the sensing device in response to the sensing configuration message.

A term "delivered transmission configuration" may refer to transmission parameters applied by the remote device to a sensing transmission. In an example, delivered transmission configuration may include transmission parameters that are supported by the remote device.

A "feature of interest" may refer to an item or state of an item which is positively detected and/or identified by a sensing algorithm.

A term "measurement time jitter" may refer to an inaccuracy which is introduced either when a time of measurement of a sensing measurement is inaccurate or when there is no time of measurement available.

A term "sensing trigger message" may refer to a message sent from the sensing device to the remote device to trigger one or more sensing transmissions that may be used for performing sensing measurements. In examples, the term sensing trigger message may be referred to as sensing sounding trigger message or sensing sounding trigger frame.

A term "sensing transmission" may refer to any transmission made from the remote device to the sensing device which may be used to make a sensing measurement. In an example, sensing transmission may also be referred to as wireless sensing signal or wireless signal. In an example, the sensing transmission may be either a sensing response message or a sensing response NDP including one or more training fields used to make a sensing measurement.

A term "sensing response message" may refer to a message which is included within a sensing transmission from the remote device to the sensing device. In an example, the sensing transmission that includes the sensing response message may be used to perform a sensing measurement.

A term "sensing measurement" may refer to a measurement of a state of a channel e.g., CSI measurement between the remote device and the sensing device derived from a sensing transmission. In an example, sensing measurement may also be referred to as channel response measurement.

A term "sensing algorithm" may refer to a computational algorithm which achieves a sensing goal. The sensing algorithm may be executed by a Wi-Fi sensing agent and may execute on the sensing device or any other device in a Wi-Fi sensing system. In an example, the sensing algorithm may be required to perform a calculation (or a series of calculations) on sensing measurements to satisfy the sensing goal at a particular time.

A term "sensing goal" may refer to a goal of a sensing activity at a time. A sensing goal is not static and may change at any time. The sensing goal is determined by a Wi-Fi sensing agent. In an example, the sensing goal may require sensing measurements of a specific type, a specific format, or a specific precision, resolution, or accuracy to be available to the sensing algorithm.

A term "sensing space" may refer to any physical space in which a Wi-Fi sensing system may operate.

A term "steering matrix configuration" may refer to a matrix of complex values representing real and complex phase required to pre-condition antenna of a Radio Frequency (RF) transmission signal chain for each transmit signal. Application of the steering matrix configuration (for example, by a spatial mapper) enables beamforming and beam-steering.

A term "Wireless Local Area Network (WLAN) sensing session" may refer to a period during which objects in a physical space may be probed, detected and/or characterized. In an example, during a WLAN sensing session, several devices participate in, and thereby contribute to the generation of sensing measurements.

For purposes of reading the description of the various embodiments below, the following descriptions of the sections of the specifications and their respective contents may be helpful:

Section A describes a wireless communications system, wireless transmissions and sensing measurements which may be useful for practicing embodiments described herein.

Section B describes embodiments of systems and methods for Wi-Fi sensing. In particular, section B describes Wi-Fi systems to perform Wi-Fi sensing using uplink orthogonal frequency division multiple access (UL-OFDMA).

A. Wireless Communications System, Wireless Transmissions, and Sensing Measurements FIG. 1 illustrates wireless communication system 100. Wireless communication system 100 includes three wireless communication devices: first wireless communication device 102A, second wireless communication device 102B, and third wireless communication device 102C. Wireless communication system 100 may include additional wireless communication devices and other components (e.g., additional wireless communication devices, one or more network servers, network routers, network switches, cables, or other communication links, etc.).

Wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., Bluetooth®, Near Field Communication (NFC), ZigBee), millimeter wave communications, and others.

In some implementations, wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In the example shown in FIG. 1, wireless communication devices 102A, 102B, 102C can be, or they may include, standard wireless network components. For example, wireless communication devices 102A, 102B, 102C may be commercially available Wi-Fi access points or another type of wireless access point (WAP) performing one or more operations as described herein that are embedded as instructions (e.g., software or firmware) on the modem of the WAP. In some cases, wireless communication devices 102A, 102B, 102C may be nodes of a wireless mesh network, such as, for example, a commercially available mesh network system (e.g., Plume Wi-Fi, Google Wi-Fi, Qualcomm Wi-Fi SoN, etc.). In some cases, another type of standard or conventional Wi-Fi transmitter device may be used. In some instances, one or more of wireless communication devices 102A, 102B, 102C may be implemented as WAPs in a mesh network, while other wireless communication device(s) 102A, 102B, 102C are implemented as leaf devices (e.g., mobile devices, smart devices, etc.) that access the mesh network through one of the WAPs. In some cases, one or more of wireless communication devices 102A, 102B, 102C is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

Wireless communication devices 102A, 102B, 102C may be implemented without Wi-Fi components; for example, other types of standard or non-standard wireless communication may be used for motion detection. In some cases, wireless communication devices 102A, 102B, 102C can be, or they may be part of, a dedicated motion detection system. For example, the dedicated motion detection system can include a hub device and one or more beacon devices (as remote sensor devices), and wireless communication devices 102A, 102B, 102C can be either a hub device or a beacon device in the motion detection system.

As shown in FIG. 1, wireless communication device 102C includes modem 112, processor 114, memory 116, and power unit 118; any of wireless communication devices 102A, 102B, 102C in wireless communication system 100 may include the same, additional, or different components, and the components may be configured to operate as shown in FIG. 1 or in another manner. In some implementations, modem 112, processor 114, memory 116, and power unit 118 of a wireless communication device are housed together in a common housing or other assembly. In some implementations, one or more of the components of a wireless communication device can be housed separately, for example, in a separate housing or other assembly.

Modem 112 can communicate (receive, transmit, or both) wireless signals. For example, modem 112 may be configured to communicate radio frequency (RF) signals formatted according to a wireless communication standard (e.g., Wi-Fi or Bluetooth). Modem 112 may be implemented as the example wireless network modem 112 shown in FIG. 1, or may be implemented in another manner, for example, with other types of components or subsystems. In some implementations, modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in modem 112 can include one or more antennas and radio frequency circuitry. The radio frequency circuitry can include, for example, circuitry that filters, amplifies, or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in modem 112 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in modem 112 receives baseband signals from the baseband subsystem, up-converts the baseband signals to radio frequency (RF) signals, and wirelessly transmits the radio frequency signals (e.g., through an antenna). In some instances, the radio subsystem in modem 112 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of modem 112 can communicate wireless network traffic (e.g., data packets) in the wireless communication network through the radio subsystem on one or more network traffic channels. The baseband subsystem of modem 112 may also transmit or receive (or both) signals (e.g., motion probe signals or motion detection signals) through the radio subsystem on a dedicated wireless communication channel. In some instances, the baseband subsystem generates motion probe signals for transmission, for example, to probe a space for motion. In some instances, the baseband subsystem processes received motion detection signals (signals based on motion probe signals transmitted through the space), for example, to detect motion of an object in a space.

Processor 114 can execute instructions, for example, to generate output data based on data inputs. The instructions can include programs, codes, scripts, or other types of data stored in memory. Additionally, or alternatively, the instructions can be encoded as pre-programmed or re-programmable logic circuits, logic gates, or other types of hardware or firmware components. Processor 114 may be or include a general-purpose microprocessor, as a specialized co-processor or another type of data processing apparatus. In some cases, processor 114 performs high level operation of the wireless communication device 102C. For example, processor 114 may be configured to execute or interpret software, scripts, programs, functions, executables, or other instructions stored in memory 116. In some implementations, processor 114 may be included in modem 112.

Memory 116 can include computer-readable storage media, for example, a volatile memory device, a non-volatile memory device, or both. Memory 116 can include one or more read-only memory devices, random-access memory devices, buffer memory devices, or a combination of these and other types of memory devices. In some instances, one or more components of the memory can be integrated or otherwise associated with another component of wireless communication device 102C. Memory 116 may store instructions that are executable by processor 114. For example, the instructions may include instructions for time-aligning signals using an interference buffer and a motion detection buffer, such as through one or more of the operations of the example processes as described in any of FIG. 11, FIG. 19A, FIG. 19B, FIG. 19C, FIG. 20A, FIG. 20B, FIG. 20C, FIG. 20D and FIG. 21.

Power unit 118 provides power to the other components of wireless communication device 102C. For example, the other components may operate based on electrical power provided by power unit 118 through a voltage bus or other connection. In some implementations, power unit 118 includes a battery or a battery system, for example, a rechargeable battery. In some implementations, power unit 118 includes an adapter (e.g., an AC adapter) that receives an external power signal (from an external source) and coverts the external power signal to an internal power signal conditioned for a component of wireless communication device 102C. Power unit 118 may include other components or operate in another manner.

In the example shown in FIG. 1, wireless communication devices 102A, 102B transmit wireless signals (e.g., according to a wireless network standard, a motion detection protocol, or otherwise). For instance, wireless communication devices 102A, 102B may broadcast wireless motion probe signals (e.g., reference signals, beacon signals, status signals, etc.), or they may send wireless signals addressed to other devices (e.g., a user equipment, a client device, a server, etc.), and the other devices (not shown) as well as wireless communication device 102C may receive the wireless signals transmitted by wireless communication devices 102A, 102B. In some cases, the wireless signals transmitted by wireless communication devices 102A, 102B are repeated periodically, for example, according to a wireless communication standard or otherwise.

In the example shown, wireless communication device 102C processes the wireless signals from wireless communication devices 102A, 102B to detect motion of an object in a space accessed by the wireless signals, to determine a location of the detected motion, or both. For example, wireless communication device 102C may perform one or more operations of the example processes described below with respect to any of FIG. 11, FIG. 19A, FIG. 19B, FIG. 19C, FIG. 20A, FIG. 20B, FIG. 20C, FIG. 20D and FIG. 21, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that wireless communication device 102C can transmit wireless signals and wireless communication devices 102A, 102B can processes the wireless signals from wireless communication device 102C to detect motion or determine a location of detected motion.

The wireless signals used for motion detection can include, for example, a beacon signal (e.g., Bluetooth Beacons, Wi-Fi Beacons, other wireless beacon signals), another standard signal generated for other purposes according to a wireless network standard, or non-standard signals (e.g., random signals, reference signals, etc.) generated for motion detection or other purposes. In examples, motion detection may be carried out by analyzing one or more training fields carried by the wireless signals or by analyzing other data carried by the signal. In some examples data will be added for the express purpose of motion detection or the data used will nominally be for another purpose and reused or repurposed for motion detection. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, wireless communication device 102C may generate motion detection data. In some instances, wireless communication device 102C may communicate the motion detection data to another device or system, such as a security system, which may include a control center for monitoring movement within a space, such as a room, building, outdoor area, etc.

In some implementations, wireless communication devices 102A, 102B can be modified to transmit motion probe signals (which may include, e.g., a reference signal, beacon signal, or another signal used to probe a space for motion) on a separate wireless communication channel (e.g., a frequency channel or coded channel) from wireless network traffic signals. For example, the modulation applied to the payload of a motion probe signal and the type of data or data structure in the payload may be known by wireless communication device 102C, which may reduce the amount of processing that wireless communication device 102C performs for motion sensing. The header may include additional information such as, for example, an indication of whether motion was detected by another device in communication system 100, an indication of the modulation type, an identification of the device transmitting the signal, etc.

In the example shown in FIG. 1, wireless communication system 100 is a wireless mesh network, with wireless communication links between each of wireless communication devices 102. In the example shown, the wireless communication link between wireless communication device 102C and wireless communication device 102A can be used to probe motion detection field 110A, the wireless communication link between wireless communication device 102C and wireless communication device 102B can be used to probe motion detection field 110B, and the wireless communication link between wireless communication device 102A and wireless communication device 102B can be used to probe motion detection field 110C. In some instances, each wireless communication device 102 detects motion in motion detection fields 110 accessed by that device by processing received signals that are based on wireless signals transmitted by wireless communication devices 102 through motion detection fields 110. For example, when person 106 shown in FIG. 1 moves in motion detection field 110A and motion detection field 110C, wireless communication devices 102 may detect the motion based on signals they received that are based on wireless signals transmitted through respective motion detection fields 110. For instance, wireless communication device 102A can detect motion of person 106 in motion detection fields 110A, 110C, wireless communication device 102B can detect motion of person 106 in motion detection field 110C, and wireless communication device 102C can detect motion of person 106 in motion detection field 110A.

In some instances, motion detection fields 110 can include, for example, air, solid materials, liquids, or another medium through which wireless electromagnetic signals may propagate. In the example shown in FIG. 1, motion detection field 110A provides a wireless communication channel between wireless communication device 102A and wireless communication device 102C, motion detection field 110B provides a wireless communication channel between wireless communication device 102B and wireless communication device 102C, and motion detection field 110C provides a wireless communication channel between wireless communication device 102A and wireless communication device 102B. In some aspects of operation, wireless signals transmitted on a wireless communication channel (separate from or shared with the wireless communication channel for network traffic) are used to detect movement of an object in a space. The objects can be any type of static or moveable object and can be living or inanimate. For example, the object can be a human (e.g., person 106 shown in FIG. 1), an animal, an inorganic object, or another device, apparatus, or assembly), an object that defines all or part of the boundary of a space (e.g., a wall, door, window, etc.), or another type of object. In some implementations, motion information from the wireless communication devices may be analyzed to determine a location of the detected motion. For example, as described further below, one of wireless communication devices 102 (or another device communicably coupled to wireless communications devices 102) may determine that the detected motion is nearby a particular wireless communication device.

Figure 2A:
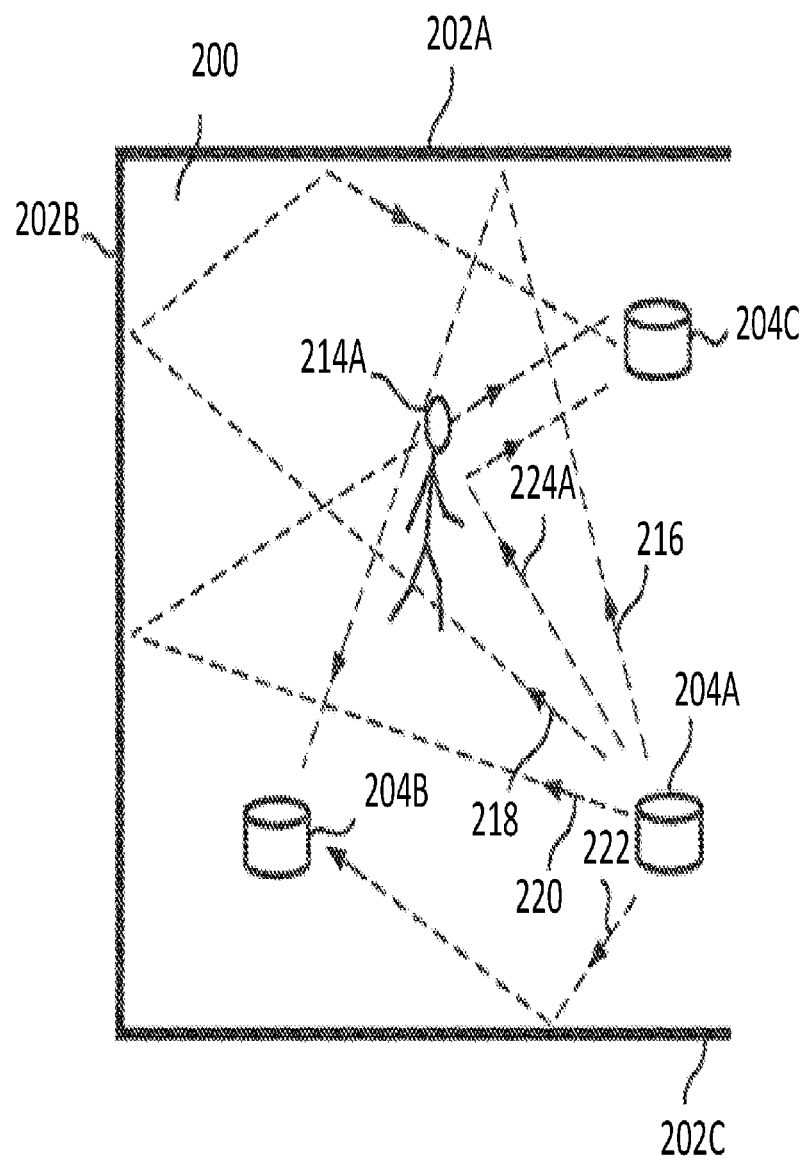
FIG. 2A and FIG. 2B are diagrams showing example wireless signals communicated between wireless communication devices.
Figure 2B:
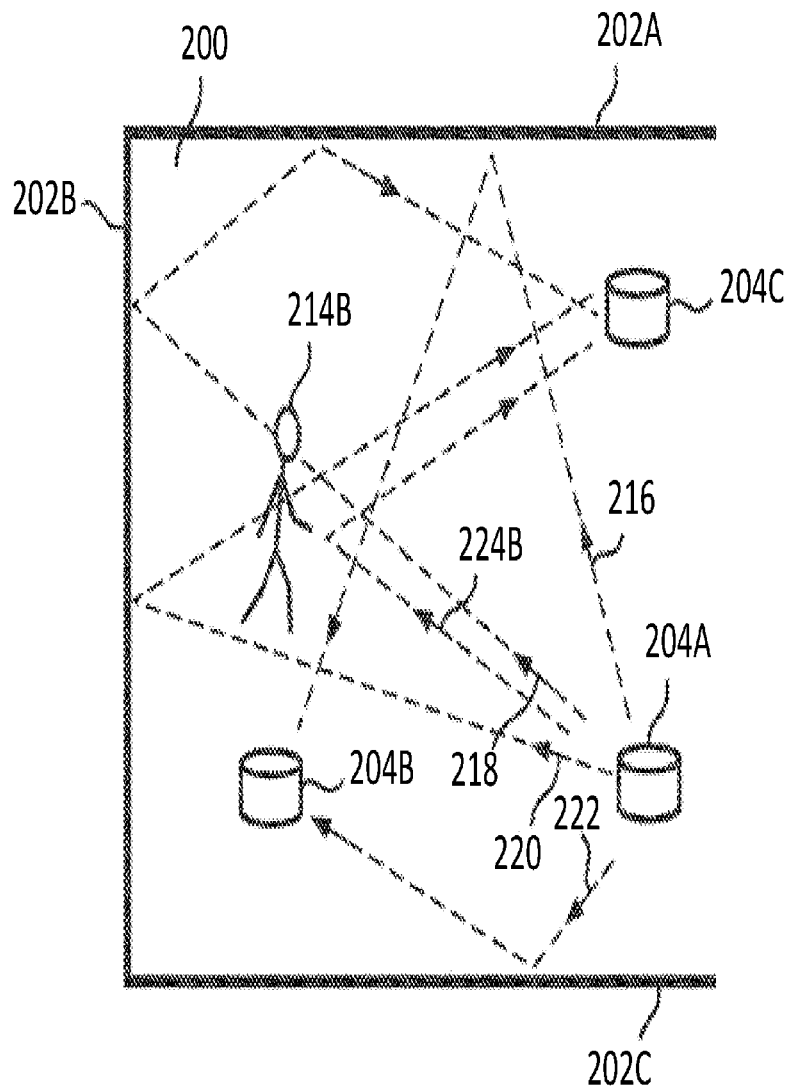

FIG. 2A and FIG. 2B are diagrams showing example wireless signals communicated between wireless communication devices 204A, 204B, 204C. Wireless communication devices 204A, 204B, 204C can be, for example, wireless communication devices 102A, 102B, 102C shown in FIG. 1, or other types of wireless communication devices. Wireless communication devices 204A, 204B, 204C transmit wireless signals through space 200. Space 200 can be completely or partially enclosed or open at one or more boundaries. In an example, space 200 may be a sensing space. Space 200 can be or can include an interior of a room, multiple rooms, a building, an indoor area, outdoor area, or the like. First wall 202A, second wall 202B, and third wall 202C at least partially enclose space 200 in the example shown.

In the example shown in FIG. 2A and FIG. 2B, wireless communication device 204A is operable to transmit wireless signals repeatedly (e.g., periodically, intermittently, at scheduled, unscheduled, or random intervals, etc.). Wireless communication devices 204B, 204C are operable to receive signals based on those transmitted by wireless communication device 204A. Wireless communication devices 204B, 204C each have a modem (e.g., modem 112 shown in FIG. 1) that is configured to process received signals to detect motion of an object in space 200.

As shown, an object is in first position 214A in FIG. 2A, and the object has moved to second position 214B in FIG. 2B. In FIG. 2A and FIG. 2B, the moving object in space 200 is represented as a human, but the moving object can be another type of object. For example, the moving object can be an animal, an inorganic object (e.g., a system, device, apparatus, or assembly), an object that defines all or part of the boundary of space 200 (e.g., a wall, door, window, etc.), or another type of object.

As shown in FIG. 2A and FIG. 2B, multiple example paths of the wireless signals transmitted from wireless communication device 204A are illustrated by dashed lines. Along first signal path 216, the wireless signal is transmitted from wireless communication device 204A and reflected off first wall 202A toward the wireless communication device 204B. Along second signal path 218, the wireless signal is transmitted from the wireless communication device 204A and reflected off second wall 202B and first wall 202A toward wireless communication device 204C. Along third signal path 220, the wireless signal is transmitted from the wireless communication device 204A and reflected off second wall 202B toward wireless communication device 204C. Along fourth signal path 222, the wireless signal is transmitted from the wireless communication device 204A and reflected off third wall 202C toward the wireless communication device 204B.

In FIG. 2A, along fifth signal path 224A, the wireless signal is transmitted from wireless communication device 204A and reflected off the object at first position 214A toward wireless communication device 204C. Between FIG. 2A and FIG. 2B, a surface of the object moves from first position 214A to second position 214B in space 200 (e.g., some distance away from first position 214A). In FIG. 2B, along sixth signal path 224B, the wireless signal is transmitted from wireless communication device 204A and reflected off the object at second position 214B toward wireless communication device 204C. Sixth signal path 224B depicted in FIG. 2B is longer than fifth signal path 224A depicted in FIG. 2A due to the movement of the object from first position 214A to second position 214B. In some examples, a signal path can be added, removed, or otherwise modified due to movement of an object in a space.

The example wireless signals shown in FIG. 2A and FIG. 2B may experience attenuation, frequency shifts, phase shifts, or other effects through their respective paths and may have portions that propagate in another direction, for example, through the first, second and third walls 202A, 202B, and 202C. In some examples, the wireless signals are radio frequency (RF) signals. The wireless signals may include other types of signals.

In the example shown in FIG. 2A and FIG. 2B, wireless communication device 204A can repeatedly transmit a wireless signal. In particular, FIG. 2A shows the wireless signal being transmitted from wireless communication device 204A at a first time, and FIG. 2B shows the same wireless signal being transmitted from wireless communication device 204A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from wireless communication device 204A in an omnidirectional manner, in a directional manner or otherwise. In the example shown, the wireless signals traverse multiple respective paths in space 200, and the signal along each path may become attenuated due to path losses, scattering, reflection, or the like and may have a phase or frequency offset.

As shown in FIG. 2A and FIG. 2B, the signals from first to sixth paths 216, 218, 220, 222, 224A, and 224B combine at wireless communication device 204C and wireless communication device 204B to form received signals. Because of the effects of the multiple paths in space 200 on the transmitted signal, space 200 may be represented as a transfer function (e.g., a filter) in which the transmitted signal is input and the received signal is output. When an object moves in space 200, the attenuation or phase offset affected upon a signal in a signal path can change, and hence, the transfer function of space 200 can change. Assuming the same wireless signal is transmitted from wireless communication device 204A, if the transfer function of space 200 changes, the output of that transfer function—the received signal—will also change. A change in the received signal can be used to detect movement of an object.

Mathematically, a transmitted signal f(t) transmitted from the first wireless communication device 204A may be described according to Equation (1):

$$f(t) = \sum_{n=-\infty}^{\infty} c_n e^{j\omega_n t} \quad (1)$$

Where $\omega_n$ represents the frequency of nth frequency component of the transmitted signal, $c_n$ represents the complex coefficient of the nth frequency component, and t represents time. With the transmitted signal f(t) being transmitted from the first wireless communication device 204A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \quad (2)$$

Where $a_{n,k}$ represents an attenuation factor (or channel response; e.g., due to scattering, reflection, and path losses) for the nth frequency component along path k, and $\phi_{n,k}$ represents the phase of the signal for nth frequency component along path k. Then, the received signal R at a wireless communication device can be described as the summation of all output signals $r_k(t)$ from all paths to the wireless communication device, which is shown in Equation (3):

$$R = \Sigma_k r_k(t) \quad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \quad (4)$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $H_n$ may be represented as follows in Equation (5):

$$H_n = \sum_k c_n \alpha_{n,k} e^{j\phi_{n,k}} \quad (5)$$

The complex value $H_n$ for a given frequency component $\omega_n$ indicates a relative magnitude and phase offset of the received signal at that frequency component $\omega_n$. When an object moves in the space, the complex value $H_n$ changes due to the channel response $\alpha_{n,k}$ of the space changing. Accordingly, a change detected in the channel response can be indicative of movement of an object within the communication channel. In some instances, noise, interference, or other phenomena can influence the channel response detected by the receiver, and the motion detection system can reduce or isolate such influences to improve the accuracy and quality of motion detection capabilities. In some implementations, the overall channel response can be represented as follows in Equation (6):

$$h_{ch}=\Sigma_k \Sigma_{n=-\infty}^{\infty} \alpha_{n,k} \qquad (6)$$

In some instances, the channel response ha, for a space can be determined, for example, based on the mathematical theory of estimation. For instance, a reference signal Ref can be modified with candidate channel responses ($h_{ch}$), and then a maximum likelihood approach can be used to select the candidate channel which gives best match to the received signal ($R_{cvd}$). In some cases, an estimated received signal ($\hat{R}_{cvd}$) is obtained from the convolution of the reference signal ($R_{ef}$) with the candidate channel responses ($h_{ch}$), and then the channel coefficients of the channel response ($h_{ch}$) are varied to minimize the squared error of the estimated received signal ($\hat{R}_{cvd}$). This can be mathematically illustrated as follows in Equation (7):

$$R_{cvd}=R_{ef} \otimes h_{ch}=\Sigma_{k=-m}^{m} R_{ef}(n-k)h_{ch}(k) \qquad (7)$$

with the optimization criterion $$\min_{h_{ch}} \sum (\hat{R}_{cvd} - R_{cvd})^2$$

The minimizing, or optimizing, process can utilize an adaptive filtering technique, such as Least Mean Squares (LMS), Recursive Least Squares (RLS), Batch Least Squares (BLS), etc. The channel response can be a Finite Impulse Response (FIR) filter, Infinite Impulse Response (IIR) filter, or the like. As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

Figure 3A:
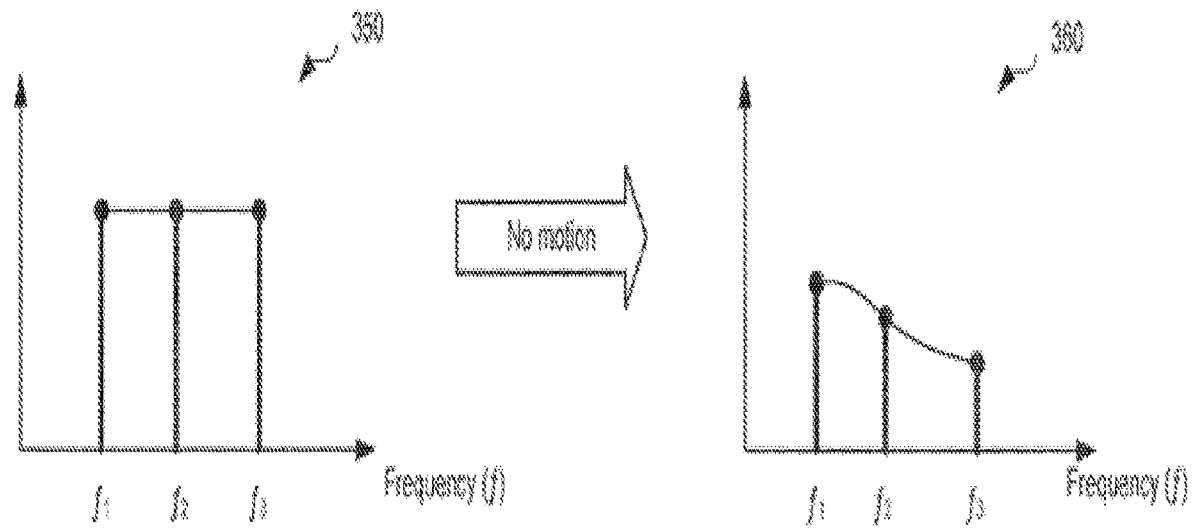
FIG. 3A and FIG. 3B are plots showing examples of channel responses computed from the wireless signals communicated between wireless communication devices in FIG. 2A and FIG. 2B.
Figure 3B:
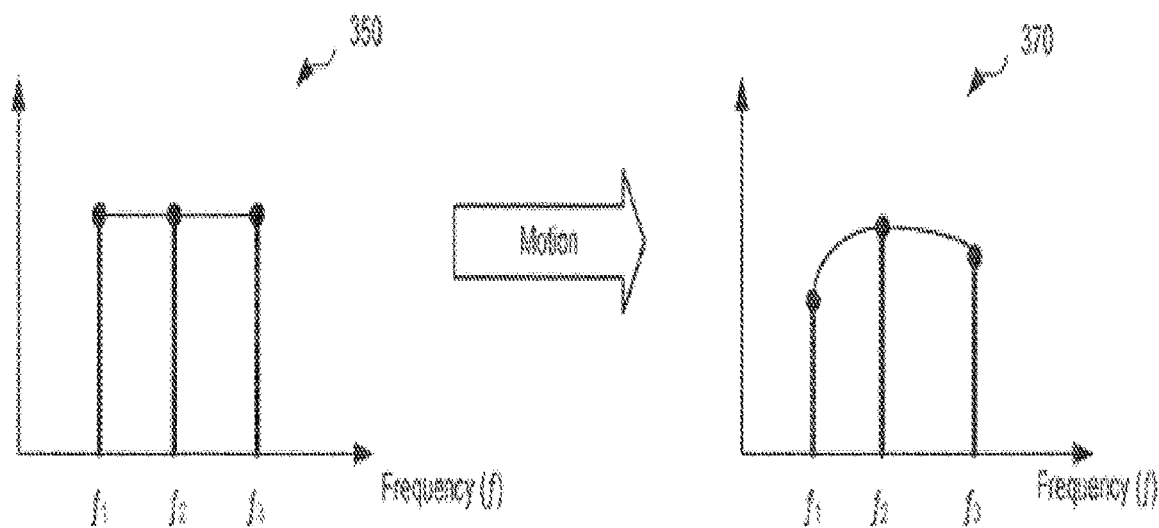

FIG. 3A and FIG. 3B are plots showing examples of channel response 360 and channel response 370 computed from the wireless signals communicated between wireless communication devices 204A, 204B, 204C in FIG. 2A and FIG. 2B. FIG. 3A and FIG. 3B also show frequency domain representation 350 of an initial wireless signal transmitted by wireless communication device 204A. In the examples shown, channel response 360 in FIG. 3A represents the signals received by wireless communication device 204B when there is no motion in space 200, and channel response 370 in FIG. 3B represents the signals received by wireless communication device 204B in FIG. 2B after the object has moved in space 200.

In the example shown in FIG. 3A and FIG. 3B, for illustration purposes, wireless communication device 204A transmits a signal that has a flat frequency profile (the magnitude of each frequency component $f_1$, $f_2$, and $f_3$ is the same), as shown in frequency domain representation 350. Because of the interaction of the signal with space 200 (and the objects therein), the signals received at wireless communication device 204B that are based on the signal sent from wireless communication device 204A are different from the transmitted signal. In this example, where the transmitted signal has a flat frequency profile, the received signal represents the channel response of space 200. As shown in FIG. 3A and FIG. 3B, channel response 360 and channel response 370 are different from frequency domain representation 350 of the transmitted signal. When motion occurs in space 200, a variation in the channel response will also occur. For example, as shown in FIG. 3B, channel response 370 that is associated with motion of object in space 200 varies from channel response 360 that is associated with no motion in space 200.

Furthermore, as an object moves within space 200, the channel response may vary from channel response 370. In some cases, space 200 can be divided into distinct regions and the channel responses associated with each region may share one or more characteristics (e.g., shape), as described below. Thus, motion of an object within different distinct regions can be distinguished, and the location of detected motion can be determined based on an analysis of channel responses.

Figure 4A:
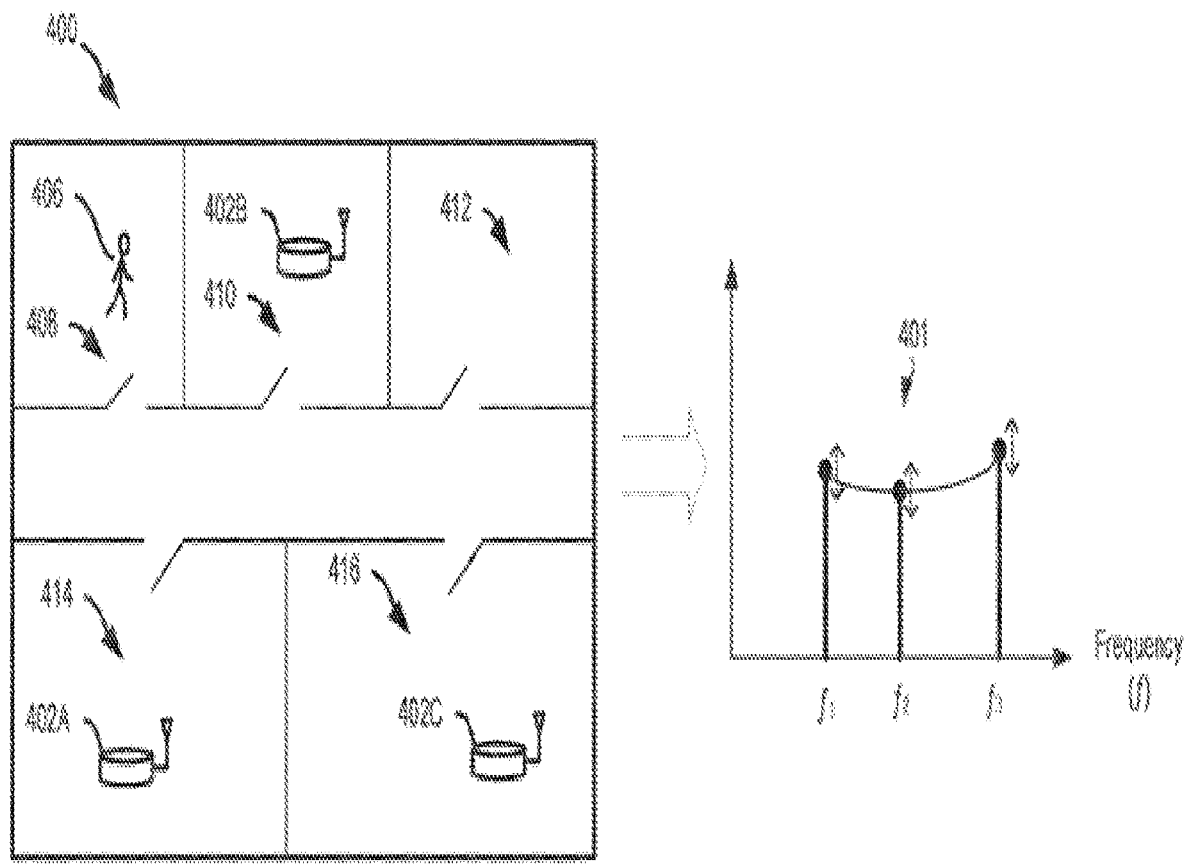
FIG. 4A and FIG. 4B are diagrams showing example channel responses associated with motion of an object in distinct regions of a space.
Figure 4B:
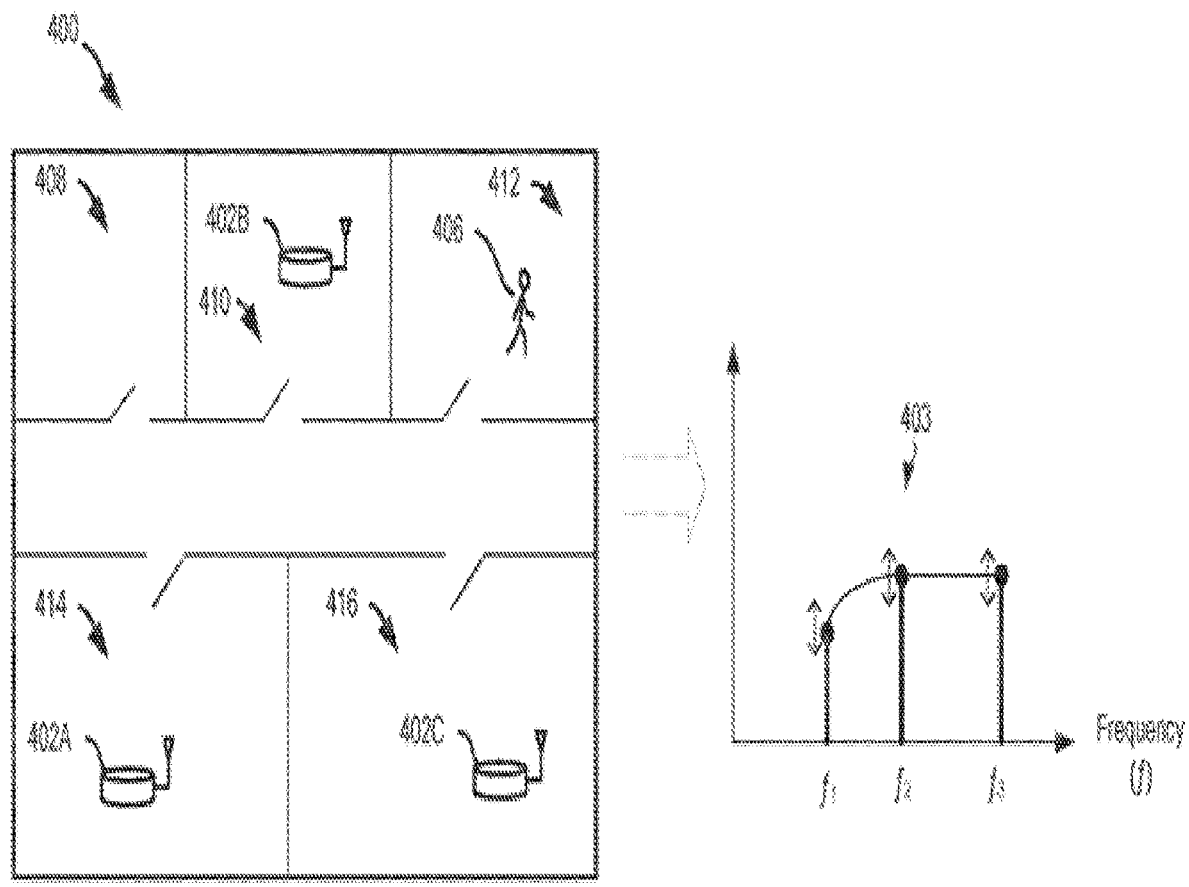

FIG. 4A and FIG. 4B are diagrams showing example channel response 401 and channel response 403 associated with motion of object 406 in distinct regions, first region 408 and third region 412 of space 400. In the examples shown, space 400 is a building, and space 400 is divided into a plurality of distinct regions—first region 408, second region 410, third region 412, fourth region 414, and fifth region 416. Space 400 may include additional or fewer regions, in some instances. As shown in FIG. 4A and FIG. 4B, the regions within space 400 may be defined by walls between rooms. In addition, the regions may be defined by ceilings between floors of a building. For example, space 400 may include additional floors with additional rooms. In addition, in some instances, the plurality of regions of a space can be or include a number of floors in a multistory building, a number of rooms in the building, or a number of rooms on a particular floor of the building. In the example shown in FIG. 4A, an object located in first region 408 is represented as person 406, but the moving object can be another type of object, such as an animal or an inorganic object.

In the example shown, wireless communication device 402A is located in fourth region 414 of space 400, wireless communication device 402B is located in second region 410 of space 400, and wireless communication device 402C is located in fifth region 416 of space 400. Wireless communication devices 402 can operate in the same or similar manner as wireless communication devices 102 of FIG. 1. For instance, wireless communication devices 402 may be configured to transmit and receive wireless signals and detect whether motion has occurred in space 400 based on the received signals. As an example, wireless communication devices 402 may periodically or repeatedly transmit motion probe signals through space 400, and receive signals based on the motion probe signals. Wireless communication devices 402 can analyze the received signals to detect whether an object has moved in space 400, such as, for example, by analyzing channel responses associated with space 400 based on the received signals. In addition, in some implementations, wireless communication devices 402 can analyze the received signals to identify a location of detected motion within space 400. For example, wireless communication devices 402 can analyze characteristics of the channel response to determine whether the channel responses share the same or similar characteristics to channel responses known to be associated with first to fifth regions 408, 410, 412, 414, 416 of space 400.

In the examples shown, one (or more) of wireless communication devices 402 repeatedly transmits a motion probe signal (e.g., a reference signal) through space 400. The motion probe signals may have a flat frequency profile in some instances, wherein the magnitude of $f_1$, $f_2$, and $f_3$ is the same or nearly the same. For example, the motion probe signals may have a frequency response similar to frequency domain representation 350 shown in FIGS. 3A-3B. The motion probe signals may have a different frequency profile in some instances. Because of the interaction of the reference signal with space 400 (and the objects therein), the signals received at another wireless communication device 402 that are based on the motion probe signal transmitted from the other wireless communication device 402 are different from the transmitted reference signal.

Based on the received signals, wireless communication devices 402 can determine a channel response for space 400. When motion occurs in distinct regions within the space, distinct characteristics may be seen in the channel responses. For example, while the channel responses may differ slightly for motion within the same region of space 400, the channel responses associated with motion in distinct regions may generally share the same shape or other characteristics. For instance, channel response 401 of FIG. 4A represents an example channel response associated with motion of object 406 in first region 408 of space 400, while channel response 403 of FIG. 4B represents an example channel response associated with motion of object 406 in third region 412 of space 400. Channel response 401 and channel response 403 are associated with signals received by the same wireless communication device 402 in space 400.

Figure 4C:
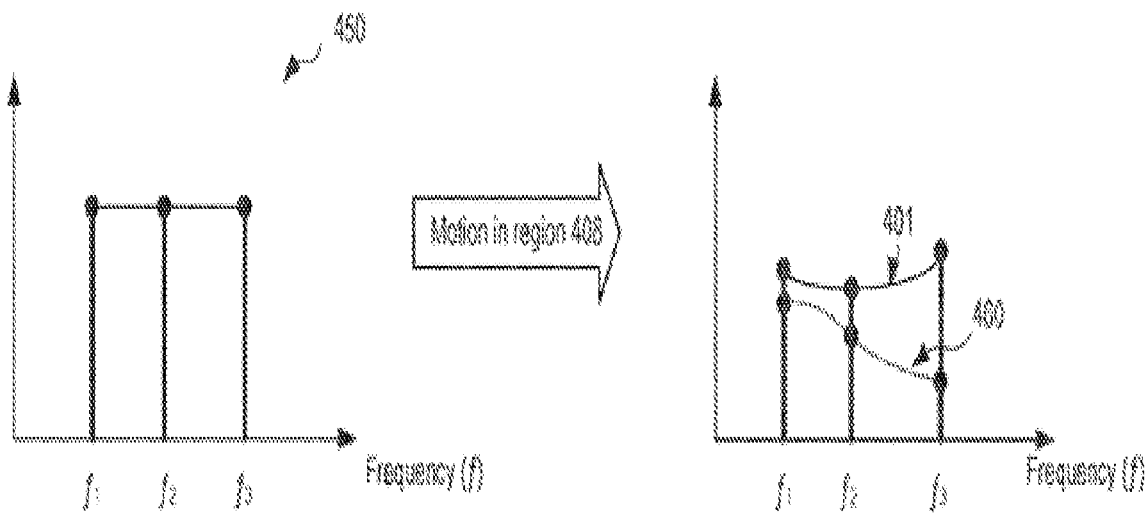
FIG. 4C and FIG. 4D are plots showing the example channel responses of FIG. 4A and FIG. 4B overlaid on an example channel response associated with no motion occurring in the space.
Figure 4D:
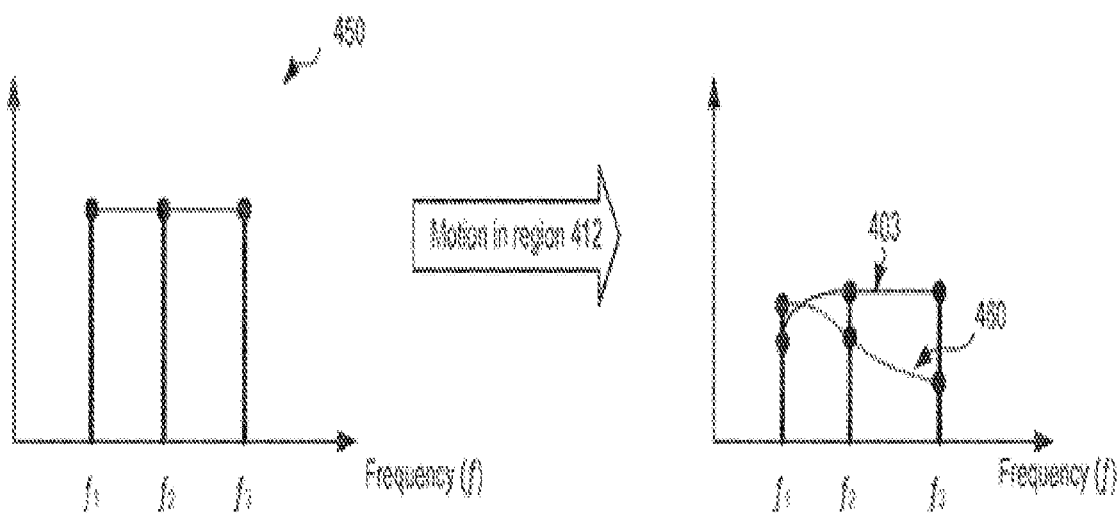

FIG. 4C and FIG. 4D are plots showing channel response 401 and channel response 403 of FIG. 4A and FIG. 4B overlaid on channel response 460 associated with no motion occurring in space 400. In the example shown, wireless communication device 402 transmits a motion probe signal that has a flat frequency profile as shown in frequency domain representation 450. When motion occurs in space 400, a variation in the channel response will occur relative to channel response 460 associated with no motion, and thus, motion of an object in space 400 can be detected by analyzing variations in the channel responses. In addition, a relative location of the detected motion within space 400 can be identified. For example, the shape of channel responses associated with motion can be compared with reference information (e.g., using a trained AI model) to categorize the motion as having occurred within a distinct region of space 400.

When there is no motion in space 400 (e.g., when object 406 is not present), wireless communication device 402 may compute channel response 460 associated with no motion. Slight variations may occur in the channel response due to a number of factors; however, multiple channel responses 460 associated with different periods of time may share one or more characteristics. In the example shown, channel response 460 associated with no motion has a decreasing frequency profile (the magnitude of each frequency component $f_1$, $f_2$, and $f_3$ is less than the previous). The profile of channel response 460 may differ in some instances (e.g., based on different room layouts or placement of wireless communication devices 402).

When motion occurs in space 400, a variation in the channel response will occur. For instance, in the examples shown in FIG. 4C and FIG. 4D, channel response 401 associated with motion of object 406 in first region 408 differs from channel response 460 associated with no motion and channel response 403 associated with motion of object 406 in third region 412 differs from channel response 460 associated with no motion. Channel response 401 has a concave-parabolic frequency profile (the magnitude of the middle frequency component $f_1$ is less than the outer frequency components $f_1$ and $f_3$), while channel response 403 has a convex-asymptotic frequency profile (the magnitude of the middle frequency component $f_1$ is greater than the outer frequency components $f_1$ and $f_3$). The profiles of channel responses 401, 403 may differ in some instances (e.g., based on different room layouts or placement of the wireless communication devices 402).

Analyzing channel responses may be considered similar to analyzing a digital filter. A channel response may be formed through the reflections of objects in a space as well as reflections created by a moving or static human. When a reflector (e.g., a human) moves, it changes the channel response. This may translate to a change in equivalent taps of a digital filter, which can be thought of as having poles and zeros (poles amplify the frequency components of a channel response and appear as peaks or high points in the response, while zeros attenuate the frequency components of a channel response and appear as troughs, low points, or nulls in the response). A changing digital filter can be characterized by the locations of its peaks and troughs, and a channel response may be characterized similarly by its peaks and troughs. For example, in some implementations, analyzing nulls and peaks in the frequency components of a channel response (e.g., by marking their location on the frequency axis and their magnitude), motion can be detected.

In some implementations, a time series aggregation can be used to detect motion. A time series aggregation may be performed by observing the features of a channel response over a moving window and aggregating the windowed result by using statistical measures (e.g., mean, variance, principal components, etc.). During instances of motion, the characteristic digital-filter features would be displaced in location and flip-flop between some values due to the continuous change in the scattering scene. That is, an equivalent digital filter exhibits a range of values for its peaks and nulls (due to the motion). By looking this range of values, unique profiles (in examples profiles may also be referred to as signatures) may be identified for distinct regions within a space.

In some implementations, an artificial intelligence (AI) model may be used to process data. AI models may be of a variety of types, for example linear regression models, logistic regression models, linear discriminant analysis models, decision tree models, naïve bayes models, K-nearest neighbors models, learning vector quantization models, support vector machines, bagging and random forest models, and deep neural networks. In general, all AI models aim to learn a function which provides the most precise correlation between input values and output values and are trained using historic sets of inputs and outputs that are known to be correlated. In examples, artificial intelligence may also be referred to as machine learning.

In some implementations, the profiles of the channel responses associated with motion in distinct regions of space 400 can be learned. For example, machine learning may be used to categorize channel response characteristics with motion of an object within distinct regions of a space. In some cases, a user associated with wireless communication devices 402 (e.g., an owner or other occupier of space 400)

can assist with the learning process. For instance, referring to the examples shown in FIG. 4A and FIG. 4B, the user can move in each of first to fifth regions 408, 410, 412, 414, 416 during a learning phase and may indicate (e.g., through a user interface on a mobile computing device) that he/she is moving in one of the particular regions in space 400. For example, while the user is moving through first region 408 (e.g., as shown in FIG. 4A) the user may indicate on a mobile computing device that he/she is in first region 408 (and may name the region as "bedroom", "living room", "kitchen", or another type of room of a building, as appropriate). Channel responses may be obtained as the user moves through the region, and the channel responses may be "tagged" with the user's indicated location (region). The user may repeat the same process for the other regions of space 400. The term "tagged" as used herein may refer to marking and identifying channel responses with the user's indicated location or any other information.

The tagged channel responses can then be processed (e.g., by machine learning software) to identify unique characteristics of the channel responses associated with motion in the distinct regions. Once identified, the identified unique characteristics may be used to determine a location of detected motion for newly computed channel responses. For example, an AI model may be trained using the tagged channel responses, and once trained, newly computed channel responses can be input to the AI model, and the AI model can output a location of the detected motion. For example, in some cases, mean, range, and absolute values are input to an AI model. In some instances, magnitude and phase of the complex channel response itself may be input as well. These values allow the AI model to design arbitrary front-end filters to pick up the features that are most relevant to making accurate predictions with respect to motion in distinct regions of a space. In some implementations, the AI model is trained by performing a stochastic gradient descent. For instance, channel response variations that are most active during a certain zone may be monitored during the training, and the specific channel variations may be weighted heavily (by training and adapting the weights in the first layer to correlate with those shapes, trends, etc.). The weighted channel variations may be used to create a metric that activates when a user is present in a certain region.

For extracted features like channel response nulls and peaks, a time-series (of the nulls/peaks) may be created using an aggregation within a moving window, taking a snapshot of few features in the past and present, and using that aggregated value as input to the network. Thus, the network, while adapting its weights, will be trying to aggregate values in a certain region to cluster them, which can be done by creating a logistic classifier based decision surfaces. The decision surfaces divide different clusters and subsequent layers can form categories based on a single cluster or a combination of clusters.

In some implementations, an AI model includes two or more layers of inference. The first layer acts as a logistic classifier which can divide different concentration of values into separate clusters, while the second layer combines some of these clusters together to create a category for a distinct region. Additional, subsequent layers can help in extending the distinct regions over more than two categories of clusters. For example, a fully-connected AI model may include an input layer corresponding to the number of features tracked, a middle layer corresponding to the number of effective clusters (through iterating between choices), and a final layer corresponding to different regions. Where complete channel response information is input to the AI model, the first layer may act as a shape filter that can correlate certain shapes. Thus, the first layer may lock to a certain shape, the second layer may generate a measure of variation happening in those shapes, and third and subsequent layers may create a combination of those variations and map them to different regions within the space. The output of different layers may then be combined through a fusing layer.

B. Systems and Methods for Wi-Fi Sensing Using Uplink-Orthogonal Frequency Division Multiple Access (UL-OFDMA)

The present disclosure generally relates to systems and methods for Wi-Fi sensing. In particular, the present disclosure relates to configuring Wi-Fi systems to perform Wi-Fi sensing using uplink orthogonal frequency division multiple access (UL-OFDMA).

The system and method of the present disclosure leverage a sensing device that may be configured to control a measurement campaign. In an implementation, the system and the method also leverage one or more remote devices. The one or more remote devices may be configured to make sensing transmissions and the sensing device may be configured to compute sensing measurements based on the sensing transmissions. In an implementation, the sensing measurements may be further processed for the purpose of achieving the objectives of the measurement campaign. According to an implementation, the sensing device may provide a sensing agent which may use channel resources in different ways to probe a sensing space in which the system is deployed. The different ways may be considered different modes of operation of the sensing agent and the selection of the mode of operation is made based on the requirements of the sensing agent at a particular time. Each mode of operation delivers appropriate sensing measurements with an efficient use of available channel resources.

According to an implementation, the sensing device may initiate a WLAN sensing session and the one or more remote devices may participate in the WLAN session initiated by the sensing device. In some implementations, the one or more remote devices may transmit PPDUs which are used for sensing measurements in the WLAN sensing session. In an implementation, the sensing device may receive the PPDUs in the WLAN sensing session and process the PPDUs into the sensing measurements.

Figure 5:
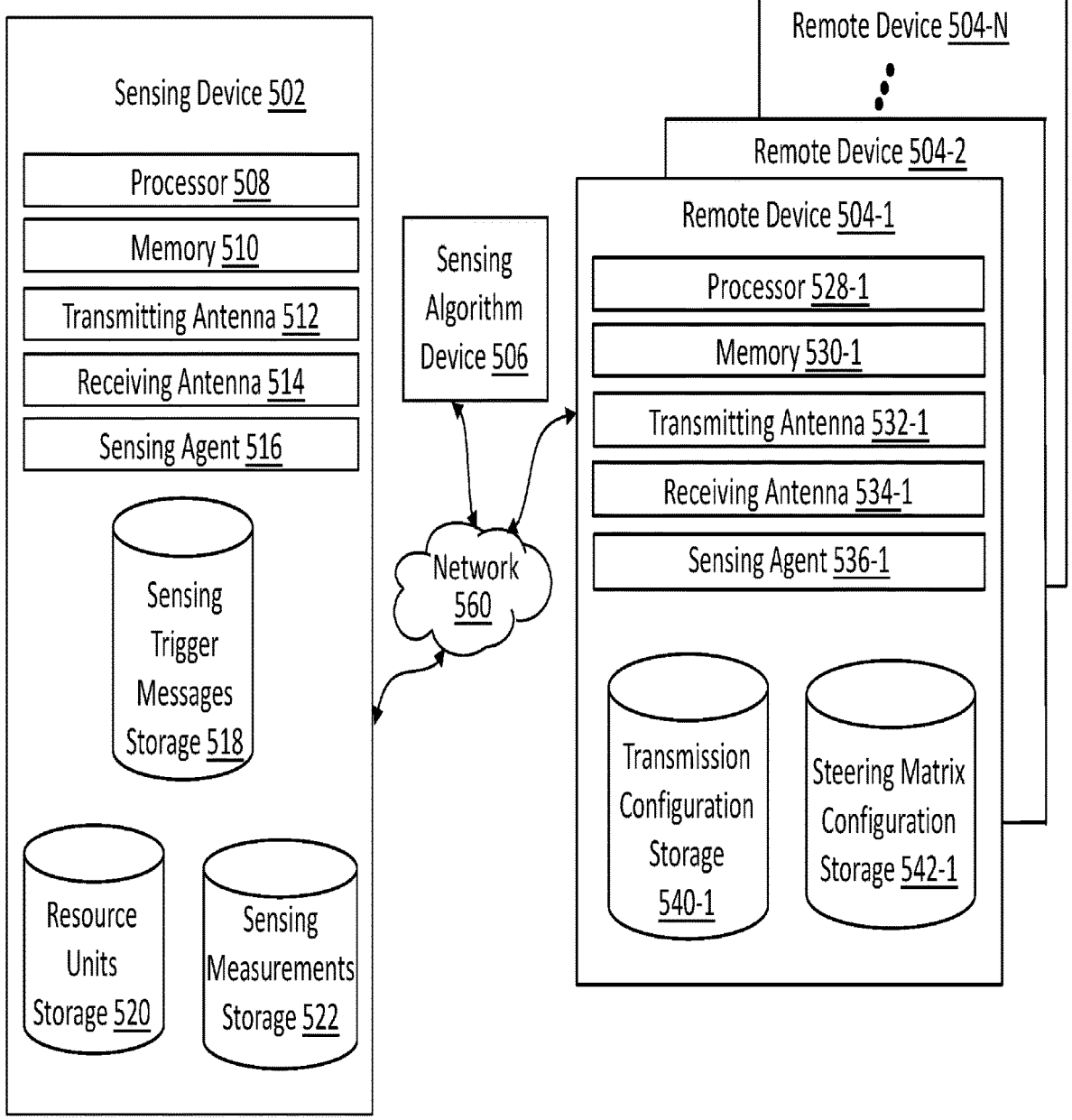
FIG. 5 depicts an implementation of some of an architecture of an implementation of a system for Wi-Fi sensing, according to some embodiments.

FIG. 5 depicts some of an architecture of an implementation of system 500 for Wi-Fi sensing, according to some embodiments.

System 500 (alternatively referred to as Wi-Fi sensing system 500) may include sensing device 502, plurality of remote devices 504-(1-N), sensing algorithm device 506, and network 560 enabling communication between the system components for information exchange. System 500 may be an example or instance of wireless communication system 100 and network 560 may be an example or instance of wireless network or cellular network, details of which are provided with reference to FIG. 1 and its accompanying description.

According to some embodiments, sensing device 502 may be configured to receive a sensing transmission and perform one or more measurements (for example, CSI) useful for Wi-Fi sensing. These measurements may be known as sensing measurements. The sensing measurements may be processed to achieve a sensing goal of system 500. In an embodiment, sensing device 502 may be an Access Point (AP). In some embodiments, sensing device 502 may be a Station (STA), for example, in a mesh network scenario. According to an implementation, sensing device 502 may be implemented by a device, such as wireless communication device 102 shown in FIG. 1. In some implementations, sensing device 502 may be implemented by a device, such as wireless communication device 204 shown in FIG. 2A and FIG. 2B. Further, sensing device 502 may be implemented by a device, such as wireless communication device 402 shown in FIG. 4A and FIG. 4B. In an implementation, sensing device 502 may coordinate and control communication among plurality of remote devices 504-(1-N). According to an implementation, sensing device 502 may be enabled to control a measurement campaign to ensure that required sensing transmissions are made at a required time and to ensure an accurate determination of sensing measurement. In some embodiments, sensing device 502 may process sensing measurements to achieve the sensing goal of system 500. In some embodiments, sensing device 502 may be configured to transmit sensing measurements to sensing algorithm device 506 and sensing algorithm device 506 may be configured to process the sensing measurements to achieve the sensing goal of system 500.

Referring again to FIG. 5, in some embodiments, remote device 504-1 may be configured to send a sensing transmission to sensing device 502 based on which, one or more sensing measurements (for example, CSI) may be performed for Wi-Fi sensing. In an embodiment, remote device 504-1 may be an STA. In some embodiments, remote device 504-1 may be an AP for Wi-Fi sensing, for example, in scenarios where sensing device 502 acts as STA. According to an implementation, remote device 504-1 may be implemented by a device, such as wireless communication device 102 shown in FIG. 1. In some implementations, remote device 504-1 may be implemented by a device, such as wireless communication device 204 shown in FIG. 2A and FIG. 2B. Further, remote device 504-1 may be implemented by a device, such as wireless communication device 402 shown in FIG. 4A and FIG. 4B. In some implementations, communication between sensing device 502 and remote device 504-1 may be controlled via Station Management Entity (SME) and MAC Layer Management Entity (MLME) protocols. According to an embodiment, each of plurality of remote device 504-(1-N) may be configured to send a sensing transmission to sensing device 502.

In some embodiments, sensing algorithm device 506 may be configured to receive sensing measurements from sensing device 502 and process the sensing measurements. In an example, sensing algorithm device 506 may process and analyze the sensing measurements to identify one or more features of interest. According to some implementations, sensing algorithm device 506 may include/execute a sensing algorithm. In an embodiment, sensing algorithm device 506 may be an STA. In some embodiments, sensing algorithm device 506 may be an AP. According to an implementation, sensing algorithm device 506 may be implemented by a device, such as wireless communication device 102 shown in FIG. 1. In some implementations, sensing algorithm device 506 may be implemented by a device, such as wireless communication device 204 shown in FIG. 2A and FIG. 2B. Further, sensing algorithm device 506 may be implemented by a device, such as wireless communication device 402 shown in FIG. 4A and FIG. 4B. In some embodiments, sensing algorithm device 506 may be any computing device, such as a desktop computer, a laptop, a tablet computer, a mobile device, a Personal Digital Assistant (PDA) or any other computing device. In embodiments, sensing algorithm device 506 may take a role of sensing initiator where a sensing algorithm determines a measurement campaign and the sensing measurements required to fulfill the measurement campaign. Sensing algorithm device 506 may communicate the sensing measurements required to fulfill the measurement campaign to sensing device 502 to coordinate and control communication among plurality of remote devices 504-(1-N).

Referring to FIG. 5, in more detail, sensing device 502 may include processor 508 and memory 510. For example, processor 508 and memory 510 of sensing device 502 may be processor 114 and memory 116, respectively, as shown in FIG. 1. In an embodiment, sensing device 502 may further include transmitting antenna(s) 512, receiving antenna(s) 514, and sensing agent 516. In some embodiments, an antenna may be used to both transmit and receive signals in a half-duplex format. When the antenna is transmitting, it may be referred to as transmitting antenna 512 and when the antenna is receiving, it may be referred to as receiving antenna 514. It is understood by a person of normal skill in the art that the same antenna may be transmitting antenna 512 in some instances and receiving antenna 514 in other instances. In the case of an antenna array, one or more antenna elements may be used to transmit or receive a signal, for example, in a beamforming environment. In some examples, a group of antenna elements used to transmit a composite signal may be referred to as transmitting antenna 512 and a group of antenna elements used to receive a composite signal may be referred to as receiving antenna 514. In some examples, each antenna is equipped with its own transmission and receive paths, which may be alternately switched to connect to the antenna depending on whether the antenna is operating as transmitting antenna 512 or receiving antenna 514.

In an implementation sensing agent 516 may be responsible for receiving sensing transmissions and associated transmission parameters, calculating sensing measurements, and processing sensing measurements to fulfill a sensing goal. In some implementations, receiving sensing transmissions and associated transmission parameters, and calculating sensing measurements may be carried out by an algorithm running in the Medium Access Control (MAC) layer of sensing device 502 and processing sensing measurements in to fulfill a sensing goal may be carried out by an algorithm running in the application layer of sensing device 502. In examples, the algorithm running in the application layer of sensing device 502 is known as Wi-Fi sensing agent, sensing application or sensing algorithm. In some implementations, the algorithm running in the MAC layer of sensing device 502 and the algorithm running in the application layer of sensing device 502 may run separately on a processor 508. In an implementation, sensing agent 516 may pass physical layer parameters (e.g., such as CSI) from the MAC layer of sensing device 502 to the application layer of sensing device 502, and may use the physical layer parameters to detect one or more features of interest. In an example, the application layer may operate on the physical layer parameters and form services or features, which may be presented to an end-user. According to an implementation, communication between the MAC layer of sensing device 502 and other layers or components may take place based on communication interfaces, such as MLME interface and a data interface. According to some implementations, sensing agent 516 may include/execute a sensing algorithm. In an implementation, sensing agent 516 may process and analyze sensing measurements using the sensing algorithm, and identify one or more features of interest. Further, sensing agent 516 may be configured to determine a number and timing of sensing transmissions and sensing measurements for the purpose of Wi-Fi sensing. In some implementations, sensing agent 516 may be configured to transmit sensing measurements to sensing algorithm device 506 for further processing.

In an implementation, sensing agent 516 may be configured to cause at least one transmitting antenna of transmitting antenna(s) 512 to transmit messages to remote device 504-1. Further, sensing agent 516 may be configured to receive, via at least one receiving antenna of receiving antennas(s) 514, messages from remote device 504-1. In an example, sensing agent 516 may be configured to make sensing measurements based on sensing transmissions received from remote device 504-1. According to an implementation, sensing agent 516 may be configured to process and analyze the sensing measurements to identify one or more features of interest. In some embodiments, sensing agent 516 may have multiple modes of operation or states that it executes when monitoring a sensing space to detect relevant features of interest.

In some embodiments, sensing device 502 may include sensing trigger messages storage 518, resource units storage 520, and sensing measurements storage 522. In an implementation, sensing trigger messages storage 518 may store sensing trigger messages transmitted by sensing device 502 to plurality of remote devices 504-(1-N). According to an implementation, resource units storage 520 may store resource units (RUs) to be allocated to plurality of remote devices 504-(1-N). In an implementation, sensing measurements storage 522 may store sensing measurements computed by sensing device 502 based on sensing transmissions. Information related to the sensing trigger messages stored in sensing trigger messages storage 518, information related to RUs to be allocated to plurality of remote devices 504-(1-N) stored in resource units storage 520, and information related to the sensing measurements stored in sensing measurements storage 522 may be periodically or dynamically updated as required. In an implementation, sensing trigger messages storage 518, resource units storage 520, and sensing measurements storage 522 may include any type or form of storage, such as a database or a file system or coupled to memory 510.

Referring again to FIG. 5, remote device 504-1 may include processor 528-1 and memory 530-1. For example, processor 528-1 and memory 530-1 of remote device 504-1 may be processor 114 and memory 116, respectively, as shown in FIG. 1. In an embodiment, remote device 504-1 may further include transmitting antenna(s) 532-1, receiving antenna(s) 534-1, and sensing agent 536-1. In an implementation, sensing agent 536-1 may be a block that passes physical layer parameters to or from the MAC of remote device 504-1 to application layer programs. Sensing agent 536-1 may be configured to cause at least one transmitting antenna of transmitting antenna(s) 532-1 and at least one receiving antenna of receiving antennas(s) 534-1 to exchange messages with sensing device 502. In some embodiments, an antenna may be used to both transmit and receive in a half-duplex format. When the antenna is transmitting, it may be referred to as transmitting antenna 532-1 and when the antenna is receiving, it may be referred to as receiving antenna 534-1. It is understood by a person of normal skill in the art that the same antenna may be transmitting antenna 532-1 in some instances and receiving antenna 534-1 in other instances. In the case of an antenna array, one or more antenna elements may be used to transmit or receive a signal, for example in a beamforming environment. In some examples, a group of antenna elements used to transmit a composite signal may be referred to as transmitting antenna 532-1 and a group of antenna elements used to receive a composite signal may be referred to as receiving antenna 534-1. In some examples, each antenna is equipped with its own transmission and receive paths, which may be alternately switched to connect to the antenna depending on whether the antenna is operating as transmitting antenna 532-1 or receiving antenna 534-1.

In some embodiments, remote device 504-1 may include transmission configuration storage 540-1 and steering matrix configuration storage 542-1. Transmission configuration storage 540-1 may store requested transmission configuration delivered by sensing device 502 to remote device 504-1 or delivered transmission configuration delivered by remote device 504-1 to sensing device 502. Further, steering matrix configuration storage 542-1 may store one or more predefined steering matrix configurations. Information regarding transmission configuration stored in transmission configuration storage 540-1 and information regarding the one or more predefined steering matrix configurations stored in steering matrix configuration storage 542-1 may be periodically or dynamically updated as required. In an implementation, transmission configuration storage 540-1 and steering matrix configuration storage 542-1 may include any type or form of storage, such as a database or a file system or coupled to memory 530-1.

According to one or more implementations, communications in network 560 may be governed by one or more of the 802.11 family of standards developed by IEEE. Some example IEEE standards may include IEEE P802.11-REVmd/D5.0, IEEE P802.11ax/D7.0, and IEEE P802.11be/D0.1. In some implementations, communications may be governed by other standards (other or additional IEEE standards or other types of standards). In some embodiments, parts of network 560 which are not required by system 500 to be governed by one or more of the 802.11 family of standards may be implemented by an instance of any type of network, including wireless network or cellular network.

Figure 6:
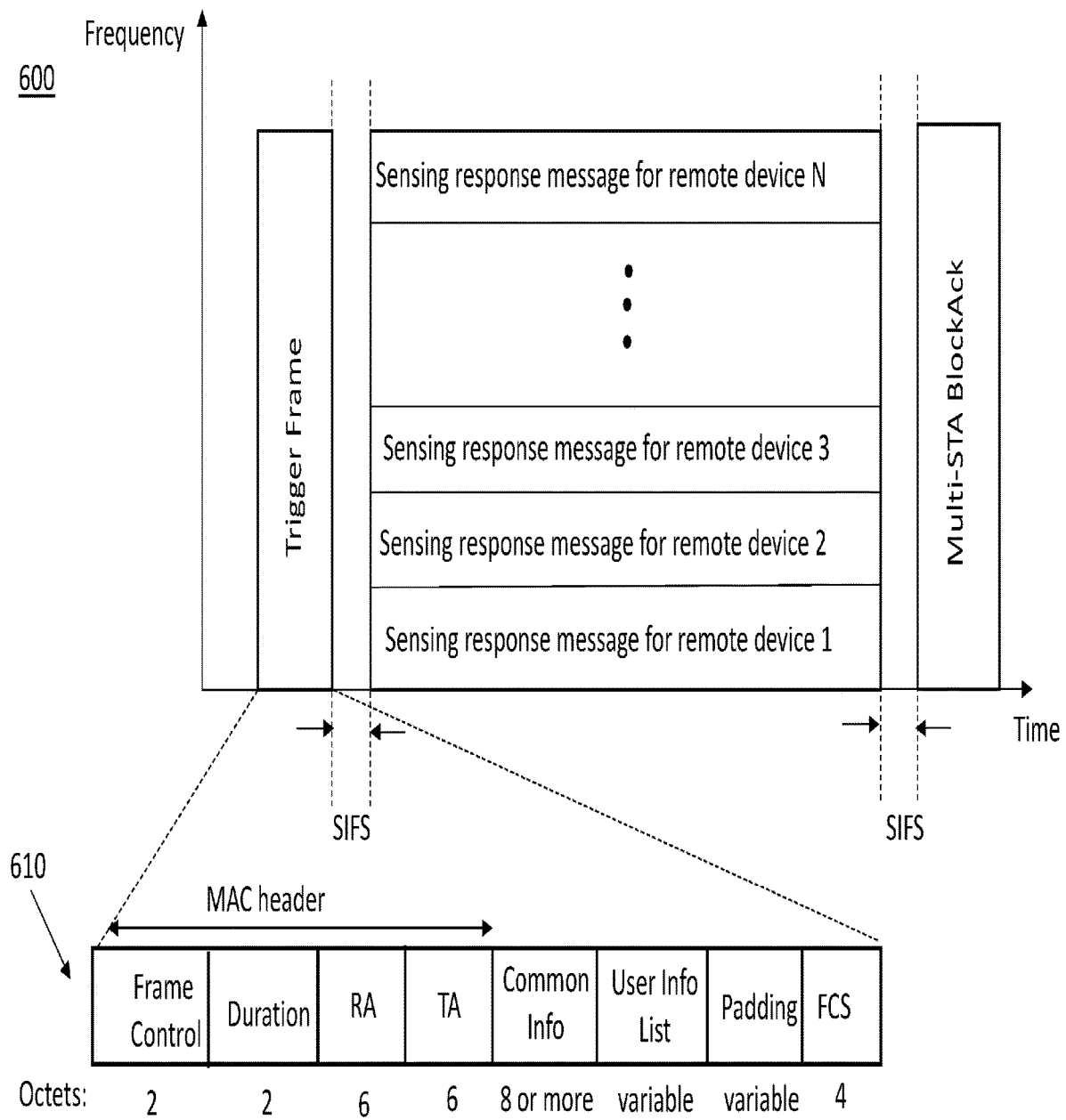
FIG. 6 depicts an uplink orthogonal frequency division multiple access (OFDMA) transmission procedure and a format of a trigger frame, according to some embodiments.

Further, IEEE 802.11ax adopted OFDMA, which allows sensing device 502 to simultaneously transmit data to all participating devices, such as plurality of remote devices 504-(1-N), and vice versa using a single TXOP. The efficiency of OFDMA depends on how sensing device 502 schedules channel resources (interchangeably referred to as resource units (RUs)) among plurality of remote devices 504-(1-N) and configures transmission parameters. Uplink OFDMA transmission procedure of IEEE 802.11ax and a trigger frame format are depicted in FIG. 6. According to IEEE 802.11ax, every uplink multiuser transmission follows a trigger frame 610, the format of which is depicted in FIG. 6. As can be seen in FIG. 6, a sensing transmission (i.e., sensing response message) follows the trigger frame after one SIFS. In an example, the duration of SIFS is 10 μs. The main purpose of the trigger frame is to solicit an immediate response of multiuser PPDUs from plurality of remote devices 504-(1-N). According to an example, the trigger frame may specify common synchronization parameters to plurality of remote devices 504-(1-N) for the TXOP along with a map to RUs for each remote device. The map allows the OFDMA to function without any interference. A message controlled by the trigger frame generally follows a time-frequency message pattern, as shown in FIG. 6. The trigger frame includes a Common Info field, User Info List field, and various other fields.

According to an implementation, hierarchy of the fields within trigger frame 710 is shown in FIG. 7A to FIG. 7G.

Figure 7A:
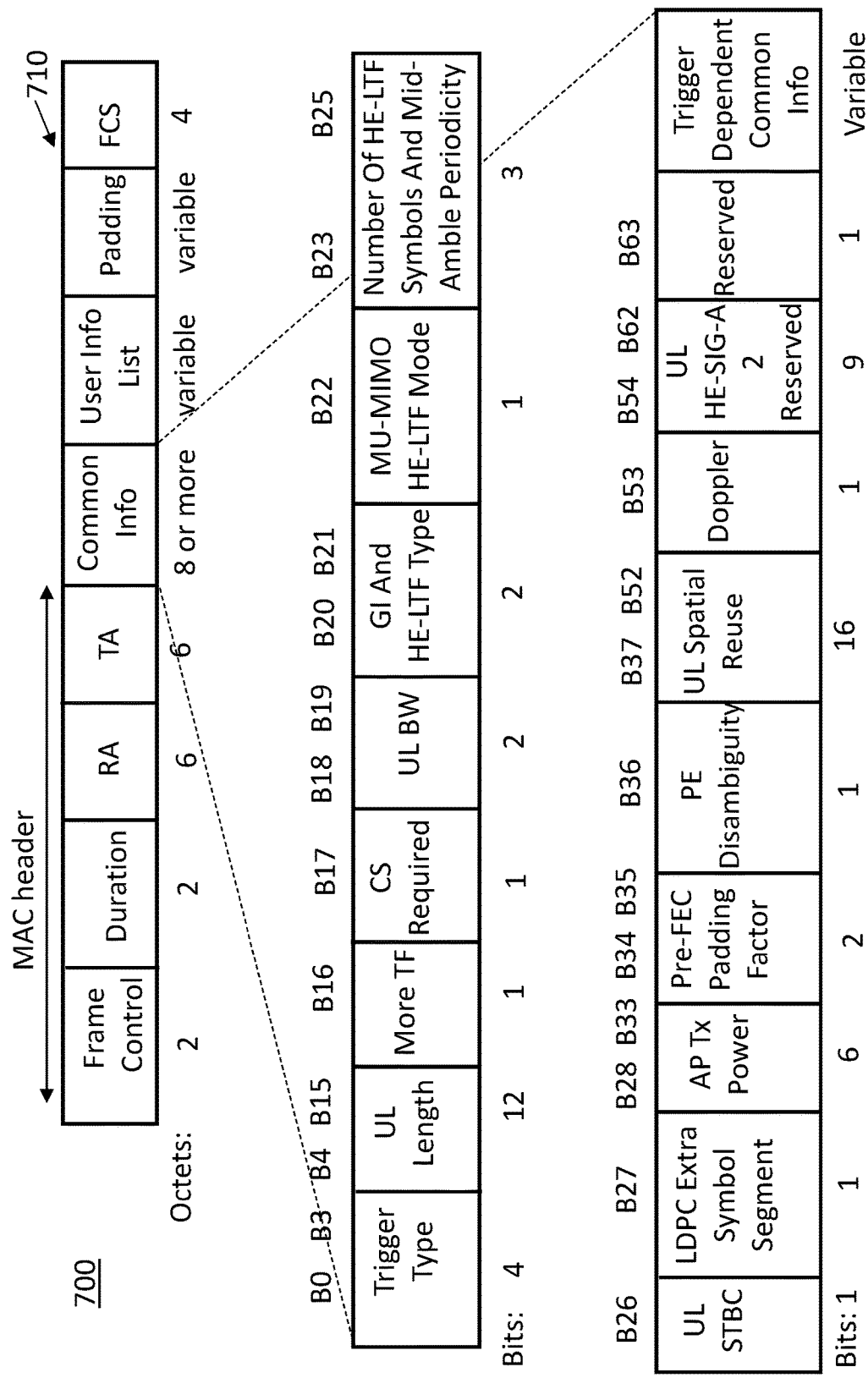
Figure 7C:
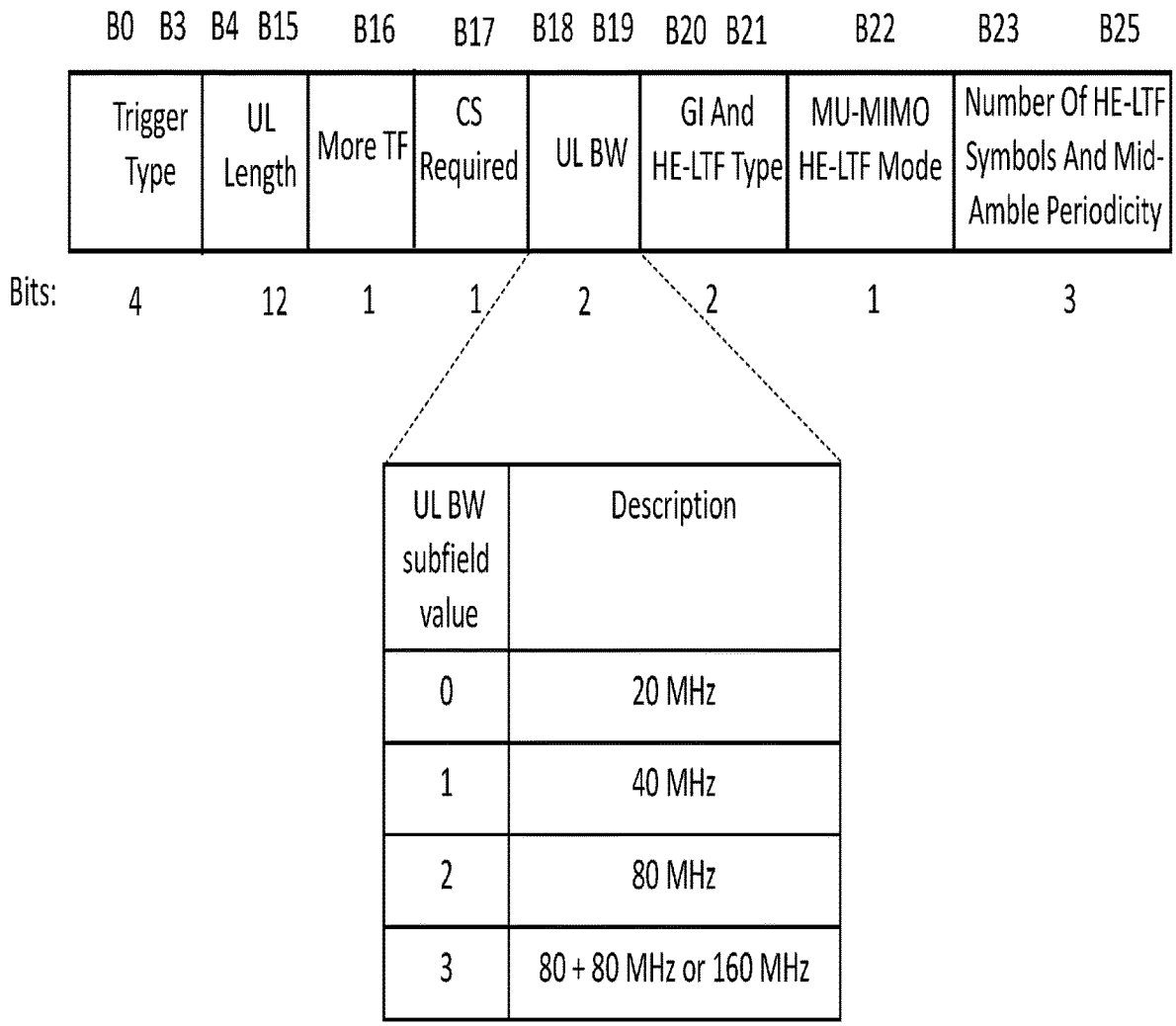
Figure 7D:
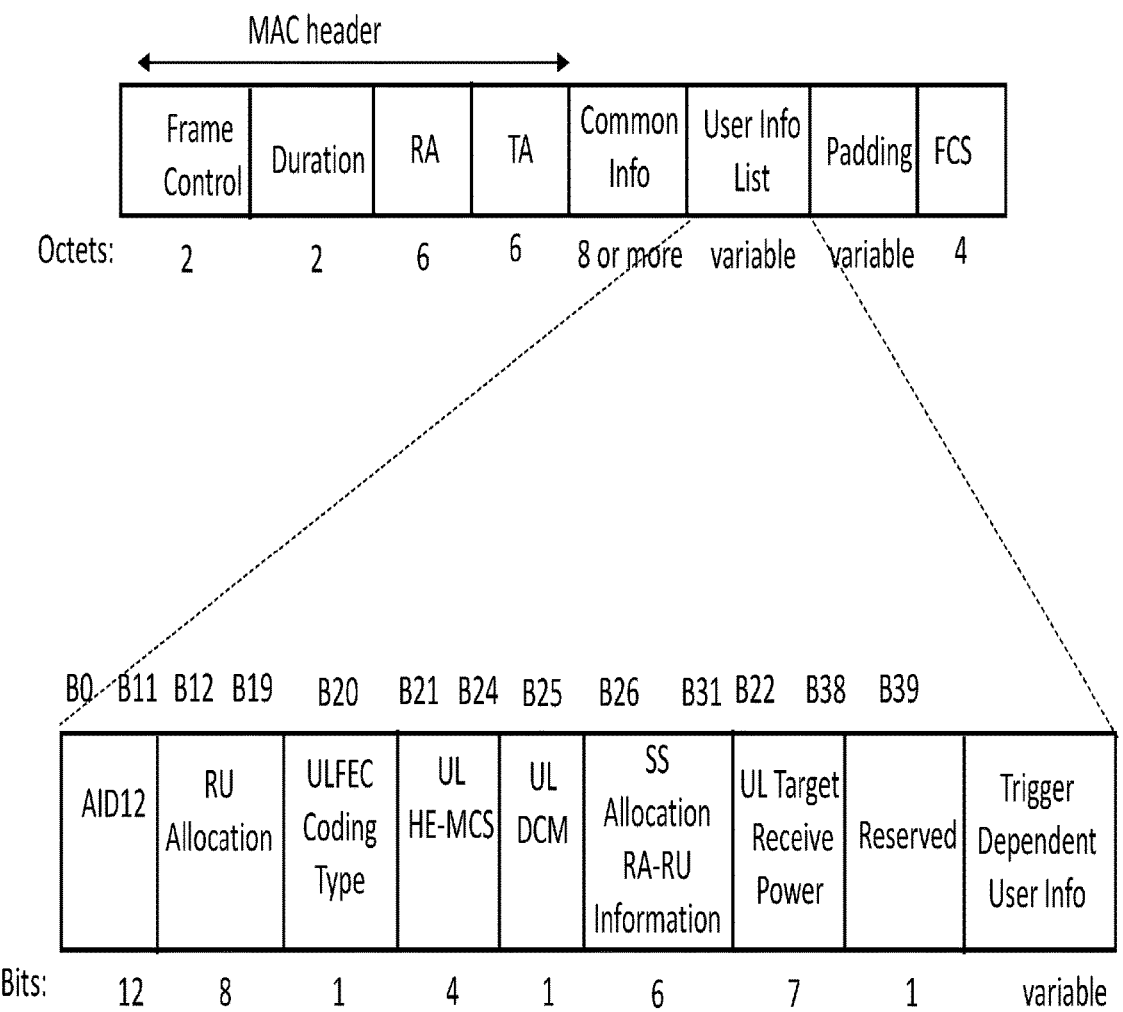

As described in FIG. 7A and FIG. 7D, the top level of the hierarchy contains a MAC header which contains control fields and frame addressing fields. FIG. 7A also shows the Common Info field which includes information which is common to the triggered request (for example, information that relates to remote devices participating in the triggered request) and FIG. 7D shows the User Info List which includes information specific to each individual remote device from amongst a sequential list of remote devices participating in the triggered request.

Figure 7F:
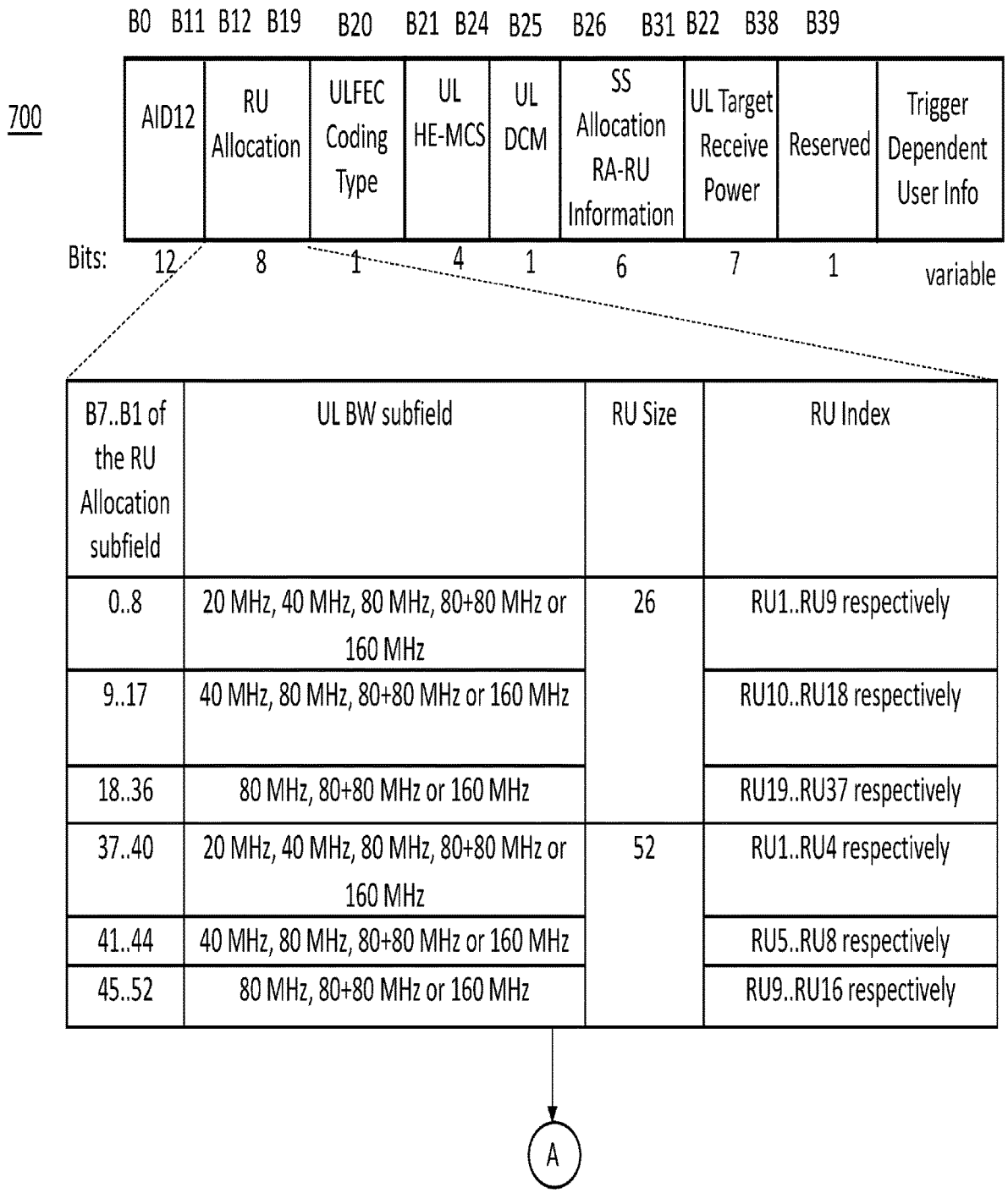
Figure 7G:

12 bits (B0 to B11) of User Info List define the remote device that the user information is targeting (AID12) and, as described in FIG. 7F and FIG. 7G, bits B12 to B19 constitute the resource allocation subfield and define the allocation of RUs according to Table 2 9 (provided below) as well as FIG. 8, FIG. 9, FIG. 10A, and FIG. 10B.

TABLE 2

B7 ... B1 of the RU Allocation subfield

| B7 ... B1 of the RU Allocation subfield | UL BW subfield | RU Size | RU Index |
|---|---|---|---|
| 0 ... 8 | 20 MHz, 40 MHz, 80 MHz, 80 + 80 MHz or 160 MHz | 26 | RU1 ... RU9 respectively |
| 9 ... 17 | 40 MHz, 80 MHz, 80 + 80 MHz or 160 MHz | | RU10 ... RU18 respectively |
| 18 ... 36 | 80 MHz, 80 + 80 MHz or 160 MHz | | RU19 ... RU37 respectively |
| 37 ... 40 | 20 MHz, 40 MHz, 80 MHz, 80 + 80 MHz or 160 MHz | 52 | RU1 ... RU4 respectively |
| 41 ... 44 | 40 MHz, 80 MHz, 80 + 80 MHz or 160 MHz | | RU5 ... RU8 respectively |
| 45 ... 52 | 80 MHz, 80 + 80 MHz or 160 MHz | | RU9 ... RU16 respectively |
| 53, 54 | 20 MHz, 40 MHz, 80 MHz, 80 + 80 MHz or 160 MHz | 106 | RU1 and RU2 respectively |
| 55, 56 | 40 MHz, 80 MHz, 80 + 80 MHz or 160 MHz | | RU3 and RU4 respectively |
| 57 ... 60 | 80 MHz, 80 + 80 MHz or 160 MHz | | RU5 ... RU8 respectively |
| 61 | 20 MHz, 40 MHz, 80 MHz, 80 + 80 MHz or 160 MHz | 242 | RU1 |
| 62 | 40 MHz, 80 MHz, 80 + 80 MHz or 160 MHz | | RU2 |
| 63, 64 | 80 MHz, 80 + 80 MHz or 160 MHz | | RU3 and RU4 respectively |
| 65s | 40 MHz, 80 MHz, 80 + 80 MHz or 160 MHz | 484 | RU1 |
| 66 | 80 MHz, 80 + 80 MHz or 160 MHz | | RU2 |
| 67 | 80 MHz, 80 + 80 MHz or 160 MHz | 996 | RU1 |
| 68 | 80 + 80 MHz or 160 MHz | 2 × 996 | RU1 |

As described in FIG. 7B, the first four bits (B0 to B3) of the Common Info field define a trigger type and as described in FIG. 7C, bits B18 and B19 define the uplink (UL) bandwidth (BW) of a resulting, combined response with the encoding described by Table 1 provided below. The bandwidth of the combined response refers to the bandwidth of the TXOP, which includes the transmissions of remote devices.

TABLE 1

UL BW subfield encoding

| UL BW subfield value | Description |
|---|---|
| 0 | 20 MHz |
| 1 | 40 MHz |
| 2 | 80 MHz |
| 3 | 80 + 80 MHz or 160 MHz |

Figure 8:
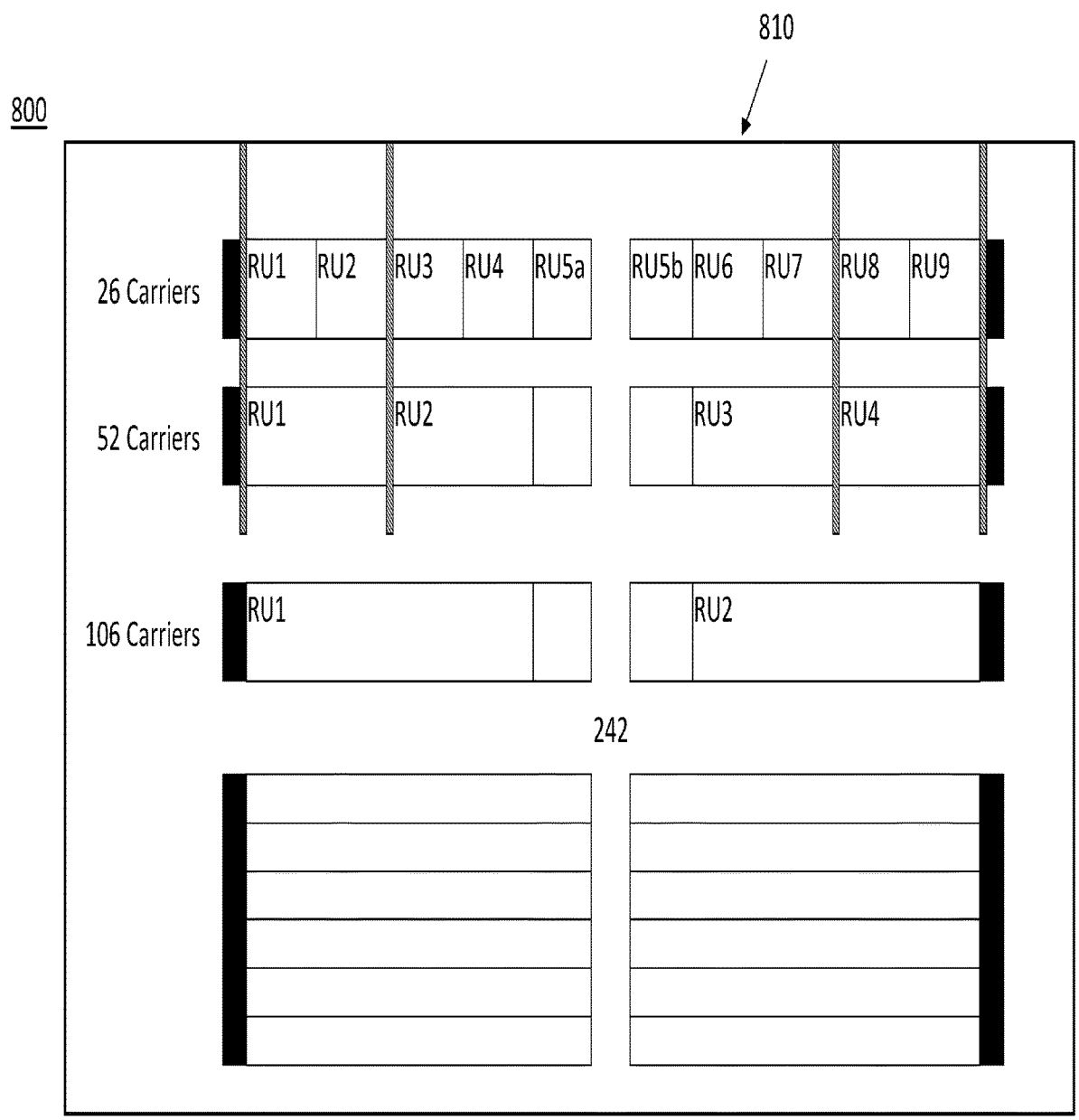
FIG. 8 depicts a representation of an allowable allocation of resource units (RUs) in a 20 MHz channel, according to some embodiments.
Figure 9:
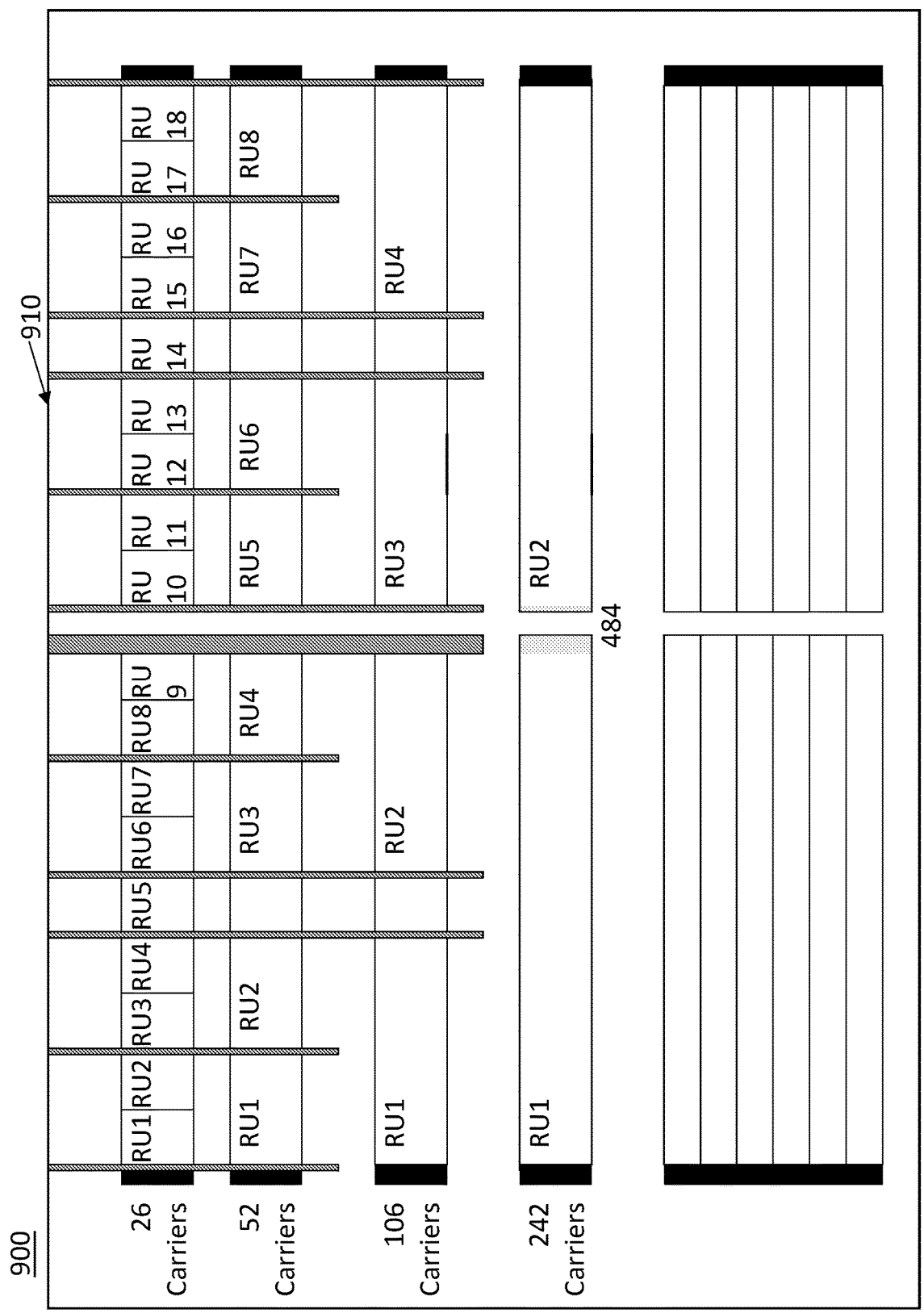
FIG. 9 depicts a representation of an allowable allocation of RUs in a 40 MHz channel, according to some embodiments.
Figure 10A:
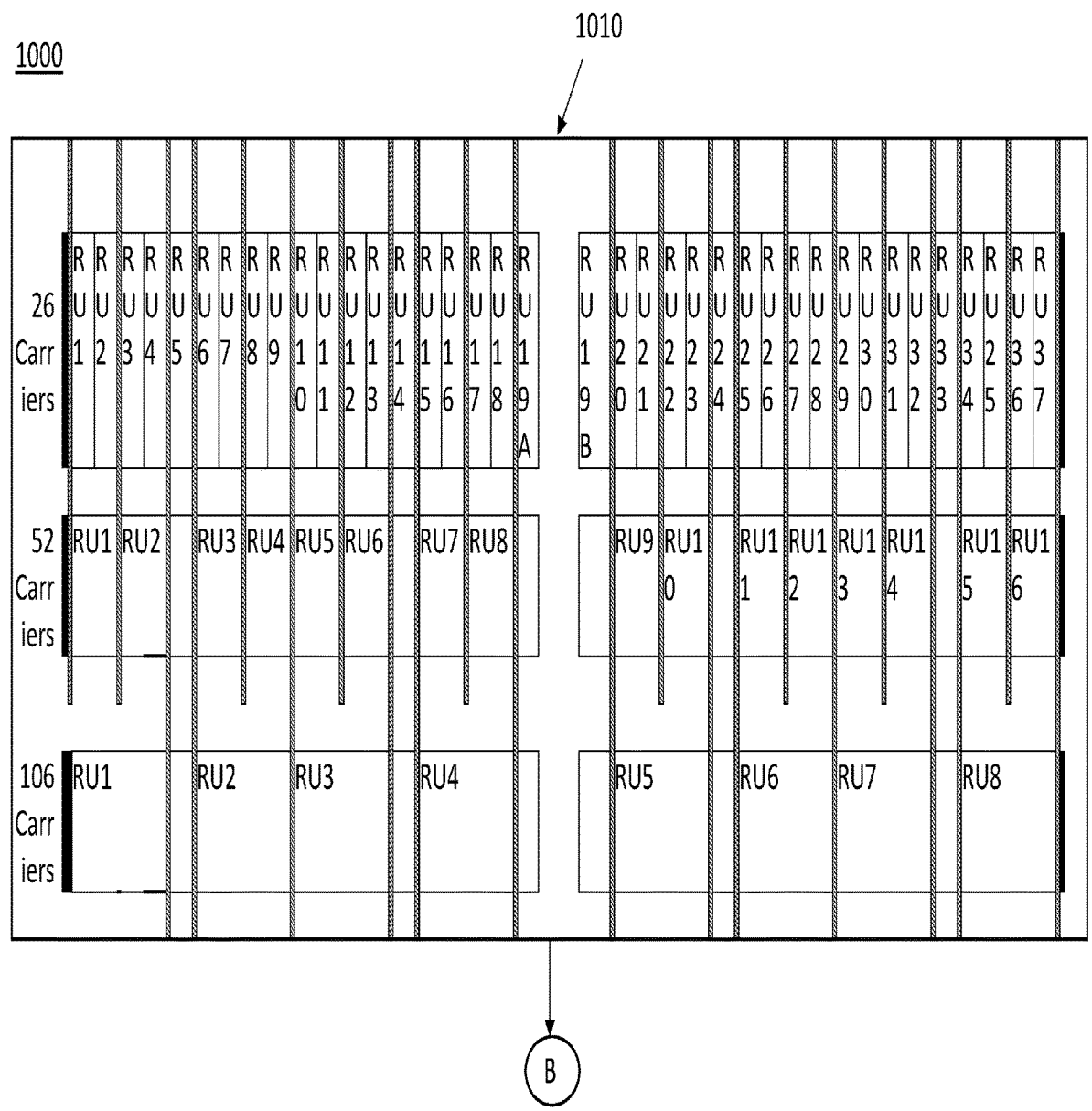
FIG. 10A and FIG. 10B depict a representation of an allowable allocation of RUs in an 80 MHz channel, according to some embodiments.
Figure 10B:
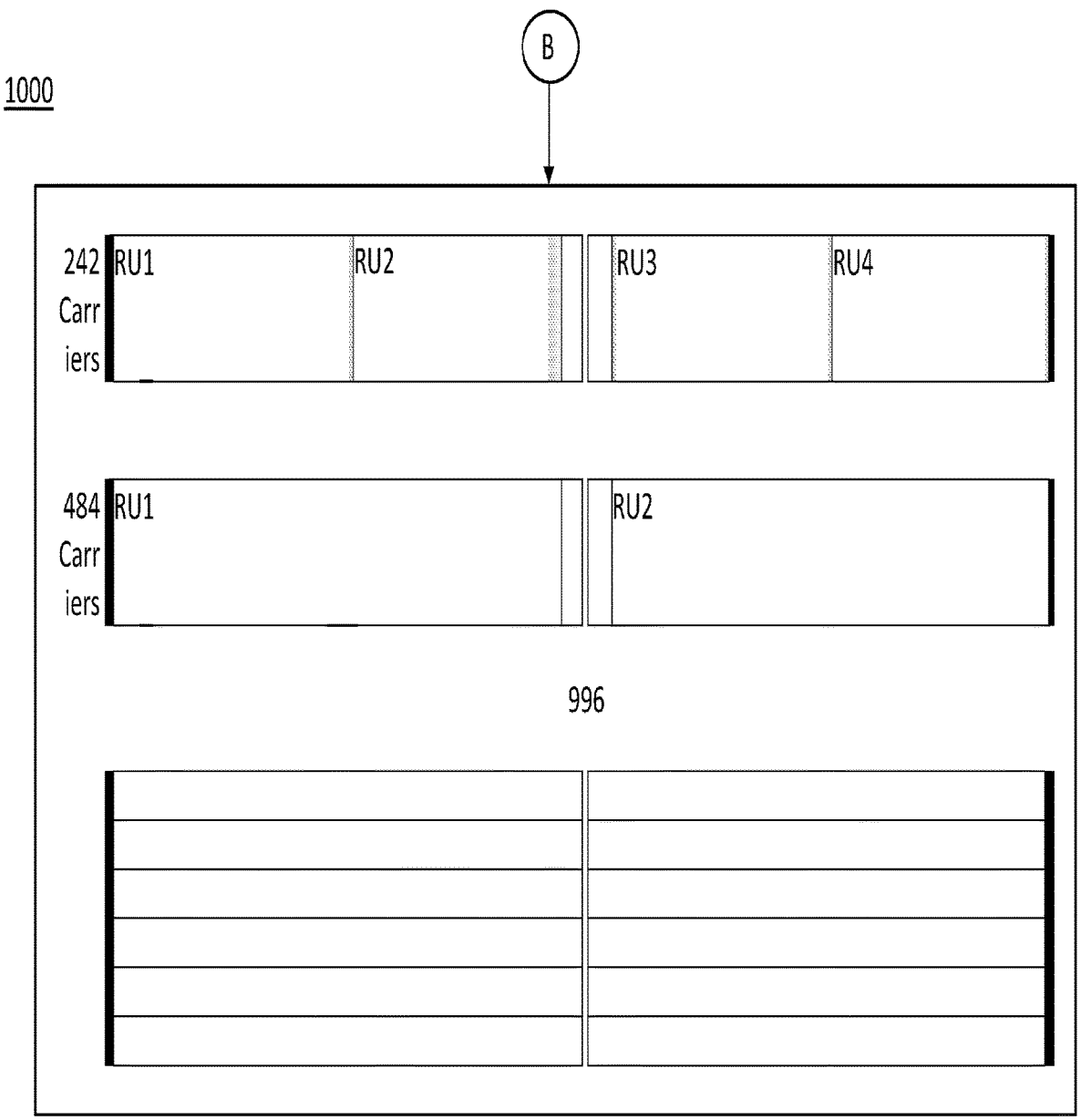

As described, the User Info List of trigger frame 710 includes data that is specific to remote devices participating in the triggered response. As described in FIG. 7E, the first In an example, if UL BW subfield indicates 80+80 MHz or 160 MHz, the description indicates the RU index for the primary 80 MHz channel or secondary 80 MHz channel as indicated by B0 of the RU Allocation subfield. In an implementation, with evolution of the IEEE 802.11 standard, bandwidth of a channel available to each sensing device-remote device connection has increased to a current maximum of 160 MHz. IEEE 802.11ax HE PHY amendments allow the channel to be allocated with more flexibility and detail to plurality of remote devices 504-(1-N) using OFDMA in uplink transmissions from plurality of remote devices 504-(1-N) to sensing device 502. FIG. 8 depicts representation 810 of an allowable allocation of RUs in a 20 MHz channel, FIG. 9 depicts representation 910 of an allowable allocation of RUs in a 40 MHz channel, and FIG. 10A and FIG. 10B depict representation 1010 of an allowable allocation of RUs in an 80 MHz channel.

In a future extension of IEEE 802.11, the maximum bandwidth of a channel and the number and format of RUs may be extended. The descriptions given in Table 1 and Table 2 and in FIG. 7F and FIG. 7G, and FIG. 12F and FIG. 12G are examples based a current level of specification and should not limit any extensions to the described fields made to support IEEE 802.11.

According to one or more implementations, sensing agent 516 may use channel resources in different ways to probe a sensing space in which system 500 is deployed. The different ways may be considered different modes of operation of sensing agent 516. Examples of different modes of operation of sensing agent 516 include a scanning mode, a detection mode, and a hybrid mode. In an example, the selection of the mode of operation may be based on the requirements of sensing agent 516 at a particular time. Each mode of operation may deliver appropriate sensing measurements with an efficient use of available channel resources.

In an example implementation, the scanning mode may enable sensing measurements at a low resolution. A resolution of a sensing measurement may be a function of a bandwidth of transmission of a sensing transmission and may be adjusted by sensing agent 516 requesting a lower bandwidth sensing transmissions by allocating specific RUs to the sensing transmission. In an example, a sensing goal may be that a scan may be required to be performed quickly and efficiently, surveying the maximum area within a sensing space in the shortest amount of time. A remote device which is supporting the scanning mode may be allocated a small amount of transmission bandwidth in the TXOP. In an example, sensing agent 516 may allocate a fixed transmission bandwidth to each remote device that participates in scanning mode and in this example, may be able to support as many remote devices as part of the sensing goal that can be allocated transmission bandwidth. In scanning mode, sensing agent 516 may track the allocated transmission bandwidth per remote device as part of the sensing algorithm with the purpose of computing sensing measurement per remote device. In an implementation, sensing agent 516 may operate in the scanning mode while scanning for features of interest within the sensing space.

According to an example implementation, the detection mode may enable sensing measurements at a high resolution to detect or analyze one or more features of interest within the sensing space. The detection mode may consume greater transmission bandwidth per remote device. In an example, a remote device which is supporting the detection mode may be allocated a large amount of transmission bandwidth in the TXOP. In an example, sensing agent 516 may allocate a fixed transmission bandwidth to each remote device which participates in the detection mode and in this example, may be able to support as many remote devices as part of the sensing goal that can be allocated transmission bandwidth.

In examples, there may be multiple features of interest that may be analyzed in parallel. Where there are multiple features of interest that sensing agent 516 identifies, sensing agent 516 may determine that a reduced level of resolution may be used, and the available transmission bandwidth may be shared between the features of interest. According to an implementation, when one or more features of interest have been identified (or potentially identified), high resolution sensing measurements may be required, derived from a subset of available remote devices around the one or more features of interest. The high resolution sensing may be achieved by allocating a greater number of RUs such that a greater proportion of the available bandwidth is allocated to the subset of remote devices.

In an example implementation, the hybrid mode may be employed where a detection is made on features of interest and a scan is continued on the rest of network, thus reducing the resources available for both scanning and detection operations. In the hybrid mode, transmission bandwidth for a sensing transmission may be allocated to a remote device in an arbitrary manner. An example of use of the hybrid mode may be to focus in detail on one part of the network of remote devices (for example, on all remote devices which can sense into a single room in a house) whilst scanning on the rest of the remote devices in the network. In an example, in the hybrid mode, sensing agent 516 may maintain a record of the allocated transmission bandwidth per remote device to ensure that the correct sensing measurements are calculated, and that the sensing algorithm correctly executes the scanning and detection operations. In a further example, sensing agent 516 may allocate a fixed transmission bandwidth to each remote device that participates in the scanning operation as part of the hybrid mode and a fixed transmission bandwidth to each remote device which participates in the detection operation as part of the hybrid mode.

According to an implementation, sensing agent 516 may operate in the hybrid mode in scenarios where the sensing goal in detection mode (as determined by sensing agent 516) does not require the use of all available bandwidth. In such scenarios, sensing agent 516 may allow spare bandwidth to be allocated to a continuous, low-resolution scan. In an example, the resolution for the continuous scan is not reduced but the channel is multiplexed in time such that the frequency of the continuous scan sensing measurements is reduced to accommodate all the remote devices in the network.

Figure 11:
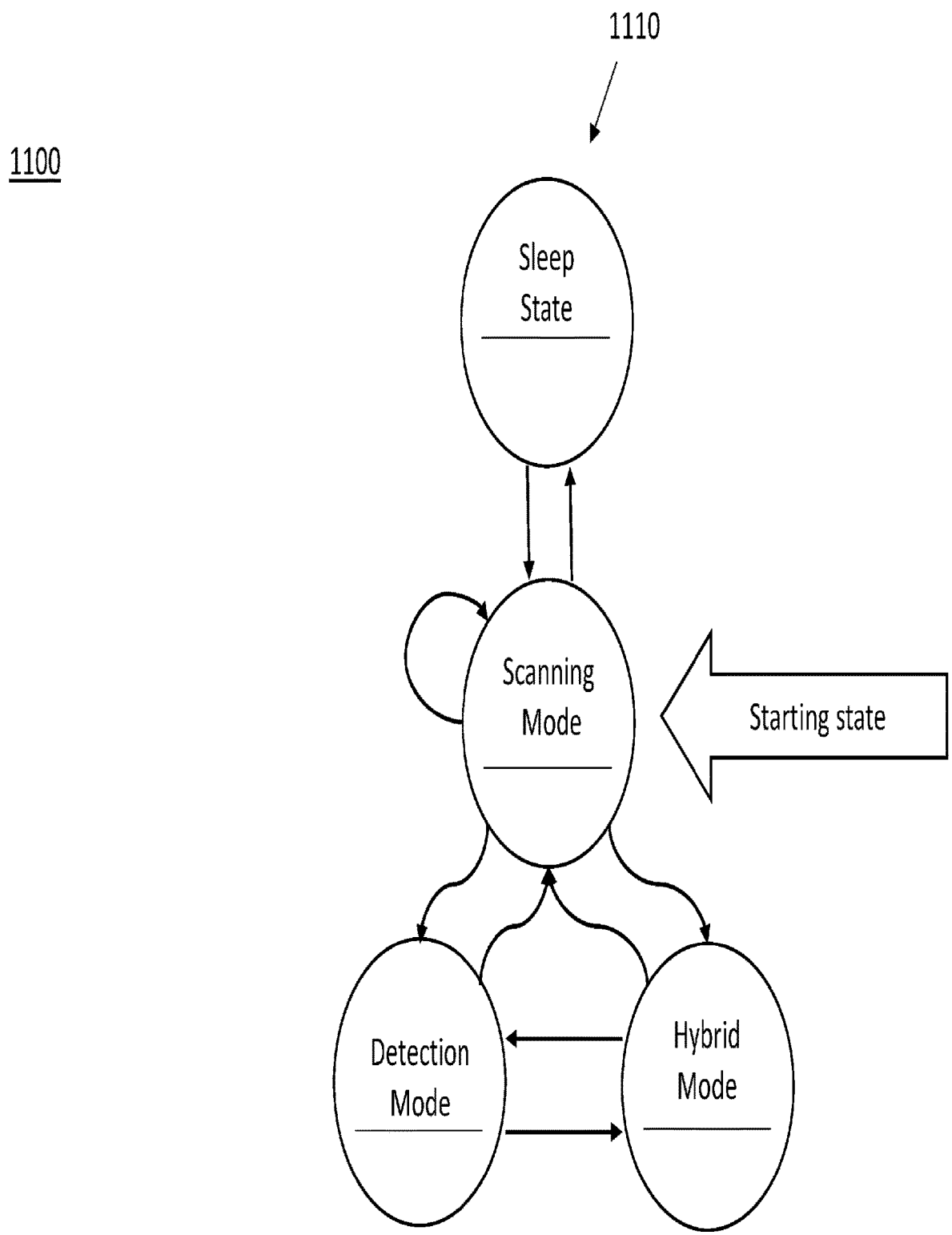
FIG. 11 depicts a state transition diagram for a sensing device, according to some embodiments.

In one or more embodiments, sensing agent 516 may transition between modes of operation during its operation. An example of state transition diagram 1110 for sensing agent 516 is depicted in FIG. 11. In an implementation, each of plurality of remote devices 504-(1-N) may support modes of operation of sensing agent 516 by providing sensing transmissions in a format defined by sensing agent 516. Sensing agent 516 may maintain a record of the format of the sensing transmissions to allow it to calculate sensing measurements from the sensing transmissions. As shown in FIG. 11, sensing agent 516 may operate in the scanning mode until one or more features of interest are identified (starting state). Once the one or more features of interest are identified from the scanning mode, sensing agent 516 may transition to the detection mode where high resolution sensing measurements may be performed. In some scenarios, sensing agent 516 may operate in the hybrid mode, such that while performing actions associated with the detection mode of operation, sensing agent 516 may also perform actions to continue a low resolution scanning mode of operation.

According to an implementation, in the detection mode, sensing agent 516 may determine a reduced set of remote devices and allocate a proportion of bandwidth to each remote device of the reduced set. In an example, sensing agent 516 may allocate as much of the available channel bandwidth to a remote device that the signaling can support. Further, in the hybrid mode, sensing agent 516 may determine the sensing goal and then determine the amount of bandwidth that may be allocated to the scanning and detection operations, and therefore whether the sensing goal may be satisfied by these operations. If sensing agent 516 determines that the hybrid mode is unsuitable (for example, it is not possible to maintain hybrid mode operation and still provide adequate transmission bandwidth to the remote device sensing transmissions on which sensing device 502 will make sensing measurements in the detection mode), then sensing agent 516 may transition to detection mode.

In an implementation, once sensing agent 516 has determined that all sensing measurements required of a detection sensing goal (i.e., made in the detection mode) have been made, then sensing agent 516 may transition back to the scanning mode. In an example, sensing agent 516 may transition from the detection mode to the scanning mode via the hybrid mode to allow scanning to resume for parts of the sensing space but to ensure that no final changes to the detection of features of interest occur and are missed. A sleep state allows sensing agent 516 to support a state of zero or low system resource utilization. In some examples, a timer wakes up sensing agent 516 periodically, and sensing agent 516 may transition to the scanning mode. Depending on the result of the subsequent scan, sensing agent 516 may progress to the detection mode or the hybrid mode or it may transition back into the sleep state.

Referring back to FIG. 5, according to one or more implementations, sensing device 502 may initiate a measurement campaign. In another implementation, sensing algorithm device 506 may initiate a measurement campaign. In the measurement campaign, exchange of transmissions between sensing device 502 and plurality of remote devices 504-(1-N) may occur. In an example, control of these transmissions may be with the MAC (Medium Access Control) layer of the IEEE 802.11 stack. According to an implementation, sensing device 502 may secure a TXOP which may be allocated by a sensing device to a sensing transmission by selected remote devices. In an example, the selected remote devices may include plurality of remote devices 504-(1-N). In some examples, the selected remote devices may include a subset of plurality of remote devices 504-(1-N). For the ease of explanation and understanding, the description hereinafter is provided with reference to the selected remote devices including plurality of remote devices 504-(1-N) however the description is equally applicable to the case of the subset of the plurality of remote devices 504-(1-N). According to an implementation, sensing agent 516 may allocate first channel resources to first expected transmissions from plurality of remote devices 504-(1-N), and the first channel resources may be included within a first TXOP. In an example, sensing agent 516 may allocate the first channel resources to plurality of remote devices 504-(1-N) by allocating time and bandwidth within the first TXOP to plurality of remote devices 504-(1-N). In an implementation, sensing device 502 may determine a bandwidth to be allocated to each of plurality of remote devices 504-(1-N) based on one or more of a mode of operation of sensing agent 516, a sensing goal, and a requirement for each of plurality of remote devices 504-(1-N).

In an example, a sensing goal of the scanning mode may be to combine remote devices within the total bandwidth available. Accordingly, the allocated bandwidth per remote device may be a subset of the total available bandwidth. In an example, the allocation may be a predefined block size of bandwidth. In some examples, the bandwidth allocation may be limited by the bandwidth of each individual RU. In an implementation, equal bandwidth within the TXOP may be allocated to each remote device. According to an implementation, remote devices required to respond in non-equal bandwidth allocations may be determined.

According to an example, a sensing goal of the detection mode may be to provide an increased resolution of sensing measurements. Accordingly, the allocated bandwidth per remote device may be greater in comparison to the sensing mode. In an example, all available bandwidth may be allocated to a single remote device. In some examples, a fixed bandwidth may be allocated to each remote device participating in the sensing goal. Further, in some examples, different bandwidths may be allocated to remote devices if the sensing goal determines that different resolutions of sensing measurements are required from remote devices.

In an example, a sensing goal of the hybrid mode may be to carry out a detection operation with a subset of remote devices and to use spare bandwidth (i.e., bandwidth that is not needed for remote devices that are participating in the detection operation) for a scanning operation. If the bandwidth to fulfill the needs of remote devices in the detection operation does not require all the bandwidth that is available in the TXOP then the spare bandwidth may be allocated between all remote devices which are not part of the detection operation (i.e., all remote devices that are participating in the scanning operation). In an example, the spare bandwidth may be allocated between a subset of remote devices that are participating in the scanning operation and the subset of remote devices may be varied in a subsequent TXOP.

According to an implementation, sensing agent 516 may allocate the first channel resources to plurality of remote devices 504-(1-N) according to the scanning mode. After first channel resources are allocated to the first expected transmissions from plurality of remote devices 504-(1-N), sensing agent 516 may generate a first sensing trigger message configured to trigger a first series of sensing transmissions from plurality of remote devices 504-(1-N). The first series of sensing transmissions may include a sensing transmission from each of plurality of remote devices 504-(1-N). In an example, the first sensing trigger message may be an UL-OFDMA sensing trigger message which may instruct plurality of remote devices 504-(1-N) to make sensing transmissions using UL-OFDMA. Further, the first sensing trigger message may be a scanning type trigger message. A scanning type trigger message may be a trigger message that is used in a scanning mode and describes different types of response that fulfills requirements of the scanning mode. In an example, the first sensing trigger message may include a requested transmission configuration and a resource allocation subfield corresponding to the scanning mode.

According to an example, the first series of sensing transmissions may also correspond to the scanning mode. In an example, the first sensing trigger message may inform plurality of remote devices 504-(1-N) of their allocation of RUs within the uplink bandwidth for use in the first TXOP. In some examples, the first sensing trigger message may include parameters which may instruct plurality of remote devices 504-(1-N) on further configuration items for resulting sensing transmissions using a requested transmission configuration. In an implementation, sensing agent 516 may generate the first sensing trigger message with a specification of a steering matrix configuration included. In an example, the first sensing trigger message may include the steering matrix configuration within the requested transmission configuration. In an implementation, sensing agent 516 may transmit, via transmitting antenna 512, the first sensing trigger message configured to trigger the first series of sensing transmissions from plurality of remote devices 504-(1-N).

Figure 12A:
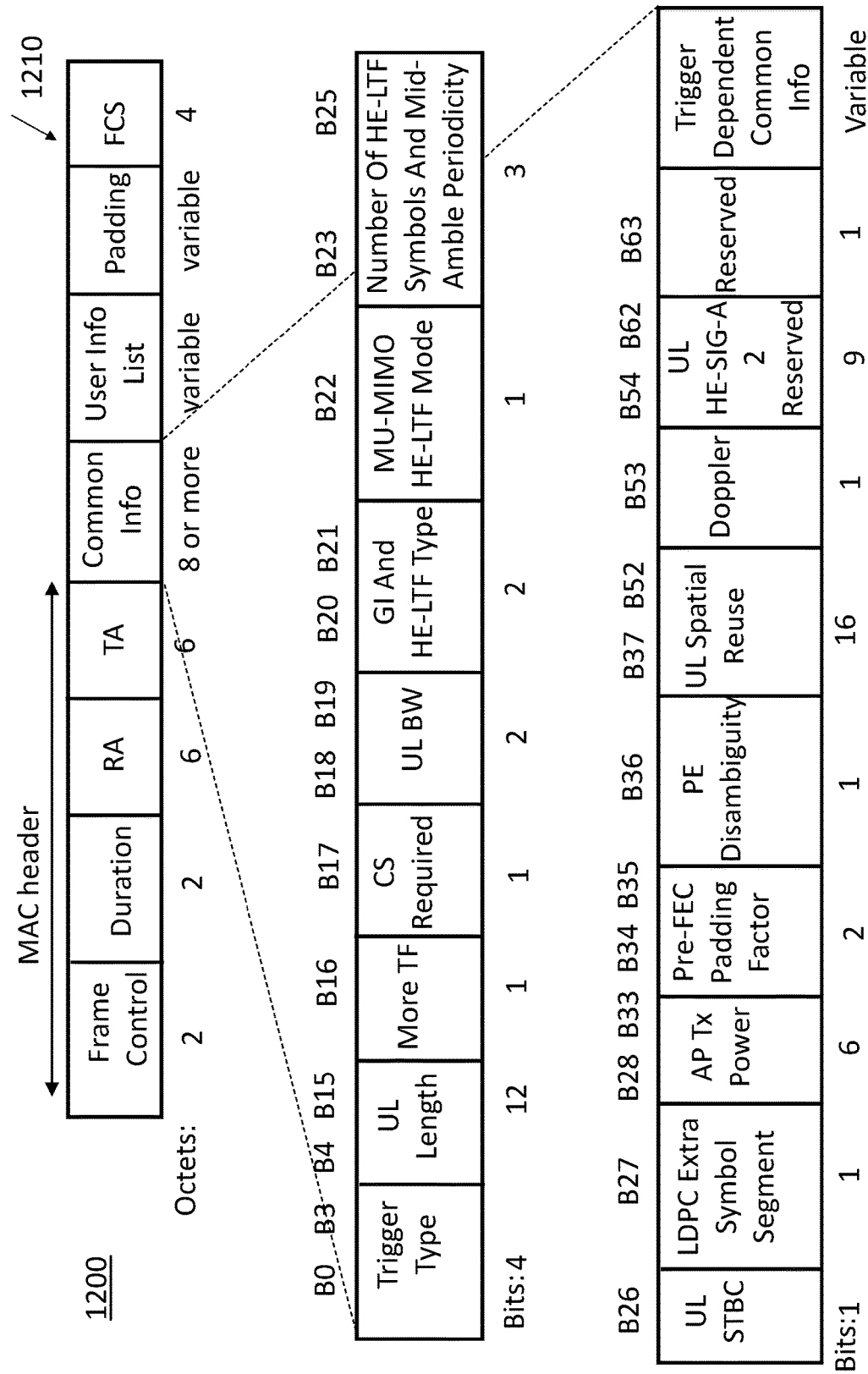
Figure 12C:
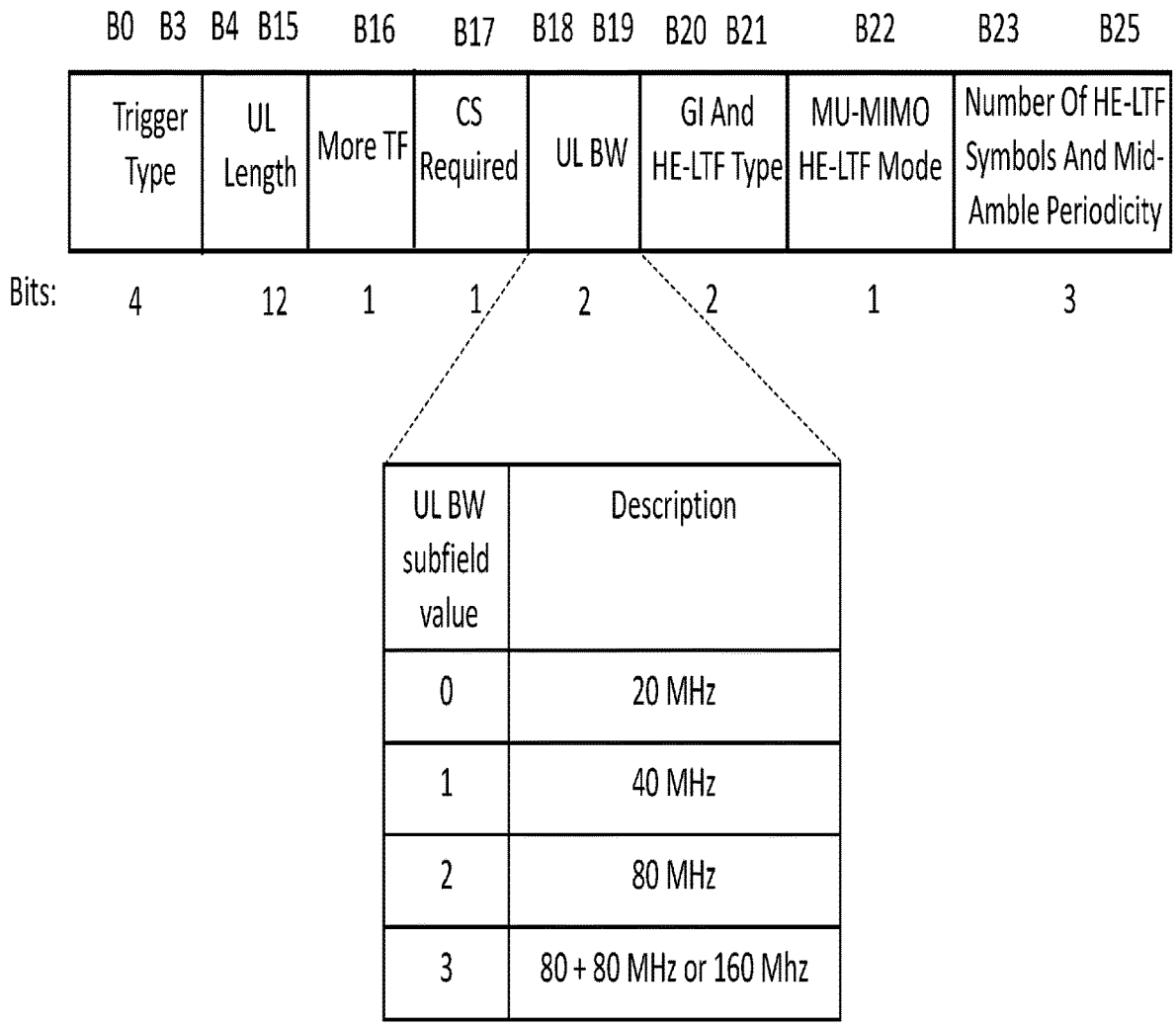
Figure 12D:
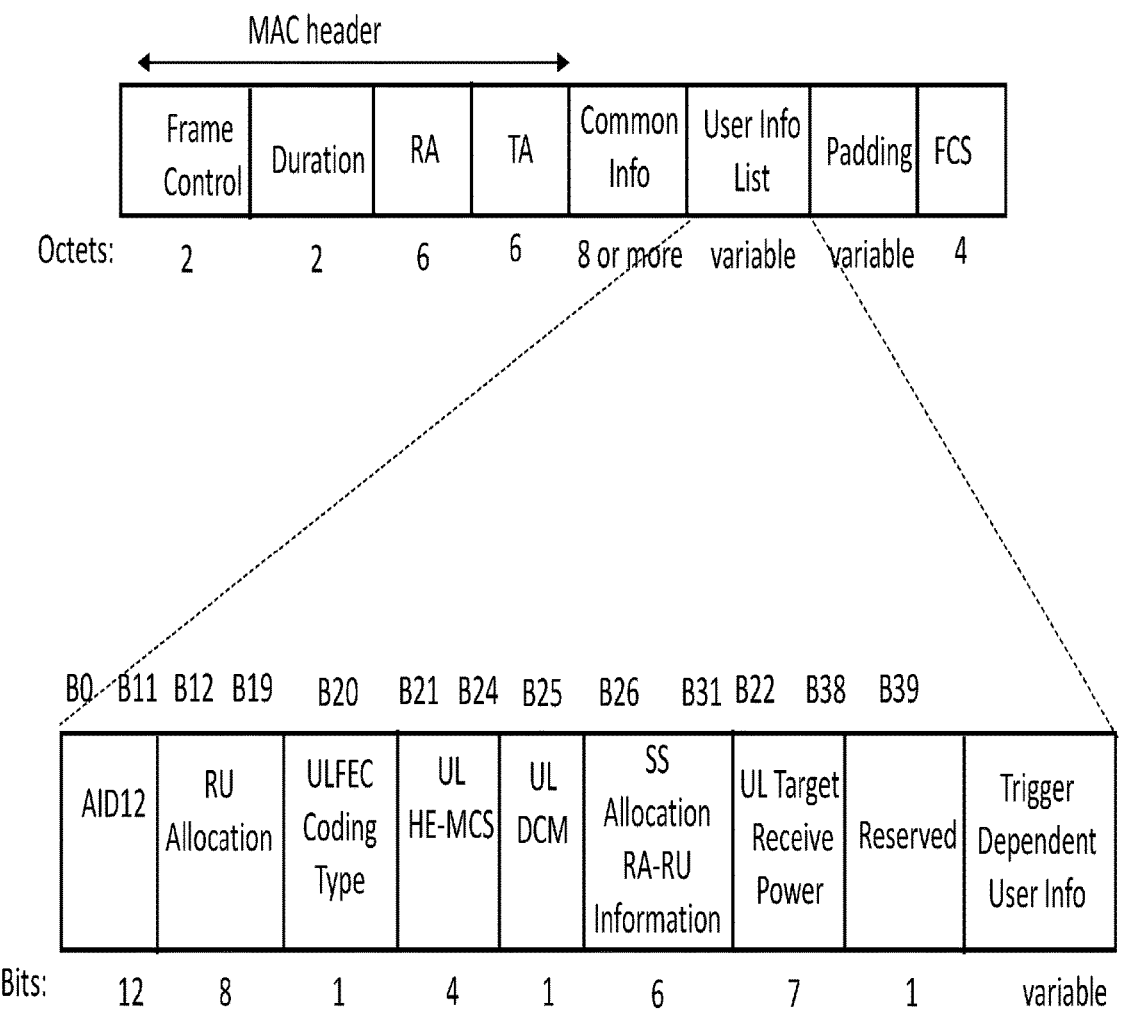
Figure 12F:
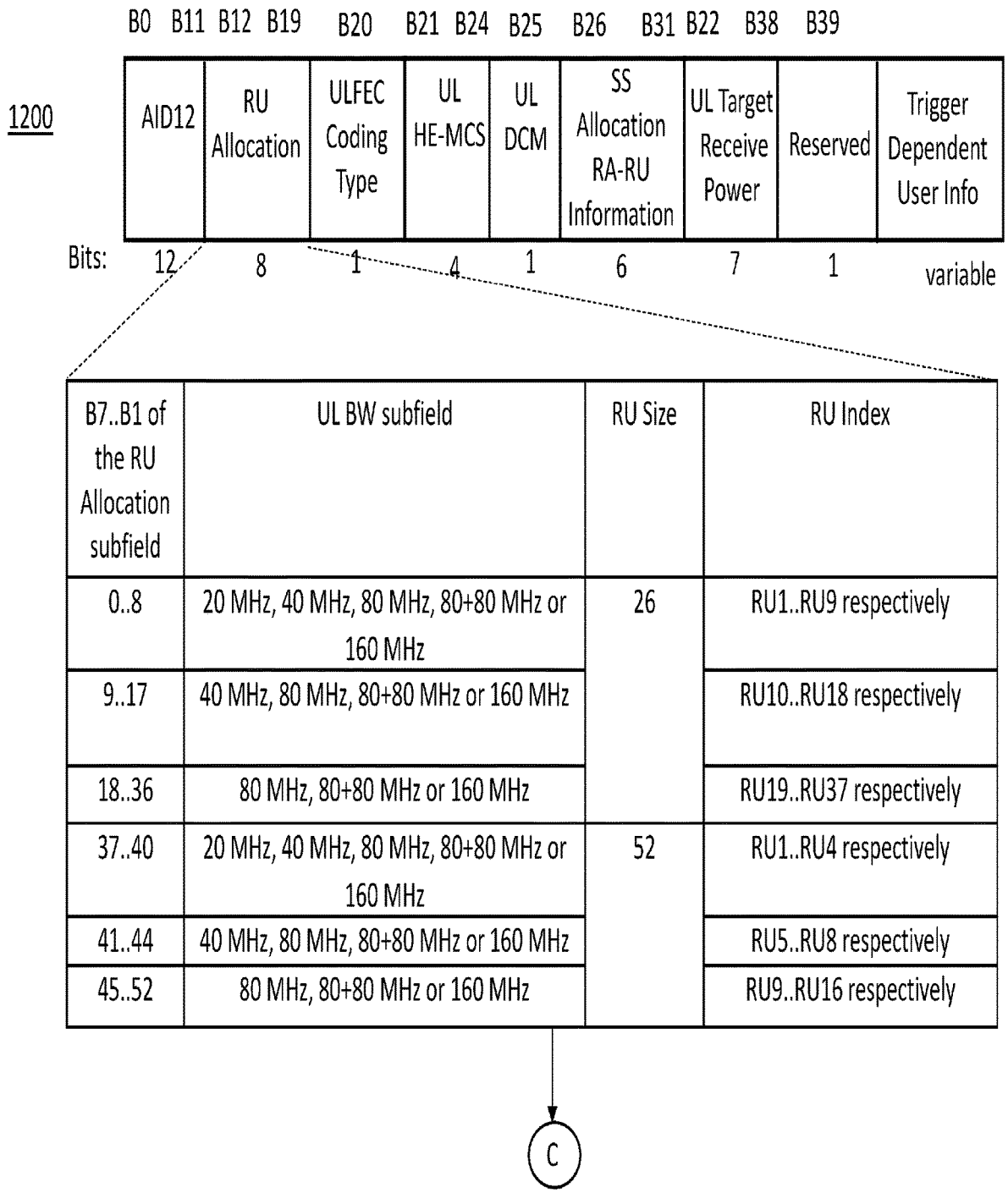
Figure 12G:
Figure 12H:
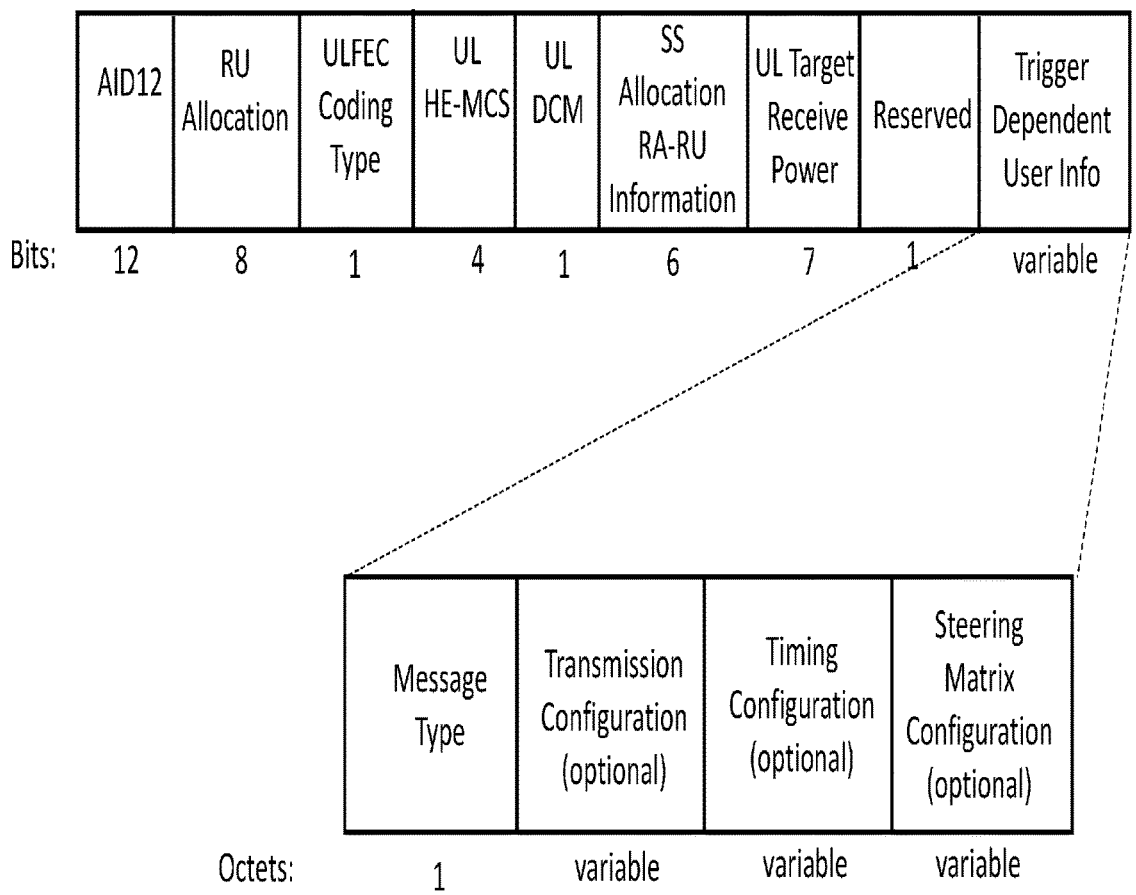
Figure 13:
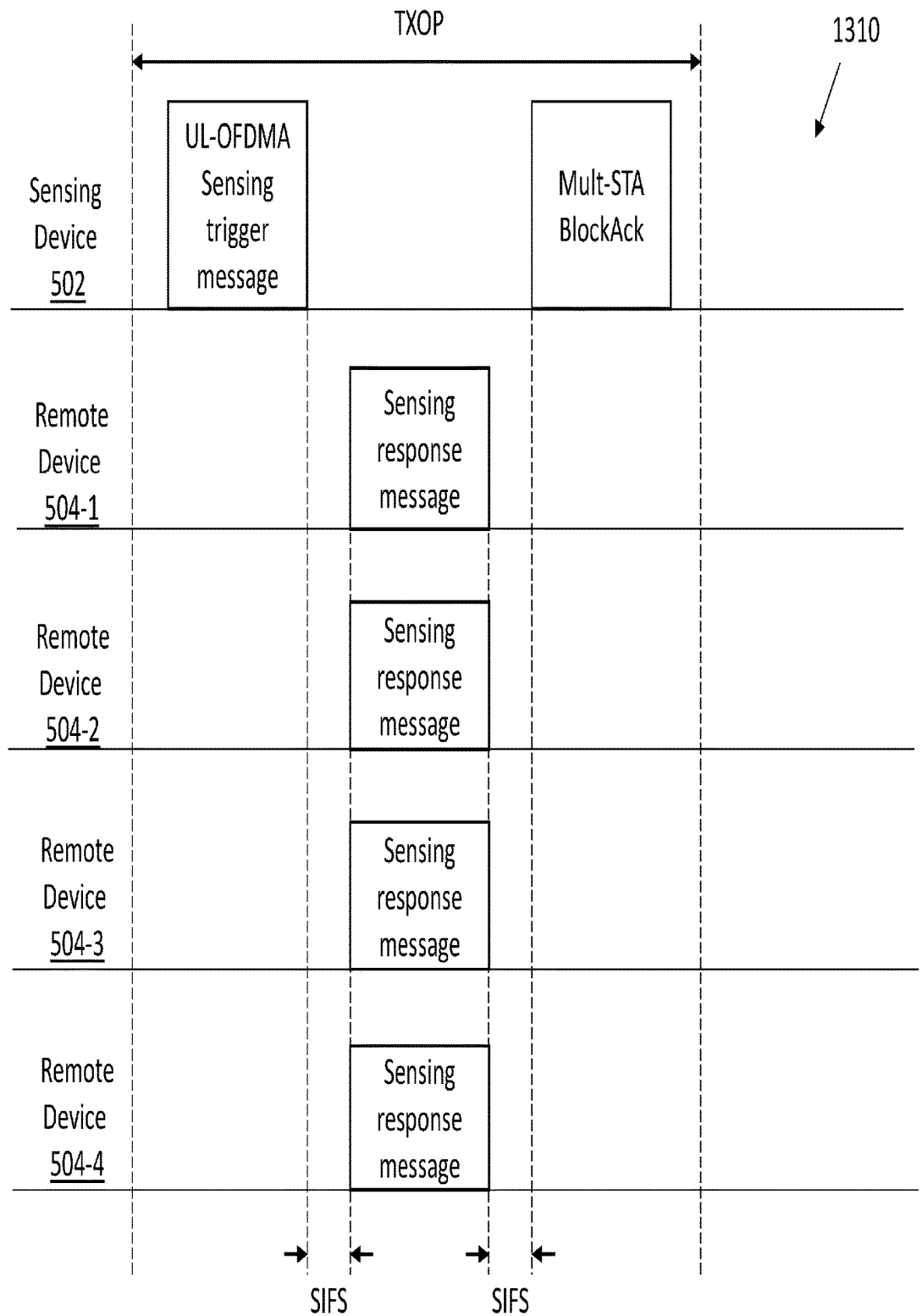
FIG. 13 depicts an exemplary UL-OFDMA based sensing transmission transaction, according to some embodiments.

A hierarchy of fields within UL-OFDMA sensing trigger message 1210 is shown in FIG. 12A to FIG. 12H and an example of a UL-OFDMA based sensing transmission transaction 1310 is shown in FIG. 13.

As described in FIG. 12A and FIG. 12D, the top level of the hierarchy contains a MAC header which contains control fields and frame addressing fields. FIG. 12A also shows the Common Info field which includes information which is common to the triggered request (for example, information that relates to remote devices participating in the triggered request) and FIG. 12D shows the User Info List which includes information specific to each individual remote device from amongst a sequential list of remote devices participating in the triggered request.

As described in FIG. 12B, the first four bits (B0 to B3) of the Common Info field define a trigger type. In an example, the trigger type has a subfield value of 8 which represents UL-OFDMA sensing trigger. The UL-OFDMA sensing trigger combines a trigger frame format with multiple sensing trigger messages (for example, one sensing trigger message per remote device which is being triggered into making a sensing transmission).

Referring again to FIG. 12D, in an example, in UL-OFDMA sensing trigger message 1210, the field Trigger Dependent User Info includes sensing trigger message data.

As described in FIG. 12C, bits B18 and B19 may define the uplink (UL) bandwidth (BW) of a resulting, combined response. In an example, the encoding of B18 and B19 may be described by Table 1 already provided. The bandwidth of the combined response may refer to the bandwidth of the TXOP, which includes the transmissions of remote devices.

As described in FIG. 12E, the User Info List of UL-OFDMA sensing trigger message 1210 may include data that is specific to remote devices participating in the triggered response. As described in FIG. 12E, the first 12 bits (B0 to B11) of User Info List may define the remote device that the user information is targeting (AID12) and, as described in FIG. 12F and FIG. 12G, bits B12 to B19 may define the resource allocation subfield and the allocation of RUs. In examples, B12 to B19 may define the allocation of RUs according to Table 2, as well as FIG. 8, FIG. 9, FIG. 10A, and FIG. 10B.

In the example shown in FIG. 13, sensing device 502 transmits a single UL-OFDMA sensing trigger message to trigger sensing transmissions from remote devices 504-(1-4). In response to the UL-OFDMA sensing trigger message, each of remote device 504-1, remote device 504-2, remote device 504-3, and remote device 504-4 transmits a sensing transmission (i.e., sensing response message).

Referring back to FIG. 5, in response to receiving the first sensing trigger message, each of plurality of remote devices 504-(1-N) may generate a sensing transmission. In an example, the sensing transmission that the first sensing trigger message triggers from each of plurality of remote devices 504-(1-N) may be a sensing response message. In an implementation, each of plurality of remote devices 504-(1-N) may generate a sensing transmission using the requested transmission configuration and the steering matrix configuration defined by the first sensing trigger message. In scenarios where the steering matrix configuration is not specified by the first sensing trigger message, each of plurality of remote devices 504-(1-N) may use a pre-configured default steering matrix configuration to make the sensing transmission. In an implementation, plurality of remote devices 504-(1-N) may make the first series of sensing transmissions in a single TXOP, i.e., the first TXOP. Accordingly, there is sufficient uplink channel bandwidth available to service the sensing goal of the sensing mode. According to an implementation, plurality of remote devices 504-(1-N) may transmit the first series of sensing transmissions to sensing device 502.

In an implementation, sensing device 502 may receive, via receiving antenna 514, the first series of sensing transmissions transmitted in response to the first sensing trigger message. Upon receiving the first sensing trigger message, sensing agent 516 may generate a first series of sensing measurements based on the first series of sensing transmissions. In an implementation, sensing agent 516 may process the sensing transmission received from each of plurality of remote devices 504-(1-N) to generate the first series of sensing measurements. According to some examples, the steering matrix configuration which has been applied by each of plurality of remote devices 504-(1-N) to make respective sensing transmission may not support the successful transfer of data to sensing device 502. Accordingly, sensing agent 516 may not be able to decode data carried by the sensing transmissions (in examples, data carried by the sensing transmissions is a delivered transmission configuration). However, since the sensing transmissions are made in response to the first sensing trigger message, sensing agent 516 may assume that the sensing transmissions have been made. In an example, sensing agent 516 may assume that the requested transmission configuration has been applied to the sensing transmissions and sensing agent 516 may generates the first series of sensing measurements based on this assumption.

According to an implementation, subsequent to generating the first series of sensing measurements based on the first series of sensing transmissions, sensing agent 516 may obtain an identification of a feature of interest according to the first series of sensing measurements. In an implementation, sensing agent 516 may identify the feature of interest according to the first series of sensing measurements. In some implementations, sensing agent 516 may transmit the first series of sensing measurements to sensing algorithm device 506. On receiving the first series of sensing measurements, sensing algorithm device 506 may execute a sensing algorithm to identify the feature of interest. Further, sensing algorithm device 506 may transmit the identification of the feature of interest to sensing device 502. In an implementation, sensing agent 516 may receive the identification of the feature of interest from sensing algorithm device 506.

According to one or more embodiments, sensing agent 516 may operate in the scanning mode until the feature of interest is identified. Once the feature of interest has been identified in the scanning mode, sensing agent 516 may transition to the detection mode or the hybrid mode. In an implementation, the sensing algorithm may receive a notification that the identification of the feature of interest is complete. The sensing algorithm may then instruct sensing agent 516 to transition from the scanning mode to the detection mode or the hybrid mode.

In an implementation, sensing agent 516 may determine a selection of remote devices according to the feature of interest. In an example, the selection of remote devices may be a subset of plurality of remote devices 504-(1-N). According to an implementation, sensing agent 516 may select those remote devices which are in the vicinity of the feature of interest. In an implementation, sensing agent 516 may allocate second channel resources to second expected transmissions from the selection of remote devices. The second channel resources may be allocated to the selection of remote devices according to a detection mode and may be included within a second TXOP. In some embodiments, sensing agent 516 may include the second channel resources within a same TXOP as was used for the first channel resources.

In an implementation, sensing agent 516 may transmit, via transmitting antenna 512, a second sensing trigger message configured to trigger a second series of sensing transmissions from the selection of remote devices. In an example, the second sensing trigger message may be an UL-OFDMA sensing trigger message which may instruct the selected remote devices to make sensing transmissions using UL-OFDMA. In an example, the second sensing trigger message may be a detection type trigger message. A detection type trigger message may be a trigger message that is used in a detection mode and describes different types of response that fulfills requirements of the detection mode. In an example, the second sensing trigger message may include a requested transmission configuration and a resource allocation subfield corresponding to the detection mode. In an example, the second sensing trigger message may include a steering matrix configuration corresponding to the detection mode. According to an implementation, in response to receiving the second sensing trigger message, the selected remote devices may make generate the second series of sensing transmissions and transmit the second series of sensing transmissions to sensing device 502. In an implementation, sensing agent 516 may receiving, via receiving antenna 514, the second series of sensing transmissions transmitted in response to the second sensing trigger message. In an example, the second series of sensing transmissions may correspond to the detection mode. Upon receiving the second series of sensing transmissions, sensing agent 516 may generate a second series of sensing measurements based on the second series of sensing transmissions. In an implementation, the second series of sensing measurements may have a higher resolution than the first series of sensing measurements. According to an implementation, sensing agent 516 may be configured to process and to analyze the second series of sensing measurements to achieve sensing goals, such as detecting movements and/or motions. Therefore, sensing agent 516 may benefit from an ability to request sensing transmissions of variable resolution compatible with the requirement of the sensing algorithm and obtain them in the most efficient way. Also, TXOP and UL-OFDMA may allow sensing device 502 to secure an opportunity for many remote devices (up to all of plurality of remote devices 504-(1-N) in the BSS) to transmit a sensing transmission at the same time and with parameters that may be controlled to achieve the sensing goals efficiently and with minimum measurement time jitter and minimum overhead.

According to some embodiments, the second sensing trigger message may include a hybrid type trigger message. A hybrid type trigger message may be a trigger message that is used in a hybrid mode and describes different types of response that fulfills requirements of the hybrid mode. In an example, hybrid type trigger message may include a requested transmission configuration and a resource allocation subfield corresponding to the hybrid mode. In an example, the second sensing trigger message may include a steering matrix configuration corresponding to the hybrid mode. In an example, the hybrid type trigger message may be configured to trigger, from a first group of remote devices, a first second series of sensing transmissions corresponding to the scanning mode and to trigger, from a second group of remote devices, a second second series of sensing transmissions corresponding to a detection mode. In an implementation, sensing agent 516 may allocate a first portion of the second channel resources to sensing transmissions of the first second series of sensing transmissions received responsive to the hybrid type trigger message and a second portion of the second channel resources to sensing transmissions of the second second series of sensing transmissions received responsive to the hybrid type trigger message.

According to one or more embodiments, in scenarios where the requirements of sensing agent 516 necessitate sensing transmissions from plurality of remote devices 504-(1-N) that collectively exceed the available uplink bandwidth of the second TXOP, a MU cascading sequence may be used. In an example, a situation where the sensing transmission requirements may exceed the available uplink bandwidth may arise when sensing agent 516 may require a large number of remote devices to provide sensing transmissions in parallel. Such situation may more likely arise when sensing agent 516 requires wide bandwidth sensing transmissions from plurality of remote devices 504-(1-N) to achieve a sensing goal or when a quantity of plurality of remote devices 504-(1-N) is very large. In an implementation, MU cascading sequence may allow the transmission of a more complex block of sensing transmissions from plurality of remote devices 504-(1-N) to sensing device 502 within the same TXOP. In effect, MU cascading sequence may allow both time and frequency division multiple access.

According to an implementation, the MU cascading sequence may allow multiple UL-OFMDA sensing triggers and sensing transmissions to be made in a single TXOP. In an example, more than one trigger-transmission pair may be accommodated in the duration of the TXOP. In an implementation, the MU cascading sequence may enable sensing agent 516 to solicit sensing transmissions from multiple remote devices in a single TXOP even if the total aggregate bandwidth of those sensing transmissions exceeds the uplink channel bandwidth. In an implementation, in the MU cascading sequence, the AC of the TXOP is negotiated prior to the generation of the UL-OFDMA sensing trigger. In some examples, AC_VO or AC_VI are selected for MU cascading sequence as these allow the transmission of multiple frames in the same TXOP (up to the duration of the TXOP). The durations of TXOP for AC_VO and AC_VI are determined by the IEEE 802.11 system and in examples, sensing agent 516 may determine the AC of its TXOP as a function of requirements of sensing agent 516 at the time of negotiation. In an implementation, sensing agent 516 may request a longer TXOP (via its AC) when a longer sequence of triggered sensing transmissions is required.

Figure 14:
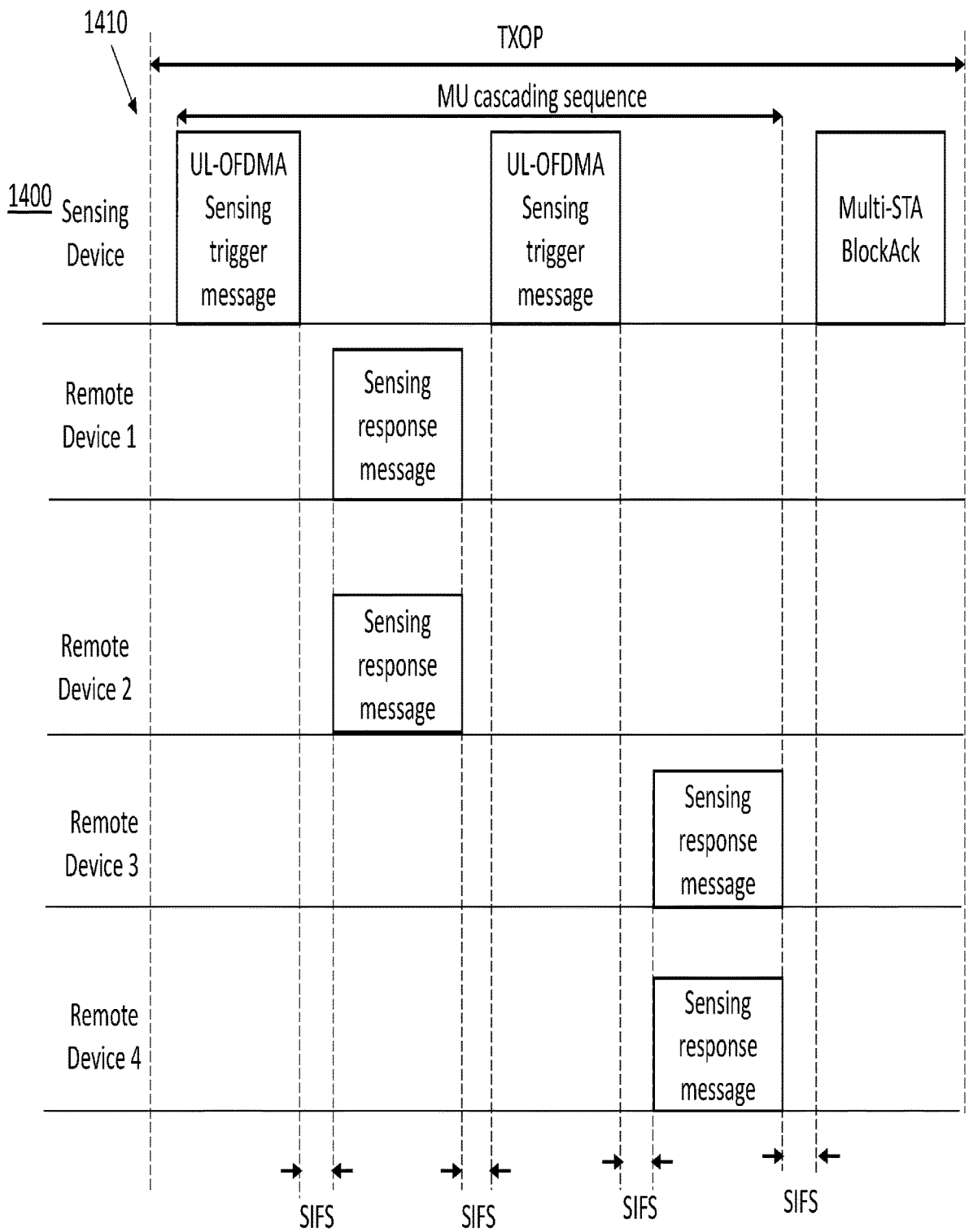
FIG. 14 depicts an exemplary multi-user (MU) cascading sequence sensing transmission transaction, according to some embodiments.

According to some embodiments, a sensing goal may require that the transmission bandwidth for the total of all sensing transmissions may be large that there may be insufficient bandwidth available in the allocated channel to make all sensing transmissions in parallel. In such scenarios, the channel usage may be maximized by allocating entire channel bandwidth to a first set of remote devices to make a first set of sensing transmission and then re-allocating the same channel bandwidth to a second set of remote devices to make a second set of sensing transmissions. In an example, the re-allocation of the channel bandwidth may be repeated until all remote devices have made a sensing transmission. In some embodiments, a sensing goal may require that multiple sensing transmissions should be from the same remote device but with different transmission parameters. Accordingly, the same remote device may be triggered multiple times in the same TXOP with multiple UL-OFDMA sensing triggers. FIG. 14 depicts an exemplary MU cascading sequence sensing transmission transaction 1410.

Figure 15:
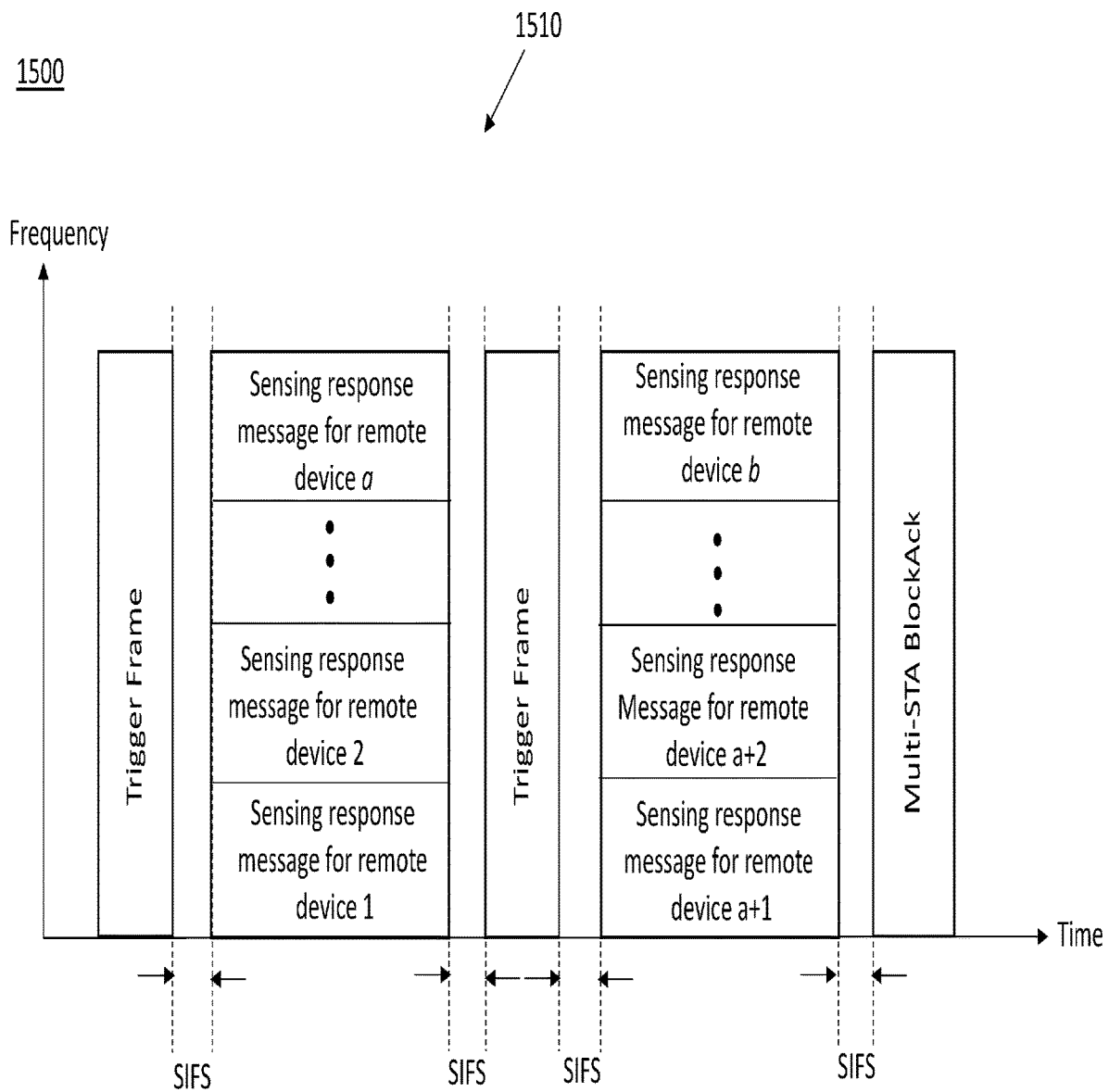
FIG. 15 depicts an exemplary MU cascading sequence sensing transmission transaction for scanning a large network, according to some embodiments.

According to one or more embodiments, MU cascaded sequence may be used to trigger sensing transmissions in scanning, detection, and hybrid modes. In examples, MU cascaded sequence may be used for scanning a large network, for detecting multiple features of interest, for detecting a feature of interest whilst maintaining a full network scan, and detecting a feature of interest with a large bandwidth sensing transmission In an example, when a network of remote devices is extremely large, then it may not be possible to scan the network with an available bandwidth in a TXOP. For example, this situation may arise if the available bandwidth in the TXOP is limited. In an example, only a 20 MHz channel may be available. Accordingly, the number of RUs may be limited. In some examples, bandwidth selected for the scanning operation may be high in comparison to the available bandwidth. In such scenario, MU cascading sequence may be used to scan the network using sequential blocks, with each block accommodating a maximum number of remote devices possible with the bandwidth for the scanning operation allocated to each remote device. FIG. 15 depicts exemplary MU cascading sequence sensing transmission transaction 1510 for scanning a large network. As shown in FIG. 15, there are a total of b remote devices in the network and the b remote devices are scanned sequentially in two blocks.

In some examples, multiple features of interest may have been identified. A subset of remote devices which supports the analysis of each feature of interest may be identified and a sensing transmission from each subset of remote devices may be triggered. In an example, each subset of remote devices may be independent and may be mutually exclusive or may share any number of remote devices. In some examples, each feature of interest may be analyzed by sensing transmissions of equal bandwidth and in other examples, sensing transmissions of differing bandwidths may be used. In an example, the bandwidth of the sensing transmission used may be greater than that used to scan the network.

According to some embodiments, the identified feature of interest may include a first feature of interest and a second feature of interest. In such scenarios, sensing agent 516 may determine a first selection of remote devices according to the first feature of interest and a second selection of remote devices according to the second feature of interest. Further, sensing agent 516 may allocate a first portion of the second channel resources to the first selection of remote devices and a second portion of the second channel resources to the second selection of remote devices.

Figure 16:
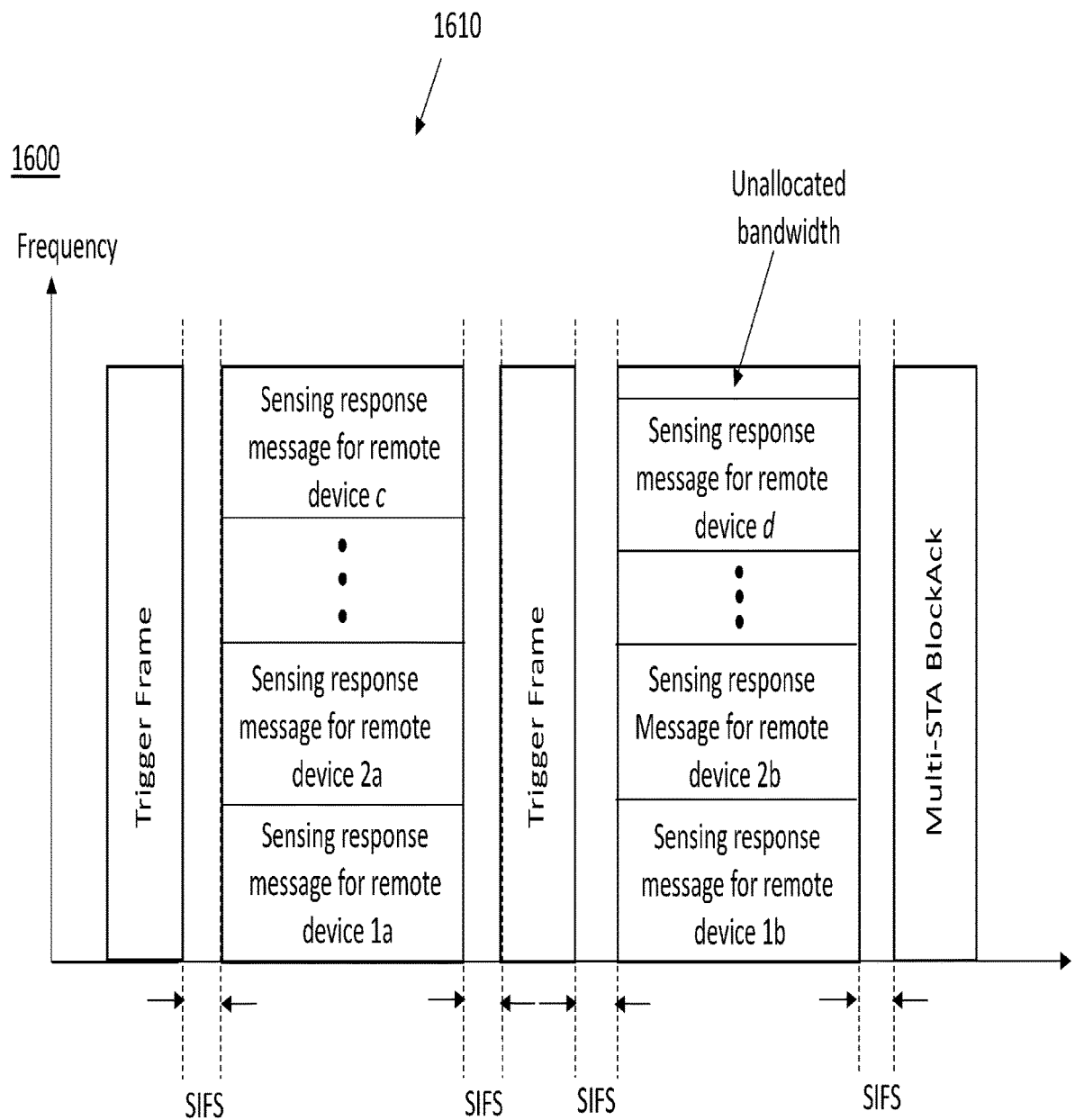
FIG. 16 depicts an exemplary MU cascading sequence sensing transmission transaction for detecting multiple features of interest, according to some embodiments.

FIG. 16 depicts exemplary MU cascading sequence sensing transmission transaction 1610 for detecting multiple features of interest. In an implementation, there may be two features of interest which may have been identified, namely a first feature of interest and a second feature of interest. In an example, there may be c remote devices associated with the first feature of interest and d remote devices may be associated with the second feature of interest. In an example, c remote devices may be greater in number than d remote devices. In the example, all the available bandwidth of the TXOP is used for a first detection. However, since c remote devices are greater in number in than d remote devices, there is some unallocated bandwidth in a second detection.

Figure 17:
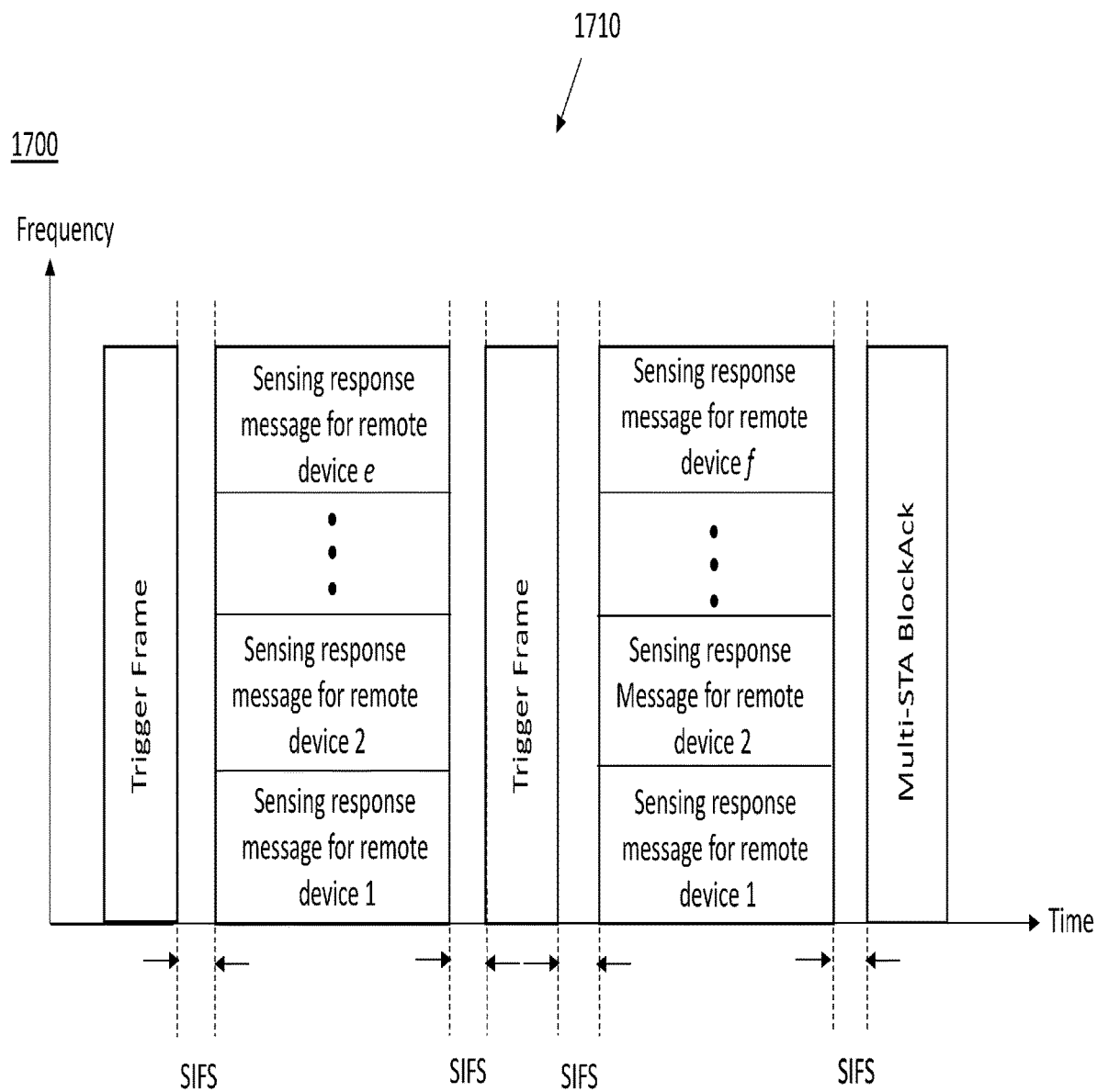
FIG. 17 depicts an exemplary MU cascading sequence sensing transmission transaction used for detecting a feature of interest whilst maintaining a full network scan, according to some embodiments.

In an example, a feature of interest may have been identified and analyzed in detail. In addition, a full network scan may continue with a second trigger: this is an example of a hybrid mode using MU cascading sequence. In an example, the bandwidth of the sensing transmission used to detect the feature of interest may be greater than that used to scan the network. FIG. 17 depicts exemplary MU cascading sequence sensing transmission transaction 1710 for detecting a feature of interest whilst maintaining a full network scan. In an example, there may be f remote devices in the network. In addition, the subset of e remote devices may be included within the set off remote devices. The e remote devices may be associated with the feature of interest. In an example, all the available bandwidth of the TXOP is used first for the detection and then for the scan.

Figure 18:
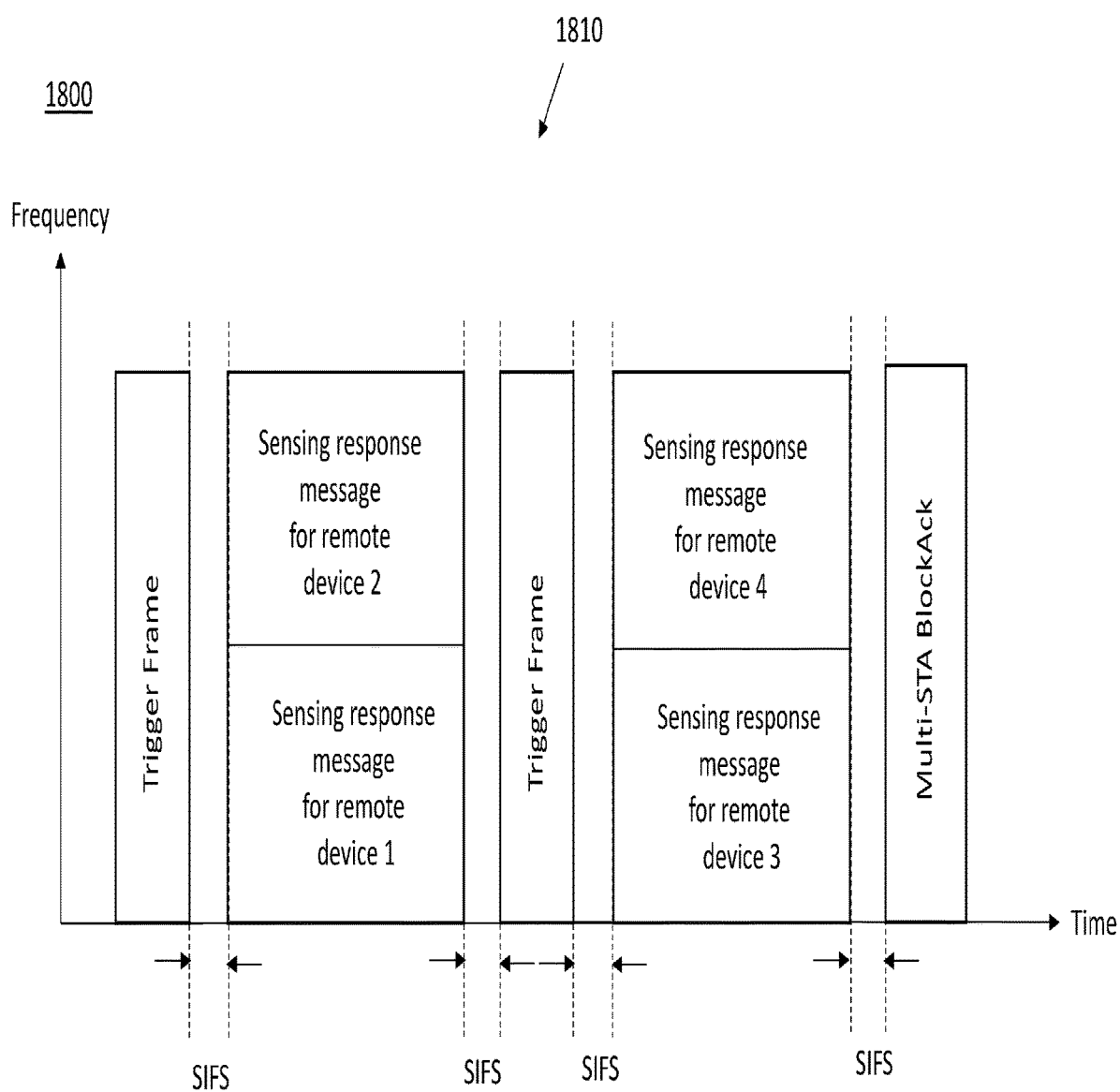
FIG. 18 depicts an exemplary MU cascading sequence sensing transmission transaction for detecting a feature of interest with a large bandwidth sensing transmission, according to some embodiments.

In an example, a feature of interest may have been identified. Further, it may have been determined that a large bandwidth sensing transmission is required and that the available bandwidth in the TXOP is not sufficient to accommodate all sensing transmissions in parallel. In such a scenario, the sensing transmissions may be triggered in blocks based on an algorithm that delivers the sensing transmissions in a fastest manner. FIG. 18 depicts exemplary MU cascading sequence sensing transmission transaction 1810 for detecting a feature of interest with a large bandwidth sensing transmission. As shown in FIG. 18, there may be four remote devices (i.e., remote device 1, remote device 2, remote device 3, and remote device 4) associated with the feature of interest. The sensing transmissions to these four remote devices may be triggered in two sequential blocks.

As described above, some embodiments of the present disclosure define two sensing message types for Wi-Fi sensing, namely, UL-OFDMA sensing trigger message and sensing response message. In an example, message types are carried in a newly defined IEEE 802.11 Management frame. In some examples, message types are carried in a newly defined IEEE 802.11 Control frame. In some examples, a combination of Management and Control frames may be used to realize these sensing message types. In some examples, timing configuration, transmission configuration, and steering matrix configuration may be carried by the UL-OFDMA sensing trigger message and sensing response message. In an example, timing configuration, transmission configuration, and steering matrix configuration may be implemented as IEEE 802.11 elements. In another example, timing configuration, transmission configuration, and steering matrix configuration carried by a UL-OFDMA sensing trigger message or a sensing response message may be referred in its totality as a sensing measurement parameter element.

In one or more embodiments, the sensing message types may be identified by the message type field, and each sensing message type may or may not carry the other identified elements, according to some embodiments. Examples of sensing message types and configuration elements are provided in Table 3.

TABLE 3

| | | | Sensing message types and configuration elements | | |
|---|---|---|---|---|---|
| Value | Message Type | Message Direction | Transmission Configuration | Timing Configuration | Steering Matrix Configuration |
| 2 | Sensing trigger message | Sensing device to remote device | Optional Option 1: If this element is absent then remote device | Not Required Although this field may in some cases be optional in a | Optional Option 1: If this element is absent, then remote device |

TABLE 3-continued

Sensing message types and configuration elements

| Value | Message Type | Message Direction | Transmission Configuration | Timing Configuration | Steering Matrix Configuration |
|---|---|---|---|---|---|
| | | | may use preconfigured requested transmission configuration values from a sensing configuration message. Option 2: If this element is present in the sensing trigger message, remote device applies the requested transmission configuration from this element. | sensing trigger message, its use is not supported, and it may be omitted. In examples, if this configuration is present then it will be ignored. When this configuration is absent, then this message initiates a single sensing transmission. | transmits the one or more sensing transmissions specified by the sensing trigger message using the preconfigured default steering matrix configuration. Option 2: If this element is present, the element specifies a steering matrix to use for remote device sensing transmission, or a series of steering matrix configurations to use for sensing transmissions of a measurement campaign. The steering matrix configuration(s) can be specified using indices into a preconfigured steering matrix configuration table, or specific beamforming weights for each transmit path or transmitting antenna of remote device may be specified. |
| 4 | Sensing response message | Remote device to sensing device | Optional Option 1: Transmission parameters of this transmission (delivered transmission configuration) Option 2: A single bit flag if remote device applies the requested transmission configuration. Option 3: If this element is absent then remote device applies the requested transmission parameters | N/A | Optional Option 1: Steering matrix configuration applied to this transmission. Option 2: Index into a preconfigured steering matrix configuration table indicating the steering matrix configuration applied to this transmission. Option 3: If this element is absent then remote device applies the requested steering matrix configuration |
| 0, 1, 3 and 5 . . . 255 | Reserved | | N/A | N/A | N/A |

Exemplary transmission configuration elements (for example, required transmission configuration or delivered transmission configuration) for a sensing transmission are provided in Table 4.

TABLE 4

Transmission Configuration Element Details

| Name | Type | Valid Range | Description |
|---|---|---|---|
| SensingFrequencyBand | A set of frequency band values or identifiers | As defined in Table 5 (SensingFrequencyBand details) | Specifies the band in which sensing device is to take the sensing measurement |
| SensingBandwidth | N/A | N/A | N/A |
| SensingChannel | N/A | N/A | N/A |
| SensingTrainingField | A set of training field values | As defined in Table 6 (SensingTrainingField details) | Identifies the training field which is to be used for the sensing measurement |
| SensingSpatialConf-Index | Integer | 0 ... 15 | Index into a table of steering matrix configurations, such as may be preconfigured for remote device via a sensing configuration message and optionally acknowledged by a sensing configuration response message. 0 may be reserved to indicate no configuration requirement (e.g., the remote device may use a default spatial matrix configuration) and 15 may be reserved to indicate for remote device to apply the steering matrix configuration specified by the SensingSpatialConf-Index |
| SensingSpatialConfSteeringMatrix | A set of spatial steering vector values, for example a phase and gain value, or a real (I) and imaginary (Q) value, each representing a steering matrix configuration | As defined in Table 7 (SensingSpatialConfSteeringMatrix details) | A series of steering vectors values (i.e., spatial matrix configurations) which are applied to each of the implemented antennas on remote device prior to the sending of a sensing transmission |

TABLE 5

SensingFrequencyBand details

| Value | Meaning |
|---|---|
| 0 | Reserved |
| 1 | 2.4 GHz |
| 2 | 5 GHz |
| 3 | 6 GHz |
| 4 | 60 GHz |
| 5 ... 15 | Reserved |

TABLE 6

SensingTrainingField details

| Value | Meaning |
|---|---|
| 0 | Reserved |
| 1 | L-LTF |
| 2 | HT-LTF |
| 3 | VHT-LTF |
| 4 | HE-LTF |
| 5 ... 15 | Reserved |

TABLE 7

SensingSpatialConfSteeringMatrix details

| Name | Type | Valid Range | Description |
|---|---|---|---|
| TransmissionAntennaCount | Integer | 1 . . . 8 | Number of transmission antennas on the remote device used for sensing transmissions. Defines the number of SensingAntennaNSteering VectorRe and SensingAntennaNSteeringVectorIm pairs that follow in the element. At least one antenna must be specified |
| SensingAntenna0-SteeringVectorRe | Half-precision float (16 bits) | | Real part of the steering vector for antenna 0 |
| SensingAntenna0-SteeringVectorIm | Half-precision float (16 bits) | | Imaginary part of the steering vector for antenna 0 |
| . . . | . . . | | . . . |
| SensingAntenna7-SteeringVectorRe | Half-precision float (16 bits) | | Real part of the steering vector for antenna 7 |
| SensingAntenna7-SteeringVectorIm | Half-precision float (16 bits) | | Imaginary part of the steering vector for antenna 7 |

Table 4 describes transmission configuration elements (requested transmission configuration or delivered transmission configuration) for a sensing transmission. In an example, these data are encoded into an element for inclusion in sensing messages between sensing device 502 and plurality of remote devices 504-(1-N) or vice versa. In a measurement campaign involving multiple remote devices, these parameters may be defined for all remote devices (i.e., per remote device). When transmitted from a sensing device to a remote device then these parameters may configure a remote device sensing transmission and when transmitted from the remote device to the sensing device then these parameters may report the configuration used by the remote device for the sensing transmission.

According to some implementations, the steering matrix configuration element details are described in Table 8.

TABLE 8

Steering Matrix Configuration Element details

| Name | Type | Valid Range | Description |
|---|---|---|---|
| LookupEntriesCount | Integer | 1 . . . 14 | Number of entries in the lookup table specified by this element. Defines the number of EntryM . . . sets of data that follow in the element. At least one entry must be specified. |
| TransmissionAntennaCount | Integer | 1 . . . 8 | Number of transmission antennas on the remote devices used for sensing transmissions. Defines the number of SensingAntennaNSteeringVectorRe and SensingAntennaNSteeringVectorIm pairs that follow in the element. At least one antenna must be specified. |
| Entry1SensingAntenna0-SteeringVectorRe | Half-precision float (16 bits) | | Real part of the steering vector for antenna 0 in lookup table entry 1 |
| Entry1SensingAntenna0-SteeringVectorIm | Half-precision float (16 bits) | | Imaginary part of the steering vector for antenna 0 in lookup table entry 1 |
| . . . | . . . | | . . . |
| Entry1SensingAntenna7-SteeringVectorRe | Half-precision float (16 bits) | | Real part of the steering vector for antenna 7 in lookup table entry 1 |
| Entry1SensingAntenna7-SteeringVectorIm | Half-precision float (16 bits) | | Imaginary part of the steering vector for antenna 7 in lookup table entry 1 |
| . . . | . . . | | . . . |
| Entry14SensingAntenna0-SteeringVectorRe | Half-precision float (16 bits) | | Real part of the steering vector for antenna 0 in lookup table entry 14 |

TABLE 8-continued

Steering Matrix Configuration Element details

| Name | Type | Valid Range | Description |
|---|---|---|---|
| Entry14SensingAntenna0-SteeringVectorIm | Half-precision float (16 bits) | | Imaginary part of the steering vector for antenna 0 in lookup table entry 14 |
| . | . | | . |
| . | . | | . |
| . | . | | . |
| Entry14SensingAntenna7-SteeringVectorRe | Half-precision float (16 bits) | | Real part of the steering vector for antenna 7 in lookup table entry 14 |
| Entry14SensingAntenna7-SteeringVectorIm | Half-precision float (16 bits) | | Imaginary part of the steering vector for antenna 7 in lookup table entry 14 |

In an example, the data provided in Table 8 may be encoded into an element for inclusion in the messages between sensing device 502 and plurality of remote devices 504-(1-N). In a measurement campaign involving multiple remote devices, these parameters may be defined for all devices. When transmitted from sensing device 502 to plurality of remote devices 504-(1-N) then the steering matrix configurations populate a lookup table (which can later be accessed via an index).

Figure 19A:
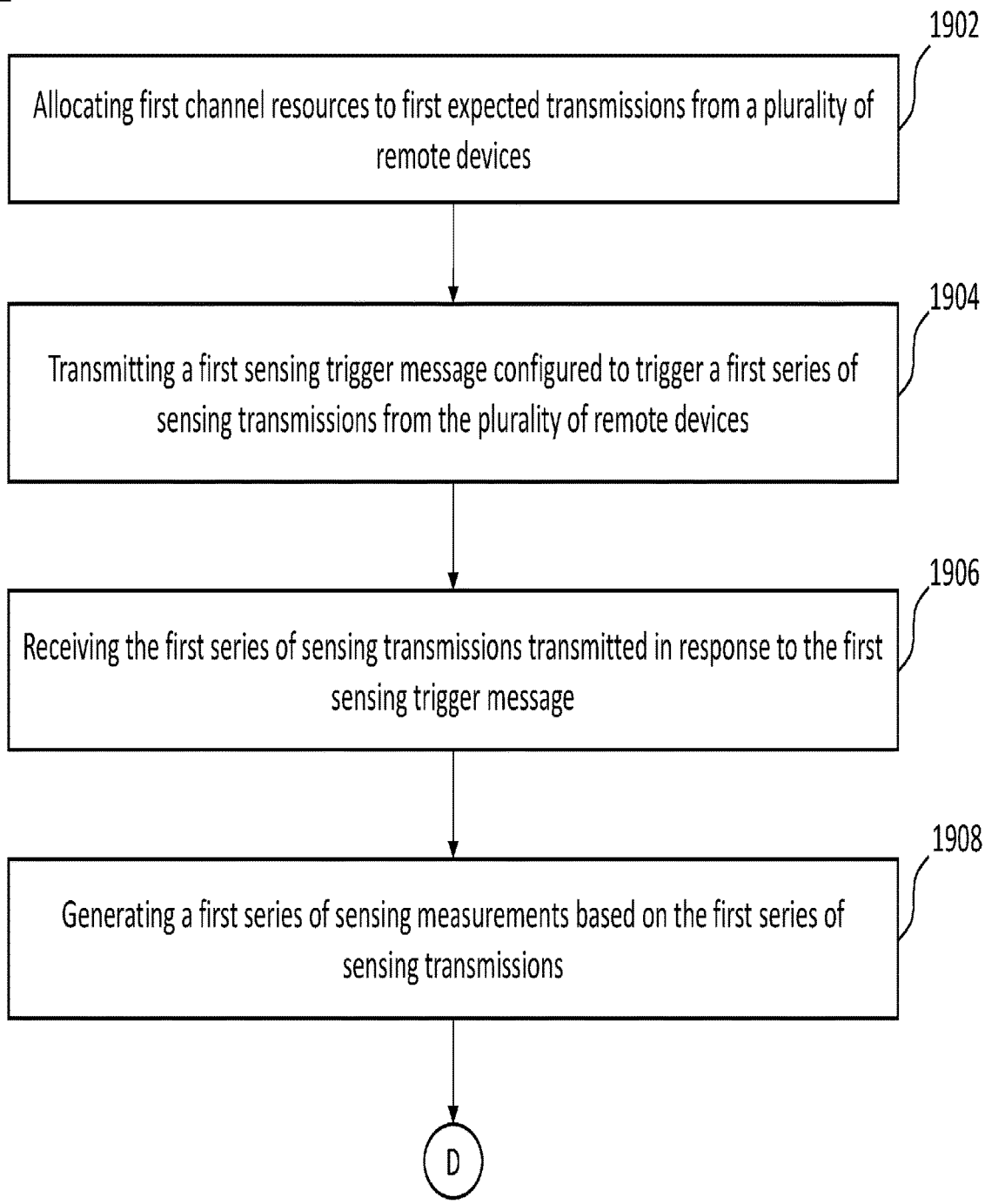
FIG. 19A to FIG. 19C depict a flowchart for generating sensing measurements based on a feature of interest, according to some embodiments.
Figure 19B:
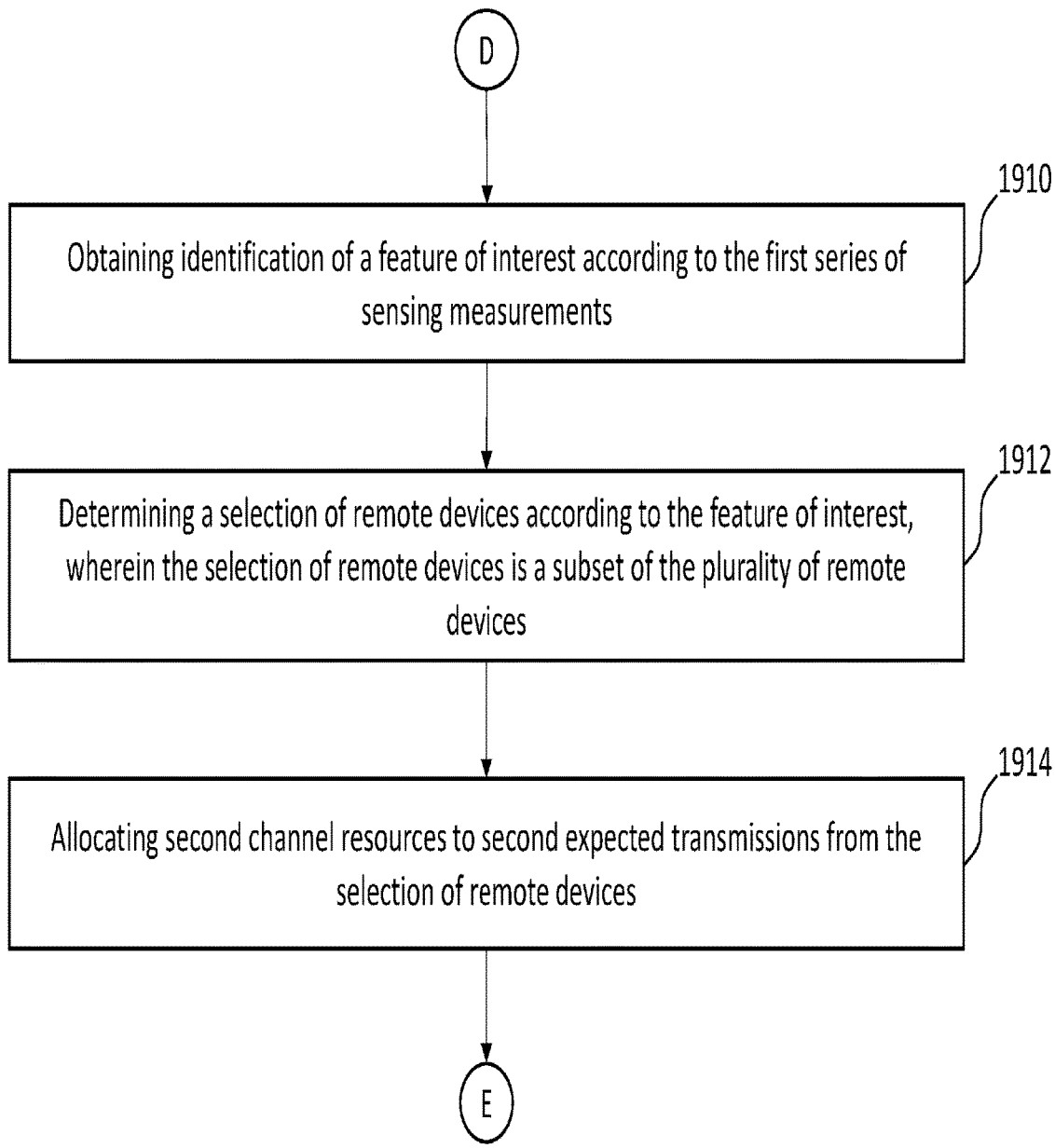
Figure 19C:
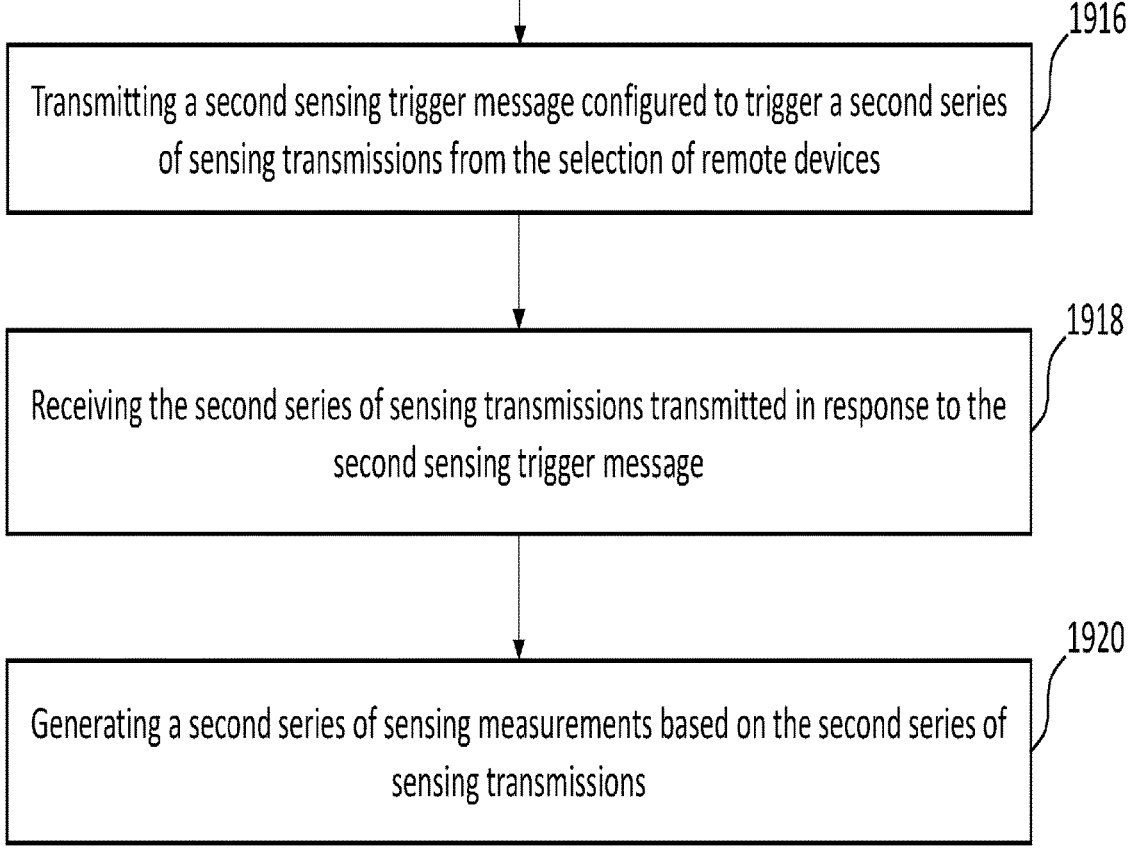
Figure 20A:
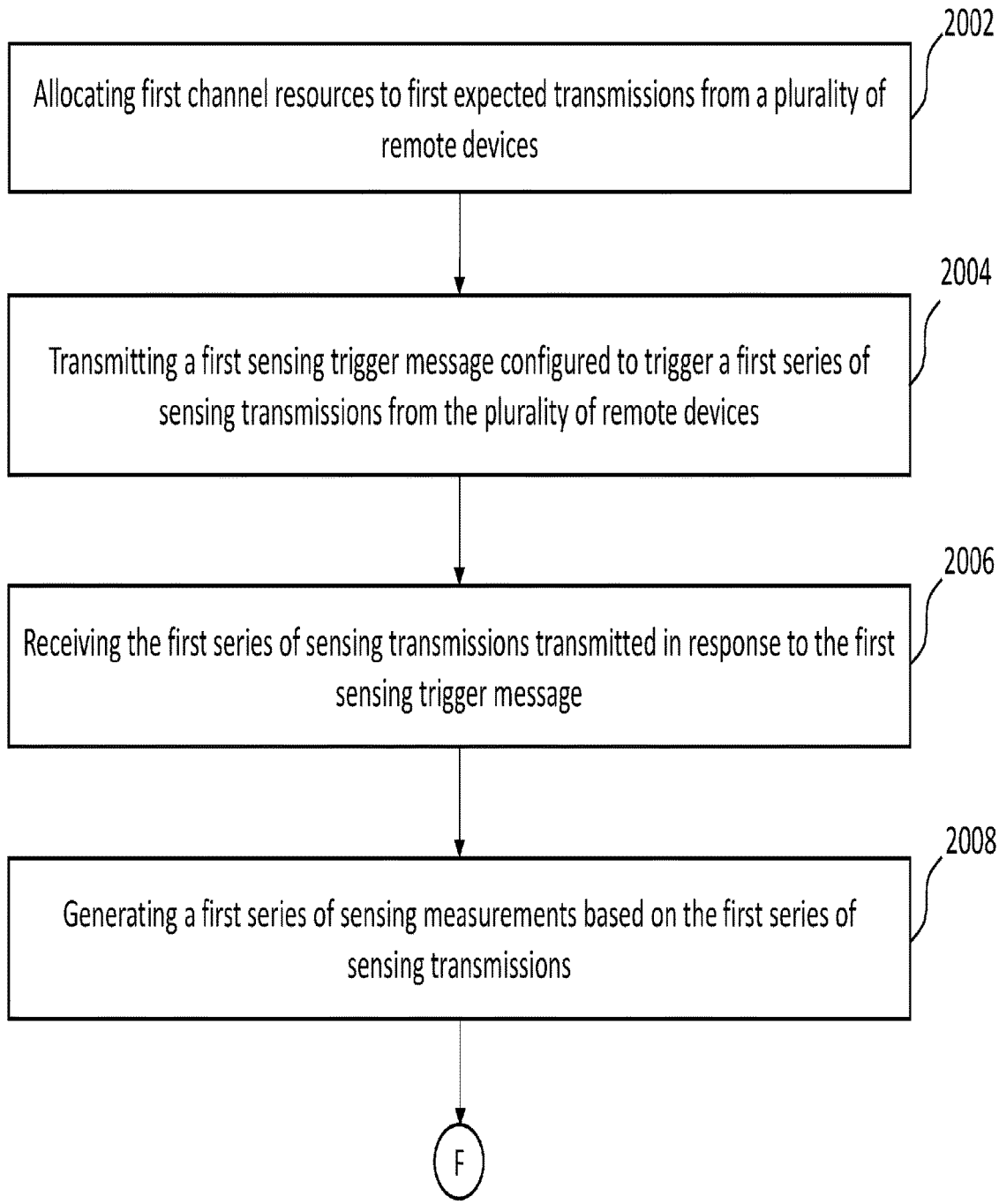
FIG. 20A to FIG. 20D depict a flowchart for generating sensing measurements based on multiple features of interest, according to some embodiments.
Figure 20B:
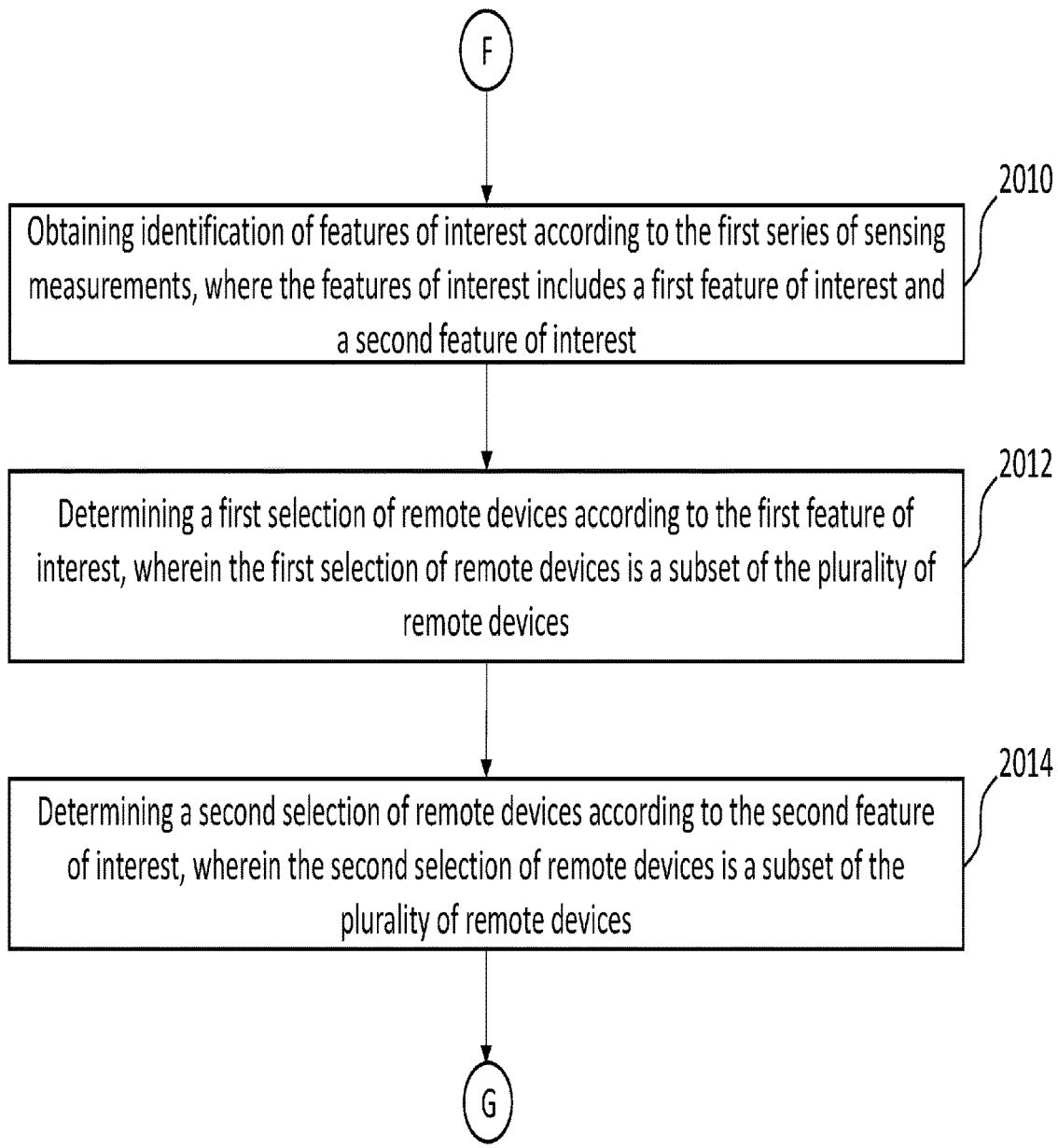
Figure 20C:
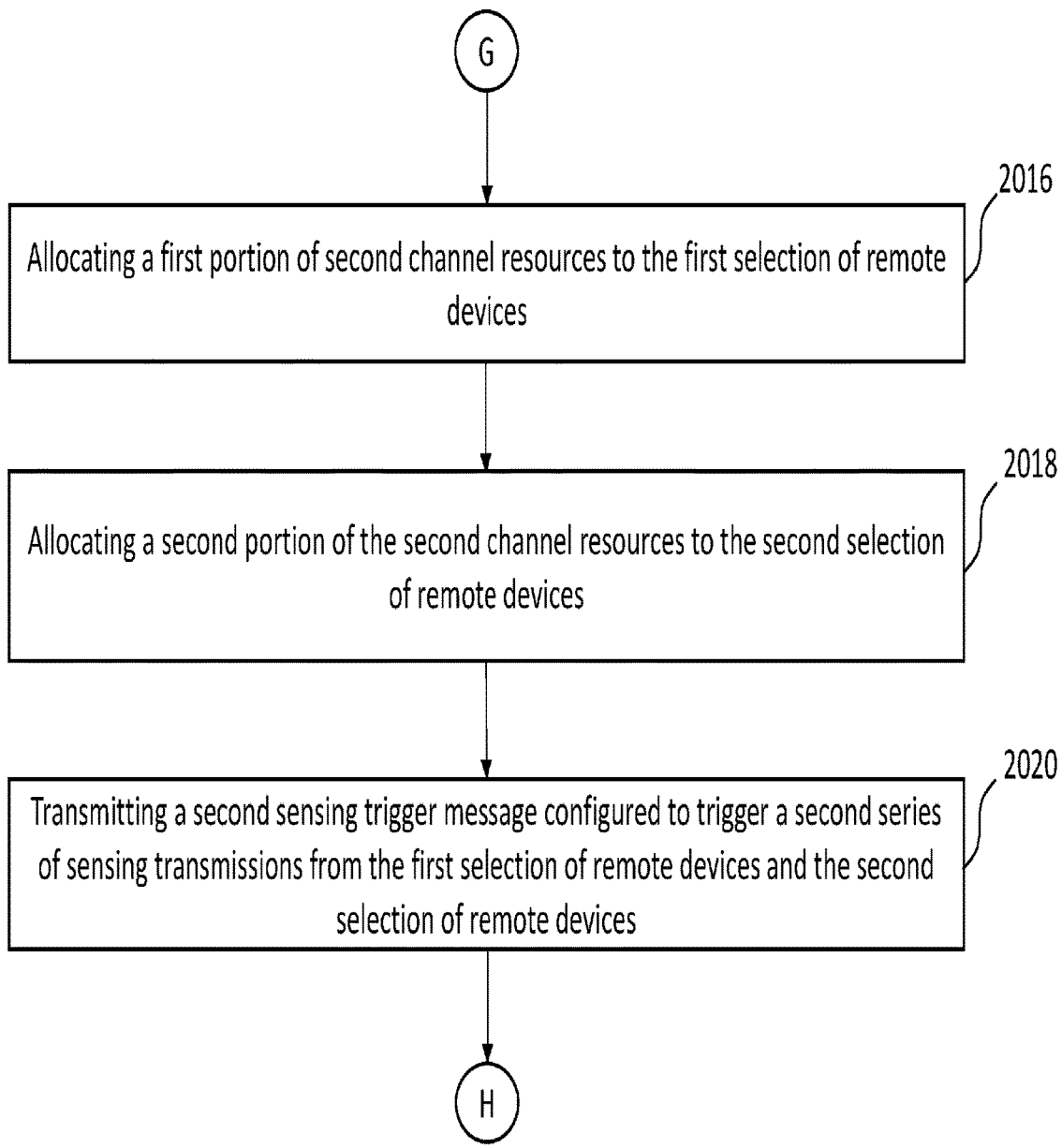
Figure 20D:
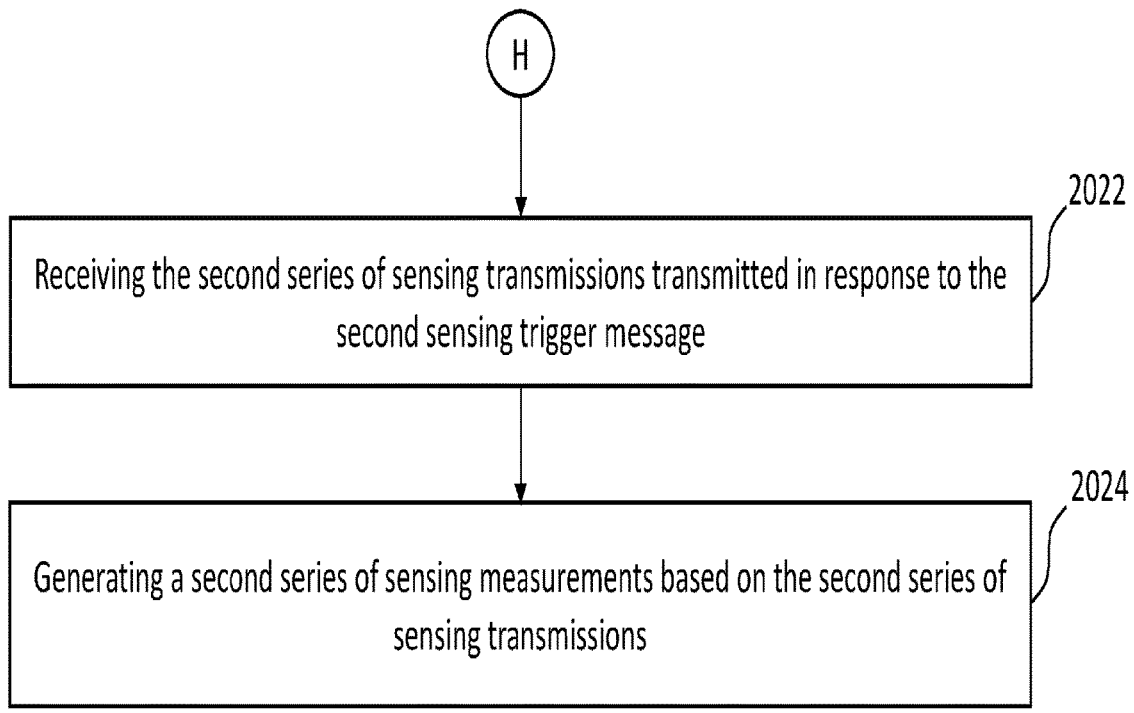

FIG. 19A to FIG. 19C depict flowchart 1900 for generating sensing measurements based on a feature of interest, according to some embodiments.

In brief over of an implementation of flowchart 1900, at step 1902, first channel resources are allocated to first expected transmissions from a plurality of remote devices. At step 1904, a first sensing trigger message configured to trigger a first series of sensing transmissions from the plurality of remote devices is transmitted. At step 1906, the first series of sensing transmissions transmitted in response to the first sensing trigger message is received. At step 1908, a first series of sensing measurements is generated based on the first series of sensing transmissions. At step 1910, an identification of a feature of interest is obtained according to the first series of sensing measurements. At step 1912, a selection of remote devices is determined according to the feature of interest. At step 1914, second channel resources are allocated to second expected transmissions from the selection of remote devices. At step 1916, a second sensing trigger message configured to trigger a second series of sensing transmissions from the selection of remote devices is transmitted. At step 1918, the second series of sensing transmissions transmitted in response to the second sensing trigger message is received. At step 1920, a second series of sensing measurements is generated based on the second series of sensing transmissions.

Step 1902 includes allocating first channel resources to first expected transmissions from a plurality of remote devices. In an implementation, sensing agent 516 may be configured to allocate first channel resources to first expected transmissions from plurality of remote devices 504-(1-N). In an implementation, sensing agent 516 may include the first channel resources within a first TXOP and allocate the first channel resources to plurality of remote devices 504-(1-N) according to a scanning mode. In an example, sensing agent 516 may allocate the first channel resources by allocating time and bandwidth within the first TXOP to plurality of remote devices 504-(1-N).

Step 1904 includes transmitting a first sensing trigger message configured to trigger a first series of sensing transmissions from the plurality of remote devices. According to an implementation, sensing agent 516 may transmit first sensing trigger message configured to trigger the first series of sensing transmissions from plurality of remote devices 504-(1-N). In an example, the first sensing trigger message may be a scanning type trigger message including a requested transmission configuration and a resource allocation subfield corresponding to the scanning mode.

Step 1906 includes receiving the first series of sensing transmissions transmitted in response to the first sensing trigger message. In an implementation, sensing agent 516 may receive the first series of sensing transmissions transmitted in response to the first sensing trigger message. In an example, the first series of sensing transmissions may correspond to the scanning mode.

Step 1908 includes generating a first series of sensing measurements based on the first series of sensing transmissions. In an implementation, sensing agent 516 may generate the first series of sensing measurements based on the first series of sensing transmissions. According to an implementation, sensing agent 516 may process the first series of sensing transmissions in order to generate the first series of sensing measurements.

Step 1910 includes obtaining identification of a feature of interest according to the first series of sensing measurements. In an implementation, obtaining the identification of the feature of interest may include identifying the feature of interest based on the first series of sensing measurements. In an implementation, responsive to the first series of sensing measurements, the sensing agent 516 may identify the feature of interest.

Step 1912 includes determining a selection of remote devices according to the feature of interest, where the selection of remote devices is a subset of the plurality of remote devices. In an example, determining the selection of remote devices includes selecting remote devices from plurality of remote devices 504-(1-N) in a vicinity of the feature of interest to include in the selection of remote devices. In an implementation, sensing agent 516 may determine the selection of remote devices according to the feature of interest.

Step 1914 includes allocating second channel resources to second expected transmissions from the selection of remote devices. In an implementation, sensing agent 516 may allocate second channel resources to second expected transmissions from the selection of remote devices according to a detection mode. According to an implementation, sensing agent 516 may include the second channel resources within a second TXOP. In some examples, sensing agent 516 may include the second channel resources with a same TXOP that was used for allocating the first channel resources.

Step 1916 includes transmitting a second sensing trigger message configured to trigger a second series of sensing transmissions from the selection of remote devices. According to an implementation, sensing agent 516 may transmit the second sensing trigger message configured to trigger the second series of sensing transmissions from the selection of remote devices. In an example, the second sensing trigger message may be a detection type trigger message including a requested transmission configuration and a resource allocation subfield corresponding to the detection mode. In some examples, the second sensing trigger message may include a hybrid type trigger message. The hybrid type trigger message may be configured to trigger, from a first group of remote devices, a first second series of sensing transmissions corresponding to the scanning mode and to trigger, from a second group of remote devices, a second second series of sensing transmissions corresponding to the detection mode.

Step 1918 includes receiving the second series of sensing transmissions transmitted in response to the second sensing trigger message. According to an implementation, sensing agent 516 may receive the second series of sensing transmissions transmitted in response to the second sensing trigger message. In an example, the second series of sensing transmissions may correspond to the detection mode. In an example, the second series of sensing transmissions may correspond to the hybrid mode.

Step 1920 includes generating a second series of sensing measurements based on the second series of sensing transmissions. In an implementation, sensing agent 516 may generate the second series of sensing measurements based on the second series of sensing transmissions. According to an implementation, sensing agent 516 may execute a sensing algorithm to process the second series of sensing transmissions to generate the second series of sensing measurements. In an example, the second series of sensing measurements are of a higher resolution than the first series of sensing measurements.

FIG. 20A to FIG. 20D depict flowchart 2000 for generating sensing measurements based on multiple features of interest, according to some embodiments.

In brief over of an implementation of flowchart 2000, at step 2002, first channel resources are allocated to first expected transmissions from a plurality of remote devices. At step 2004, a first sensing trigger message configured to trigger a first series of sensing transmissions from the plurality of remote devices is transmitted. At step 2006, the first series of sensing transmissions transmitted in response to the first sensing trigger message is received. At step 2008, a first series of sensing measurements is generated based on the first series of sensing transmissions. At step 2010, an identification of features of interest is obtained according to the first series of sensing measurements. The features of interest include a first feature of interest and a second feature of interest. At step 2012, a first selection of remote devices is determined according to the first feature of interest. At step 2014, a second selection of remote devices is obtained according to the second feature of interest. At step 2016, a first portion of second channel resources is allocated to the first selection of remote devices. At step 2018, a second portion of the second channel resources is allocated to the second selection of remote devices. At step 2020, a second sensing trigger message is transmitted to trigger a second series of sensing transmissions from the first selection of remote devices and the second selection of remote devices. At step 2022, the second series of sensing transmissions transmitted in response to the second sensing trigger message is received. At step 2024, a second series of sensing measurements is generated based on the second series of sensing transmissions.

Step 2002 includes allocating first channel resources to first expected transmissions from a plurality of remote devices. In an implementation, sensing agent 516 may be configured to allocate first channel resources to first expected transmissions from plurality of remote devices 504-(1-N). In an implementation, sensing agent 516 may include the first channel resources within a first TXOP and allocate the first channel resources to plurality of remote devices 504-(1-N) according to a scanning mode. In an example, sensing agent 516 may allocate the first channel resources by allocating time and bandwidth within the first TXOP to plurality of remote devices 504-(1-N).

Step 2004 includes transmitting a first sensing trigger message configured to trigger a first series of sensing transmissions from the plurality of remote devices. According to an implementation, sensing agent 516 may transmit first sensing trigger message configured to trigger the first series of sensing transmissions from plurality of remote devices 504-(1-N). In an example, the first sensing trigger message may be a scanning type trigger message including a requested transmission configuration and a resource allocation subfield corresponding to the scanning mode.

Step 2006 includes receiving the first series of sensing transmissions transmitted in response to the first sensing trigger message. In an implementation, sensing agent 516 may receive the first series of sensing transmissions transmitted in response to the first sensing trigger message. In an example, the first series of sensing transmissions may correspond to the scanning mode.

Step 2008 includes generating a first series of sensing measurements based on the first series of sensing transmissions. In an implementation, sensing agent 516 may generate the first series of sensing measurements based on the first series of sensing transmissions.

Step 2010 includes obtaining identification of features of interest according to the first series of sensing measurements. In an example, the features of interest may include a first feature of interest and a second feature of interest. In an implementation, the sensing agent 516 may identify the features of interest based on the first series of sensing measurements.

Step 2012 includes determining a first selection of remote devices according to the first feature of interest. In an example, the first selection of remote devices may be a subset of plurality of remote devices 504-(1-N). In an implementation, sensing agent 516 may determine the first selection of remote devices according to the first feature of interest.

Step 2014 includes determining a second selection of remote devices according to the second feature of interest. In an example, the second selection of remote devices may be a subset of plurality of remote devices 504-(1-N). In an implementation, sensing agent 516 may determine the second selection of remote devices according to the second feature of interest.

Step 2016 includes allocating a first portion of second channel resources to the first selection of remote devices. In an implementation, sensing agent 516 may allocate the first portion of second channel resources to the first selection of remote devices.

Step 2018 includes allocating a second portion of the second channel resources to the second selection of remote devices. In an implementation, sensing agent 516 may allocate the second portion of the second channel resources to the second selection of remote devices Step 2020 includes transmitting a second sensing trigger message configured to trigger a second series of sensing transmissions from the first selection of remote devices and the second selection of remote devices. According to an implementation, sensing agent 516 may transmit the second sensing trigger message configured to trigger the second series of sensing transmissions from the first selection of remote devices and the second selection of remote devices. In an example, the second sensing trigger message may be a detection type trigger message including a requested transmission configuration and a resource allocation subfield corresponding to the detection mode. In some examples, the second sensing trigger message may be a hybrid type trigger message including a requested transmission configuration and a resource allocation subfield corresponding to the hybrid mode.

Step 2022 includes receiving the second series of sensing transmissions transmitted in response to the second sensing trigger message. According to an implementation, sensing agent 516 may receive the second series of sensing transmissions transmitted in response to the second sensing trigger message. In an example, the second series of sensing transmissions may correspond to the detection mode. In another example, the second series of sensing transmissions may correspond to the hybrid mode.

Step 2024 includes generating a second series of sensing measurements based on the second series of sensing transmissions. In an implementation, sensing agent 516 may generate the second series of sensing measurements based on the second series of sensing transmissions. In an example, the second series of sensing measurements are of a higher resolution than the first series of sensing measurements.

Figure 21:
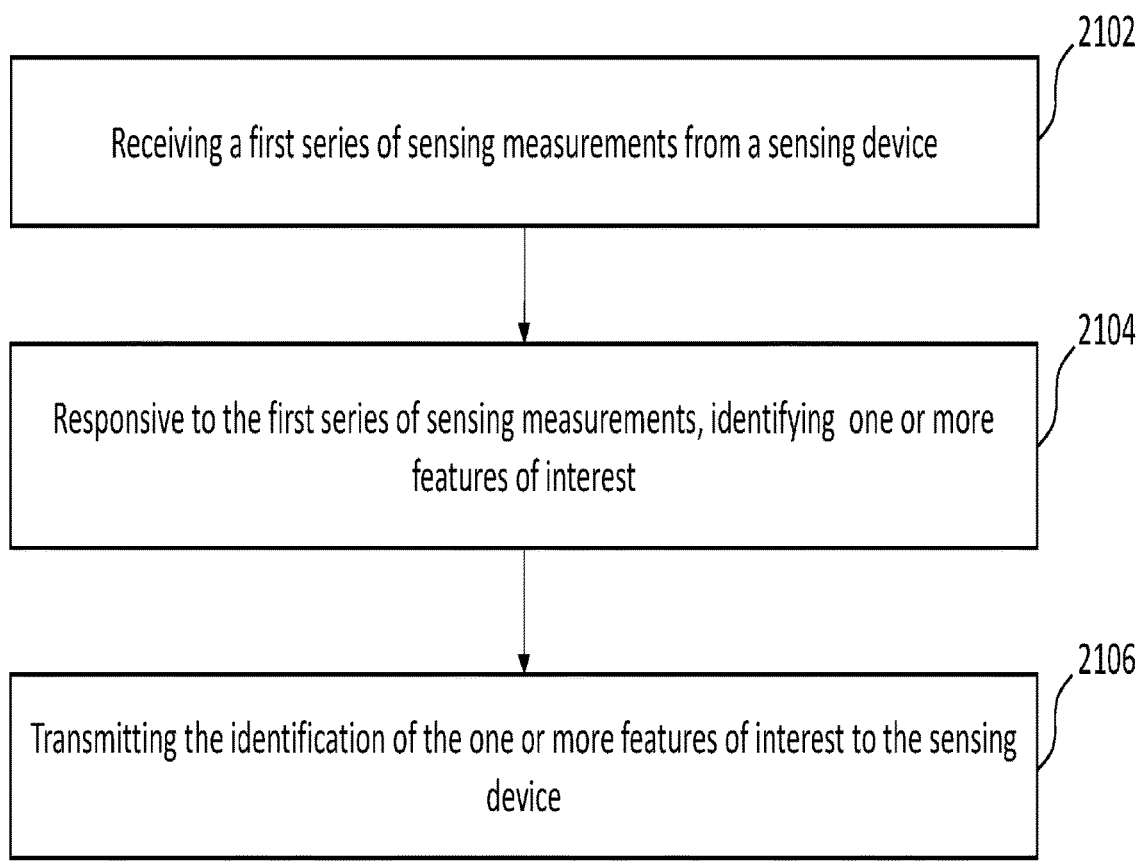
FIG. 21 depicts a flowchart for identifying a feature of interest, according to some embodiments.

FIG. 21 depicts flowchart 2100 for identifying a feature of interest, according to some embodiments.

In brief over of an implementation of flowchart 2100, at step 2102, a first series of sensing measurements is received from a sensing device. At step 2104, responsive to the first series of sensing measurements, one or more features of interest are identified. At step 2106, the identification of the one or more features of interest is transmitted to the sensing device.

Step 2102 includes receiving a first series of sensing measurements from a sensing device. According to an implementation, sensing algorithm device 506 may receive the first series of sensing measurements from sensing device 502.

Step 2104 includes responsive to the first series of sensing measurements, identifying one or more features of interest. In an implementation, sensing algorithm device 506 may identify the one or more features of interest based on the first series of sensing measurements. According to an implementation, sensing algorithm device 506 may execute a sensing algorithm to identify the one or more features of interest.

Step 2106 includes transmitting the identification of the one or more features of interest to the sensing device. According to an implementation, sensing algorithm device 506 may transmit the identification of the one or more features of interest to sensing device 502.

Specific Embodiments Include

Embodiment 1 is a system comprising a sensing receiver including a transmitting antenna, a receiving antenna, and at least one processor configured to execute instructions to allocate, by the at least one processor, first channel resources to first expected transmissions from a plurality of sensing transmitters, transmit, via the transmitting antenna, a first sensing sounding trigger frame configured to trigger a first series of sensing transmissions from the plurality of sensing transmitters, receive, via the receiving antenna, the first series of sensing transmissions transmitted in response to the first sensing sounding trigger frame, generate, by the at least one processor, a first series of sensing measurements based on the first series of sensing transmissions, obtain identification of a feature of interest according to the first series of sensing measurements, determine, by the at least one processor, a selection of sensing transmitters according to the feature of interest, wherein the selection of sensing transmitters is a subset of the plurality of sensing transmitters, allocate, by the at least one processor, second channel resources to second expected transmissions from the selection of sensing transmitters, transmit, via the transmitting antenna, a second sensing sounding trigger frame configured to trigger a second series of sensing transmissions from the selection of sensing transmitters, receive, via the receiving antenna, the second series of sensing transmissions transmitted in response to the second sensing sounding trigger frame, and generate, by the at least one processor, a second series of sensing measurements based on the second series of sensing transmissions.

Embodiment 2 is the system of embodiment 1, wherein the first sensing sounding trigger frame is a scanning type trigger message including a requested transmission configuration and a resource allocation subfield corresponding to a scanning mode, and wherein the second sensing sounding trigger frame is a detection type trigger message including a requested transmission configuration and a resource allocation subfield corresponding to a detection mode.

Embodiment 3 is the system of embodiment 1 or embodiment 2, wherein the first channel resources are included within a first transmission opportunity, the first series of sensing transmissions corresponds to a scanning mode, the first channel resources are allocated to the plurality of sensing transmitters according to the scanning mode, the second channel resources are included within a second transmission opportunity, the second series of sensing transmissions corresponds to a detection mode, and the second channel resources are allocated to the selection of sensing transmitters according to the detection mode.

Embodiment 4 is the system of embodiment 1 to embodiment 3, wherein the first channel resources and the second channel resources are included within a same transmission opportunity, the first series of sensing transmissions corresponds to a scanning mode, the first channel resources are allocated to the plurality of sensing transmitters according to the scanning mode, the second series of sensing transmissions corresponds to a detection mode, and the second channel resources are allocated to the selection of sensing transmitters according to the detection mode.

Embodiment 5 is the system of embodiment 1 to embodiment 4, The system of claim 1, wherein the first channel resources are included within a first transmission opportunity, the first series of sensing transmissions corresponds to a scanning mode, the second channel resources are included within a second transmission opportunity, the second sensing sounding trigger frame includes a hybrid type trigger message, the hybrid type trigger message being configured to trigger, from a first group of sensing transmitters, a first second series of sensing transmissions corresponding to the scanning mode and to trigger, from a second group of sensing transmitters, a second second series of sensing transmissions corresponding to a detection mode, a first portion of the second channel resources is allocated to sensing transmissions of the first second series of sensing transmissions received responsive to the hybrid type trigger message, and a second portion of the second channel resources is allocated to sensing transmissions of the second second series of sensing transmissions received responsive to the hybrid type trigger message.

Embodiment 6 is the system of embodiment 1 to embodiment 5, wherein the processor is further configured to execute instructions to allocate the first channel resources including allocating time and bandwidth within a transmission opportunity to the plurality of sensing transmitters.

Embodiment 7 is the system of embodiment 1 to embodiment 6, wherein the processor is further configured to execute instructions to obtain identification of the feature of interest by identifying, by the at least one processor and responsive to the first series of sensing measurements, the feature of interest.

Embodiment 8 is the system of embodiment 1 to embodiment 7, wherein the processor is further configured to execute instructions to obtain identification of the feature of interest by transmitting, the first series of sensing measurements to a sensing algorithm device, and receiving, by the at least one processor, from the sensing algorithm device, the identification of the feature of interest.

Embodiment 9 is the system of embodiment 1 to embodiment 8, wherein the processor is further configured to execute instructions to transmit the second sensing sounding trigger frame by transmitting a sensing sounding trigger frame configured to trigger a first group of sensing transmissions from a first group of sensing transmitters from the selection of sensing transmitters and to trigger a second group of sensing transmissions from a second group of sensing transmitters from the selection of sensing transmitters.

Embodiment 10 is the system of embodiment 1 to embodiment 9, wherein the processor is further configured to execute instructions to transmit the first sensing sounding trigger frame configured to trigger a first group of sensing transmission from a first group of sensing transmitters from the plurality of sensing transmitters and to trigger a second group of sensing transmission from a second group of sensing transmitters from the plurality of sensing transmitters.

Embodiment 11 is the system of embodiment 1 to embodiment 10, wherein the processor is further configured to execute instructions to determine the selection of sensing transmitters by selecting sensing transmitters from the plurality of sensing transmitters in a vicinity of the feature of interest to include in the selection of sensing transmitters.

Embodiment 12 is the system of embodiment 1 to embodiment 11, wherein the second series of sensing measurements are of a higher resolution than the first series of sensing measurements.

Embodiment 13 is the system of embodiment 1 to embodiment 12, wherein the feature of interest includes a first feature of interest and a second feature of interest, the processor is further configured to execute instructions to determine the selection of sensing transmitters according to the feature of interest by determining a first selection of sensing transmitters according to the first feature of interest and determining a second selection of sensing transmitters according to the second feature of interest, and the processor is further configured to execute instructions to allocate the second channel resources to the second expected transmissions from the selection of sensing transmitters by allocating a first portion of the second channel resources to the first selection of sensing transmitters and allocating a second portion of the second channel resources to the second selection of sensing transmitters.

Embodiment 14 is a system comprising a sensing receiver including a transmitting antenna, a receiving antenna, and at least one processor configured to execute instructions for allocating, by the at least one processor, first channel resources to first expected transmissions from a first plurality of sensing transmitters wherein each of the first plurality of sensing transmitters is allocated a first respective portion of the first channel resources, generating, by the at least one processor, a series of sensing measurements based on a series of sensing transmissions, obtaining identification of a feature of interest according to the series of sensing measurements, and allocating, by the at least one processor, according to the identification of the feature of interest, second channel resources to a second plurality of sensing transmitters wherein each of the second plurality of sensing transmitters is allocated a second respective portion of the second channel resources, the second plurality of sensing transmitters is a subset of the first plurality of sensing transmitters, and at least one second respective portion of the second channel resources is greater than a corresponding first respective portion of the first channel resources.

Embodiment 15 is the system of embodiment 14, wherein the at least one processor is further configured for transmitting, via the transmitting antenna, a sensing sounding trigger frame configured to trigger the series of sensing transmissions from the first plurality of sensing transmitters, and receiving, via the receiving antenna, the series of sensing transmissions transmitted in response to the sensing sounding trigger frame wherein the sensing sounding trigger frame is a scanning type trigger frame including a requested transmission configuration and a resource allocation subfield corresponding to a scanning mode.

Embodiment 16 is the system of embodiment 14 or embodiment 15, wherein the first channel resources are included within a first transmission opportunity, the series of sensing transmissions is a first series of sensing transmissions corresponding to a scanning mode, the first channel resources are allocated to the first plurality of sensing transmitters according to the scanning mode, the second channel resources are included within a second transmission opportunity, and the second channel resources are allocated to the second plurality of sensing transmitters according to a detection mode.

Embodiment 17 is the system of embodiment 14 or embodiment 15, wherein the first channel resources and the second channel resources are included within a same transmission opportunity, the series of sensing transmissions is a first series of sensing transmissions corresponding to a scanning mode, the first channel resources are allocated to the first plurality of sensing transmitters according to the scanning mode, and the second channel resources are allocated to the second plurality of sensing transmitters according to a detection mode.

Embodiment 18 is the system of embodiment 14 to embodiment 17, wherein allocating the first channel resources includes allocating time and bandwidth within a transmission opportunity to the first plurality of sensing transmitters.

Embodiment 19 is the system of embodiment 14 to embodiment 18, wherein obtaining the identification of the feature of interest includes identifying, by the at least one processor and responsive to the series of sensing measurements, the feature of interest.

Embodiment 20 is the system of embodiment 14 to embodiment 19, wherein obtaining the identification of the feature of interest includes transmitting, the series of sensing measurements to a sensing algorithm device, and receiving, by the at least one processor, from the sensing algorithm device, the identification of the feature of interest.

Embodiment 21 is the system of embodiment 14 to embodiment 20, wherein allocating the second channel resources includes selecting the second plurality of sensing transmitters based on proximity to the feature of interest.

Embodiment 22 is the system of embodiment 14 to embodiment 21, wherein the series of sensing measurements is a first series of sensing measurements and the series of sensing transmissions is a first series of sensing transmissions, the at least one processor further configured for generating a second series of sensing measurements of a higher resolution than the first series of sensing measurements based on a second series of sensing transmissions.

Embodiment 23 is the system of embodiment 14 to embodiment 22, wherein the feature of interest includes a first feature of interest and a second feature of interest, and allocating the second channel resources based on the identification of the feature of interest includes determining a first selection of sensing transmitters according to an identification of the first feature of interest, determining a second selection of sensing transmitters according to an identification of the second feature of interest, wherein the first selection of sensing transmitters and the second selection of sensing transmitters make up the second plurality of sensing transmitters.

Embodiment 24 is the system of embodiment 15 to embodiment 23, wherein the first channel resources are included within a first transmission opportunity, the series of sensing transmissions is a first series of sensing transmissions corresponding to a scanning mode, the second channel resources are included within a second transmission opportunity, a second sensing sounding trigger frame includes a hybrid type trigger frame, the hybrid type trigger frame being configured to trigger, from a first group of sensing transmitters, a first second series of sensing transmissions corresponding to the scanning mode and to trigger, from a second group of sensing transmitters, a second second series of sensing transmissions corresponding to a hybrid mode, a first portion of the second channel resources is allocated to sensing transmissions of the first second series of sensing transmissions received responsive to the hybrid type trigger frame, and a second portion of the second channel resources is allocated to sensing transmissions of the second second series of sensing transmissions received responsive to the hybrid type trigger frame.

Embodiment 25 is the system of embodiment 15 to embodiment 24, wherein the sensing sounding trigger frame is a first sensing sounding trigger frame, the at least one processor further configured for transmitting a second sensing sounding trigger frame configured to trigger a first group of second sensing transmissions from a first group of sensing transmitters from the second plurality of sensing transmitters and to trigger a second group of sensing transmissions from a second group of sensing transmitters from the second plurality of sensing transmitters.

Embodiment 26 is the system of embodiment 14 to embodiment 25, wherein the at least one processor is further configured for transmitting, via the transmitting antenna, a sensing sounding trigger frame configured to trigger the series of sensing transmissions from the first plurality of sensing transmitters, and receiving, via the receiving antenna, the series of sensing transmissions transmitted in response to the sensing sounding trigger frame wherein transmitting the sensing sounding trigger frame includes transmitting the sensing sounding trigger frame configured to trigger a first group of sensing transmissions from a first group of sensing transmitters from the first plurality of sensing transmitters and to trigger a second group of sensing transmission from a second group of sensing transmitters from the first plurality of sensing transmitters.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for Wi-Fi sensing carried out by a sensing initiator including at least one transmitting antenna, at least one receiving antenna, and at least one processor configured to execute instructions, the method comprising:

allocating, by the at least one processor, channel resources to a plurality of sensing responders wherein a channel resource for each of the plurality of sensing responders is a portion of a channel bandwidth available to each of the plurality of sensing responders;

obtaining, by the at least one processor, first sensing measurements based on a first sensing transmission on a first channel from each of a first plurality of sensing responders wherein the first plurality of sensing responders is a first subset of the plurality of sensing responders, and the first sensing transmissions are received within a negotiated interval of time for frame exchange; and obtaining, by the at least one processor, second sensing measurements based on a second sensing transmission on a second channel from each of a second plurality of sensing responders wherein the second plurality of sensing responders is a second subset of the plurality of sensing responders, and the second sensing transmissions are received subsequent to the first sensing transmissions and within the negotiated interval of time for frame exchange.

2. The method of claim 1, wherein the negotiated interval of time for frame exchange is a transmission opportunity (TXOP).

3. The method of claim 1, wherein the first subset of the plurality of sensing responders and the second subset of the plurality of sensing responders do not overlap.

4. The method of claim 1, further comprising:
transmitting, via the at least one transmitting antenna, a first sensing trigger frame configured to trigger the first sensing transmissions from the first subset of the plurality of sensing responders; and
receiving, via the at least one receiving antenna, the first sensing transmissions transmitted in response to the first sensing trigger frame.

5. The method of claim 3, wherein the first sensing trigger frame includes at least one of a requested transmission configuration and a resource allocation subfield.

6. The method of claim 2, wherein allocating the channel resources includes allocating at least one of time and bandwidth resources within the TXOP to the plurality of sensing responders.

7. The method of claim 6, further comprising transmitting a resource allocation message including information about allocated channel resources to at least one of the first subset of the plurality of sensing responders and the second subset of the plurality of sensing responders.

8. The method of claim 4, further comprising:
transmitting, via the at least one transmitting antenna, a second sensing trigger frame configured to trigger the second sensing transmissions from the second subset of the plurality of sensing responders; and
receiving, via the at least one receiving antenna, the second sensing transmissions transmitted in response to the second sensing trigger frame.

9. The method of claim 8, wherein the second sensing trigger frame is transmitted one short interframe space (SIFS) after a period in which the first sensing transmissions are received.

10. A system for Wi-Fi sensing comprising:
a sensing initiator including at least one transmitting antenna, at least one receiving antenna, and at least one processor configured to execute instructions for:
allocating, by the at least one processor, channel resources to a plurality of sensing responders wherein a channel resource for each of the plurality of sensing responders is a portion of a channel bandwidth available to each of the plurality of sensing responders;
obtaining, by the at least one processor, first sensing measurements based on a first sensing transmission on a first channel from each of a first plurality of sensing responders wherein the first plurality of sensing responders is a first subset of the plurality of sensing responders, and the first sensing transmissions are received within a negotiated interval of time for frame exchange; and
obtaining, by the at least one processor, second sensing measurements based on a second sensing transmission on a second channel from each of a second plurality of sensing responders wherein the second plurality of sensing responders is a second subset of the plurality of sensing responders, and the second sensing transmissions are received subsequent to the first sensing transmissions and within the negotiated interval of time for frame exchange.

11. The system of claim 10, wherein the negotiated interval of time for frame exchange is a transmission opportunity (TXOP).

12. The system of claim 10, wherein the first subset of the plurality of sensing responders and the second subset of the plurality of sensing responders do not overlap.

13. The system of claim 10, wherein the at least one processor is further configured to execute instructions for:
transmitting, via the at least one transmitting antenna, a first sensing trigger frame configured to trigger the first sensing transmissions from the first subset of the plurality of sensing responders; and
receiving, via the at least one receiving antenna, the first sensing transmissions transmitted in response to the first sensing trigger frame.

14. The system of claim 13, wherein the first sensing trigger frame includes at least one of a requested transmission configuration and a resource allocation subfield.

15. The system of claim 11, wherein allocating the channel resources includes allocating at least one of time and bandwidth resources within the TXOP to the plurality of sensing responders.

16. The system of claim 15, further comprising transmitting a resource allocation message including information about allocated channel resources to at least one of the first subset of the plurality of sensing responders and the second subset of the plurality of sensing responders.

17. The system of claim 13, wherein the at least one processor is further configured to execute instructions for:
transmitting, via the at least one transmitting antenna, a second sensing trigger frame configured to trigger the second sensing transmissions from the second subset of the plurality of sensing responders; and
receiving, via the at least one receiving antenna, the second sensing transmissions transmitted in response to the second sensing trigger frame.

18. The system of claim 17, wherein the second sensing trigger frame is transmitted one short interframe space (SIFS) after a period in which the first sensing transmissions are received.

* * * * *